US012666421B2

(12) United States Patent
Wang et al.

(10) Patent No.: US 12,666,421 B2
(45) Date of Patent: Jun. 23, 2026

(54) HARQ-ACK TRANSMISSION SUPPORTING MULTI-CELL SCHEDULING

(71) Applicant: Intel Corporation, Santa Clara, CA (US)

(72) Inventors: Yi Wang, Beijing (CN); Yingyang Li, Beijing (CN); Gang Xiong, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/153,681

(22) Filed: Jan. 12, 2023

(65) Prior Publication Data

US 2023/0156704 A1    May 18, 2023

Related U.S. Application Data

(60) Provisional application No. 63/355,010, filed on Jun. 23, 2022, provisional application No. 63/334,465, filed on Apr. 25, 2022, provisional application No. 63/334,021, filed on Apr. 22, 2022, provisional application No. 63/299,369, filed on Jan. 13, 2022.

(51) Int. Cl.
| | |
|---|---|
| *H04W 4/00* | (2018.01) |
| *H04L 1/1812* | (2023.01) |
| *H04W 72/1273* | (2023.01) |
| *H04W 72/23* | (2023.01) |
| *H04L 5/00* | (2006.01) |

(52) U.S. Cl.
CPC ....... *H04W 72/1273* (2013.01); *H04L 1/1812* (2013.01); *H04W 72/23* (2023.01); *H04L 5/0044* (2013.01); *H04L 5/0055* (2013.01)

(58) Field of Classification Search
None
See application file for complete search history.

(56) References Cited

U.S. PATENT DOCUMENTS

| | | | | |
|---|---|---|---|---|
| 12,219,569 | B2 * | 2/2025 | Lee | H04L 5/0055 |
| 12,267,172 | B2 * | 4/2025 | Babaei | H04W 72/04 |
| 2016/0302182 | A1 * | 10/2016 | Nogami | H04L 5/0044 |
| 2022/0015075 | A1 * | 1/2022 | Liao | H04L 1/1812 |
| 2022/0132545 | A1 * | 4/2022 | Lee | H04L 1/1896 |
| 2022/0183004 | A1 * | 6/2022 | Huang | H04L 1/1812 |
| 2022/0200743 | A1 * | 6/2022 | Yoshioka | H04L 27/26 |
| 2022/0248436 | A1 * | 8/2022 | Zhang | H04L 1/1854 |
| 2023/0049739 | A1 * | 2/2023 | Yang | H04L 5/0055 |
| 2023/0291515 | A1 * | 9/2023 | Dai | H04L 1/1819 |
| 2024/0259147 | A1 * | 8/2024 | Dai | H04B 1/7143 |
| 2024/0405950 | A1 * | 12/2024 | Guo | H04L 1/08 |
| 2024/0406946 | A1 * | 12/2024 | Deng | H04W 72/0446 |

* cited by examiner

*Primary Examiner* — Bob A Phunkulh
(74) *Attorney, Agent, or Firm* — Gray Ice Higdon, PLLC

(57) ABSTRACT

Various embodiments herein provide techniques for hybrid automatic repeat request (HARQ)-acknowledgement (ACK) transmission with multi-cell scheduling (e.g., of physical downlink shared channels (PDSCHs) and/or physical uplink shared channels (PUSCHs). For example, embodiments include mechanisms for HARQ-ACK feedback timing determination, and formatting of HARQ-ACK feedback. Other embodiments may be described and claimed.

20 Claims, 29 Drawing Sheets

1500 detecting a downlink control information (DCI) to schedule multiple physical downlink shared channels (PDSCHs), wherein the respective PDSCHs are to be transmitted from different cells and include different transport blocks (TBs), and wherein the DCI indicates one or more K1 values
1502 determining an uplink resource for hybrid automatic repeat request acknowledgement (HARQ-ACK) feedback for the PDSCHs based on the one or more K1 values and a reference channel
1504 encoding the HARQ-ACK feedback for transmission in the determined uplink resource
1506

1500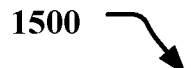

detecting a downlink control information (DCI) to schedule
multiple physical downlink shared channels (PDSCHs), wherein
the respective PDSCHs are to be transmitted from different cells
and include different transport blocks (TBs), and wherein the
DCI indicates one or more K1 values
1502 determining an uplink resource for hybrid automatic repeat
request acknowledgement (HARQ-ACK) feedback for the
PDSCHs based on the one or more K1 values and a reference
channel
1504 encoding the HARQ-ACK feedback for transmission in the
determined uplink resource
1506

Figure 15

1600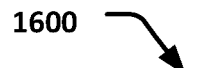

encoding, for transmission to a user equipment (UE), a downlink
control information (DCI) to schedule multiple physical
downlink shared channels (PDSCHs), wherein the respective
PDSCHs are to be transmitted from different cells and include
different transport blocks (TBs), and wherein the DCI indicates
one or more K1 values

1602 identifying an uplink resource for hybrid automatic repeat
request acknowledgement (HARQ-ACK) feedback for the
PDSCHs based on the one or more K1 values and a reference
channel

1604 receiving the HARQ-ACK feedback from the UE in the uplink
resource

HARQ-ACK TRANSMISSION SUPPORTING MULTI-CELL SCHEDULING

CROSS REFERENCE TO RELATED APPLICATION

The present application claims priority to U.S. Provisional Patent Application No. 63/299,369, which was filed Jan. 13, 2022; U.S. Provisional Patent Application No. 63/334,021, which was filed Apr. 22, 2022; U.S. Provisional Patent Application No. 63/334,465, which was filed Apr. 25, 2022; and U.S. Provisional Patent Application No. 63/355,010, which was filed Jun. 23, 2022; the disclosures of which are hereby incorporated by reference.

FIELD

Various embodiments generally may relate to the field of wireless communications. For example, some embodiments may relate to hybrid automatic repeat request (HARQ)-acknowledgement (ACK) techniques for multi-cell scheduling.

BACKGROUND

New Radio (NR) supports a wide range of spectrum in different frequency ranges. It is expected that there will be increasing availability of spectrum in the market for 5G Advanced possibly due to re-farming from the bands originally used for previous cellular generation networks. Especially for frequency range 1 (FR1) bands, the available spectrum blocks tend to be more fragmented and scattered with narrower bandwidth. For frequency range 2 (FR2) bands and some FR1 bands, the available spectrum can be wider such that intra-band multi-carrier operation is necessary. To meet different spectrum needs, it is important to ensure that these scattered spectrum bands or wider bandwidth spectrum can be utilized in a more spectral/power efficient and flexible manner, thus providing higher throughput and decent coverage in the network.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 15 depicts an example procedure for practicing the various embodiments discussed herein.

FIG. 16 depicts another example procedure for practicing the various embodiments discussed herein.

DETAILED DESCRIPTION

Figure 1A:
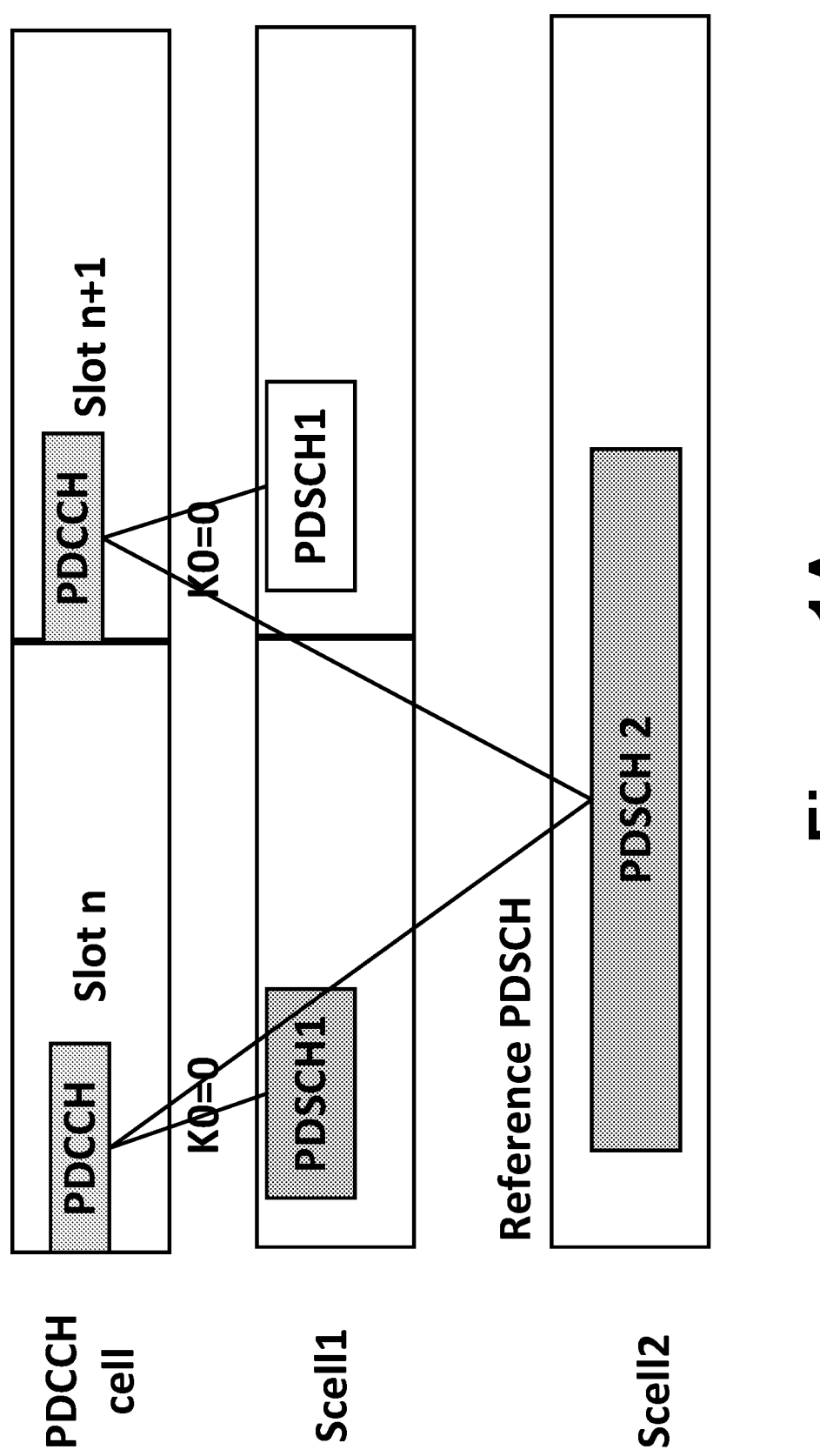
FIGS. 1A-1E illustrate examples of determination of a reference physical downlink shared channel (PDSCH) for hybrid automatic repeat request (HARQ)-acknowledgement (ACK) feedback with multi-cell scheduling, in accordance with various embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

Various embodiments herein may increase flexibility and spectral/power efficiency on scheduling data over multiple cells including intra-band cells and inter-band cells. The current scheduling mechanism only allows scheduling of single cell physical uplink shared channel (PUSCH)/physical downlink shared channel (PDSCH) per a scheduling downlink control information (DCI). With more available scattered spectrum bands or wider bandwidth spectrum, the need of simultaneous scheduling of multiple cells is expected to be increasing. To reduce the control overhead, it is beneficial to extend from single-cell scheduling to multi-cell PUSCH/PDSCH scheduling with a single scheduling DCI. More specifically, a DCI is used to schedule PDSCH or PUSCH transmissions in more than one cell or component carrier (CC), where each PDSCH or PUSCH is scheduled in one cell or CC.

Various embodiments herein provide mechanisms to support HARQ-ACK transmission for PDSCHs scheduled by a DCI for multi-cell scheduling. For example, embodiments include mechanisms for HARQ-ACK feedback timing determination and semi-static HARQ-ACK feedback for multi-cell scheduling for PDSCH. Aspects of various embodiments may include, but are not limited to:

PUCCH slot and PUCCH resource determination for multi-cell scheduling

Type-1 HARQ-ACK feedback

In NR system, a DL downlink control information (DCI) only schedules a PDSCH or multiple PDSCHs on an active DL BWP of a cell. For each scheduled PDSCH, UE generates HARQ-ACK codebook and reports HARQ-ACK by PUCCH.

To generate a HARQ-ACK codebook, there can be several different ways. One example is to generate HARQ-ACK codebook according to semi-statically configured parameters, e.g., HARQ-ACK feedback timing K1 set, time domain resource allocation (TDRA) for each serving cell, etc. Such HARQ-ACK codebook is defined as type-1 HARQ-ACK codebook. Another example is to generate HARQ-ACK codebook according to dynamical scheduling, e.g., HARQ-ACK feedback according to received K1 indication (PDSCH-to-HARQ feedback timing indicator in DCI), Counter Downlink Assignment Index (C-DAI) and Total DAI (T-DAI) in the DCI, etc. Such HARQ-ACK codebook is defined as type-2 HARQ-ACK codebook. Another example is to generate HARQ-ACK codebook according to semi-statically configured HARQ processes and serving cells, which is also known as type-3 HARQ-ACK codebook.

With a DCI for multi-cell scheduling, the DL transmissions on the multiple cells can be scheduled by a single DCI. A transport block (TB) that is scheduled by a DCI for multi-cell scheduling can be only mapped to time/frequency resources on one of the multiple cells. In other words, the PDSCHs on the different cells are considered as different PDSCHs that carry different TBs. For each PDSCH, either one or two TB can be scheduled.

For a DCI scheduling PDSCH/PUSCH in multiple cells, the PDSCHs/PUSCHs scheduled by a single DCI can be divided into N PDSCH/PUSCH groups. In a PDSCH/PUSCH group (it can also be denoted as a cell group), there can be PDSCH/PUSCHs over one or multiple serving cells. In one example, N=1. In another example, N≥1 that is configured by gNB.

Embodiment 1: PUCCH Resource and Slot Determination

In an embodiment, the multi-cell scheduling DCI format carrying DL assignment may indicate N values of K1 slot-offset (PDSCH-to-HARQ feedback timing indicator) and PUCCH resource indicator (PRI) for transmission of the HARQ-ACK feedback corresponding to each of the scheduled PDSCH group, where N is the number of PDSCH groups for multi-cell scheduling.

In another embodiment, the DCI format carrying DL assignment may indicate single value of K1 slot-offset and PRI for transmission of the HARQ-ACK feedback corresponding to all scheduled PDSCHs.

In an embodiment, K1 slot-offset (PDSCH-to-HARQ feedback timing indicator) indicates a slot or sub-slot offset from slot/sub-slot n for reference PDSCH to the corresponding PUCCH carrying HARQ-ACK feedback for PDSCHs scheduled by multi-cell DCI.

In one option, n is the last UL sub-slot for PUCCH transmission that overlaps with the reference PDSCH reception, e.g., if the UE is provided subslotLengthForPUCCH. In another option, n is the last UL slot for PUCCH transmission that overlaps with the DL slot $n_D$ for the reference PDSCH reception, e.g., if the UE is not provided subslotLengthForPUCCH.

In one option, if DCI includes N K1 respectively for N PDSCH groups, a reference PDSCH within each PDSCH group is determined, and HARQ-ACK of all PDSCHs within the same PDSCH group scheduled by the DCI is associated with the same K1 value and the slot/sub-slot for the reference PDSCH. In another option, if DCI includes a single K1, a reference PDSCH within all PDSCHs is determined, and HARQ-ACK of all PDSCHs scheduled by the DCI is associated with the K1 value and the slot/sub-slot for the reference PDSCH.

The reference PDSCH is chosen without consideration of valid or invalid PDSCH. Alternatively, the reference PDSCH is chosen only within valid PDSCHs. Note that valid PDSCH indicates that PDSCH is actually transmitted, or not overlapping with a UL symbol indicated by tdd-UL-DL-ConfigurationCommon or tdd-UL-DL-Configuration-Dedicated if provided in each cell.

The reference PDSCH can be determined according to at least one of the following mechanisms:

1) a PDSCH with last-ending symbol among PDSCHs scheduled by the multi-cell scheduling DCI.

The last-ending symbol is determined by time domain resource allocation (TDRA) bit-field in the DCI and sub-carrier spacing (SCS).

A PDSCH with the last ending symbol among PDSCHs may also depend on PDCCH monitoring occasion (MO) location. In case of different SCS for multiple PDSCHs, the PDSCH with last ending symbol among same set of CCs with a same TDRA row may change, according to different PDCCH MO. For example shown in FIG. 1A, assuming PDCCH cell with 30 KHz SCS, PDSCH1 with 30 KHz SCS and PDSCH2 with 15 KHz SCS. For a TDRA row with K0=0 for both PDSCH 1 and PDSCH2, if a PDCCH MO is in $1^{st}$ slot within a 15 KHz slot (slot n), PDSCH 2 is the PDSCH with last ending symbol. And if a PDCCH MO is in $2^{nd}$ slot within a 15 KHz slot (slot n+1), PDSCH 1 is the PDSCH with last ending symbol. If all PDSCHs scheduled by a single DCI are with same SCS, the PDSCH with last ending symbol is independent of PDCCH MO.

For (2)(3)(4)(6) below, similar dependency between reference PDSCH and PDCCH MO location can be applied.

2) a PDSCH that is associated with a last UL slot/sub-slot among the UL slots/sub-slots that are respectively determined by the PDSCHs scheduled by the multi-cell scheduling DCI, where the UL slot/sub-slot is the last UL slot/sub-slot overlapping with the DL slot of each corresponding PDSCH.
3) a PDSCH that is associated with a last UL slot/sub-slot among the UL slots/sub-slots that are respectively determined by the PDSCHs scheduled by the multi-cell scheduling DCI, where the UL slot/sub-slot is the last UL slot/sub-slot overlapping with last symbol of each corresponding PDSCH.
4) a PDSCH with last-ending boundary of a DL slot for the PDSCH among PDSCHs scheduled by the multi-cell scheduling DCI
5) a PDSCH with smallest SCS among PDSCHs scheduled by the multi-cell scheduling DCI
6) a PDSCH with smallest SCS and with last-ending symbols among the serving cells with smallest SCS among PDSCHs scheduled by the multi-cell scheduling DCI
7) a PDSCH with lowest or largest serving cell index among PDSCHs scheduled by the multi-cell scheduling DCI
8) a PDSCH with largest SCS among PDSCHs scheduled by the multi-cell scheduling DCI
9) a PDSCH on a reference cell configured by high layer signaling among PDSCHs scheduled by the multi-cell scheduling DCI In one option, if there is more than one PDSCH meets the condition above, all these PDSCHs can be reference PDSCH. In another option, if more than one PDSCH meet the condition above, one PDSCH is selected out of the PDSCHs as reference PDSCH.

A different mechanism to determine reference PDSCH may be adopted for different HARQ-ACK codebook type, e.g., for Type-1 semi-static codebook, Type-2 dynamic codebook or Type-3 codebook.

A different mechanism to determine reference PDSCH may be adopted for slot-based PUCCH and sub-slot based PUCCH.

Figure 1B:
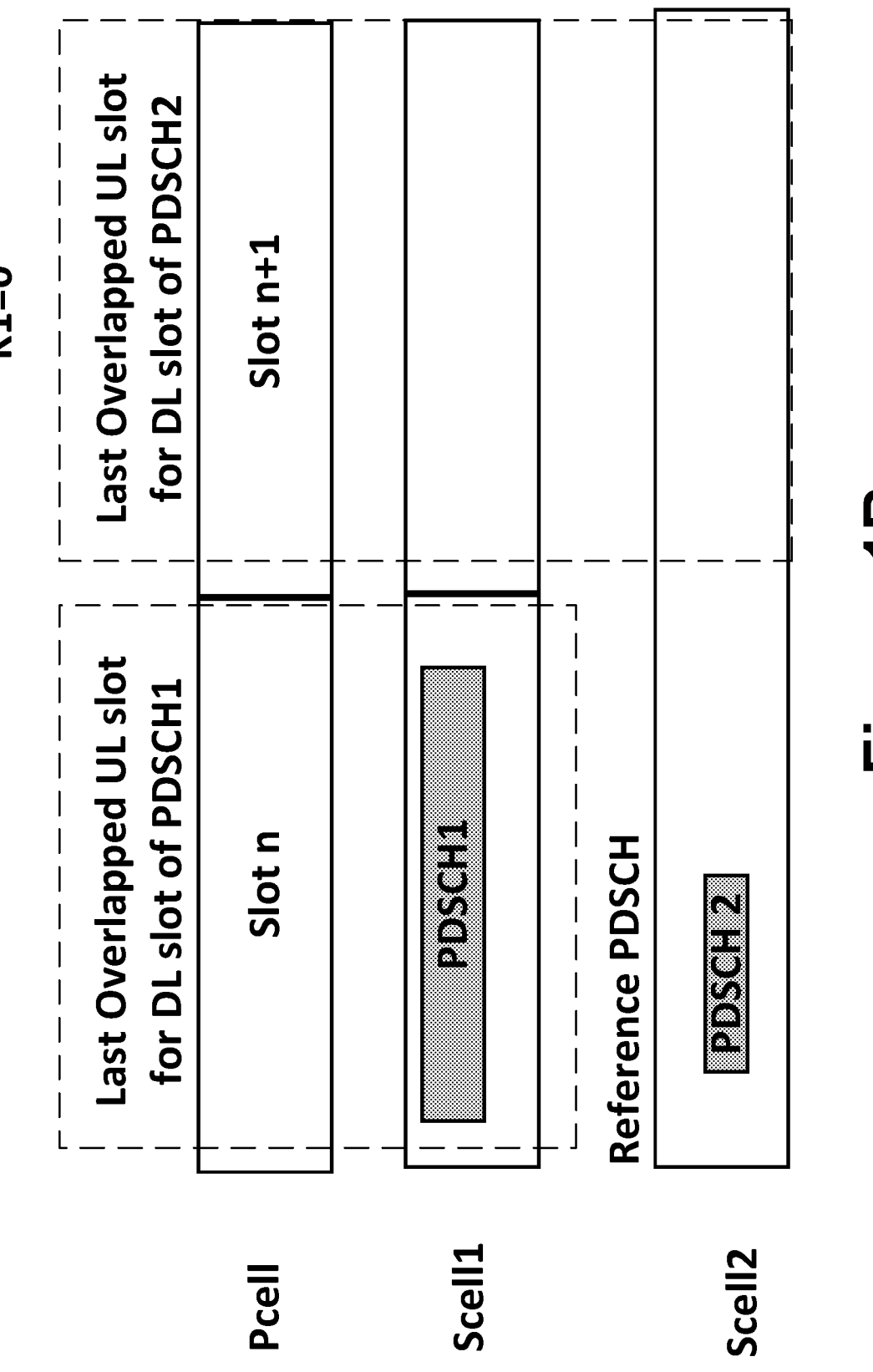

For example, if a UE is configured with slot-based PUCCH, k1=0 corresponds to the last UL slot of the PUCCH transmission that overlaps with the DL slot of reference PDSCH, and the reference PDSCH is determined by mechanism 2). FIG. 1B provides an example. Pcell and Scell1 are with SCS=30 KHz, and Scell2 is with 15 KHz SCS. gNB schedules PDSCH1 and PDSCH2 on Scell1 and Scell 2 respectively. For PDSCH1 on Scell1, UL slot n overlaps with DL slot for PDSCH1. For PDSCH2 on Scell 2, both UL slot n and slot n+1 overlaps with DL slot for PDSCH2. Then, the last UL slot overlapping with DL slot for PDSCH1 is UL slot n, and the last UL slot overlapping with DL slot for PDSCH2 is UL slot n+1, which ends later than UL slot n for PDSCH 1. Therefore, PDSCH 2 is chosen as reference PDSCH, K1=0 corresponds to UL slot n+1.

For another example, if a UE is configured with slot-based PUCCH, k1=0 corresponds to the last UL slot of the PUCCH transmission that overlaps with the DL slot of reference PDSCH, and the reference PDSCH is determined by mechanism 1). Then, the example in FIG. 1B, reference PDSCH should be PDSCH 1, because PDSCH1 ends later than PDSCH 2. Therefore, K1=0 corresponds to UL slot n.

For another example, if a UE is configured with slot-based PUCCH, and all PDSCHs scheduled by a DCI for multi-cell scheduling are with different SCS, k1=0 corresponds to the last UL slot of the PUCCH transmission that overlaps with the DL slot of reference PDSCH, and the reference PDSCH is determined by 5), e.g., the PDSCH with smallest SCS.

Figure 1C:
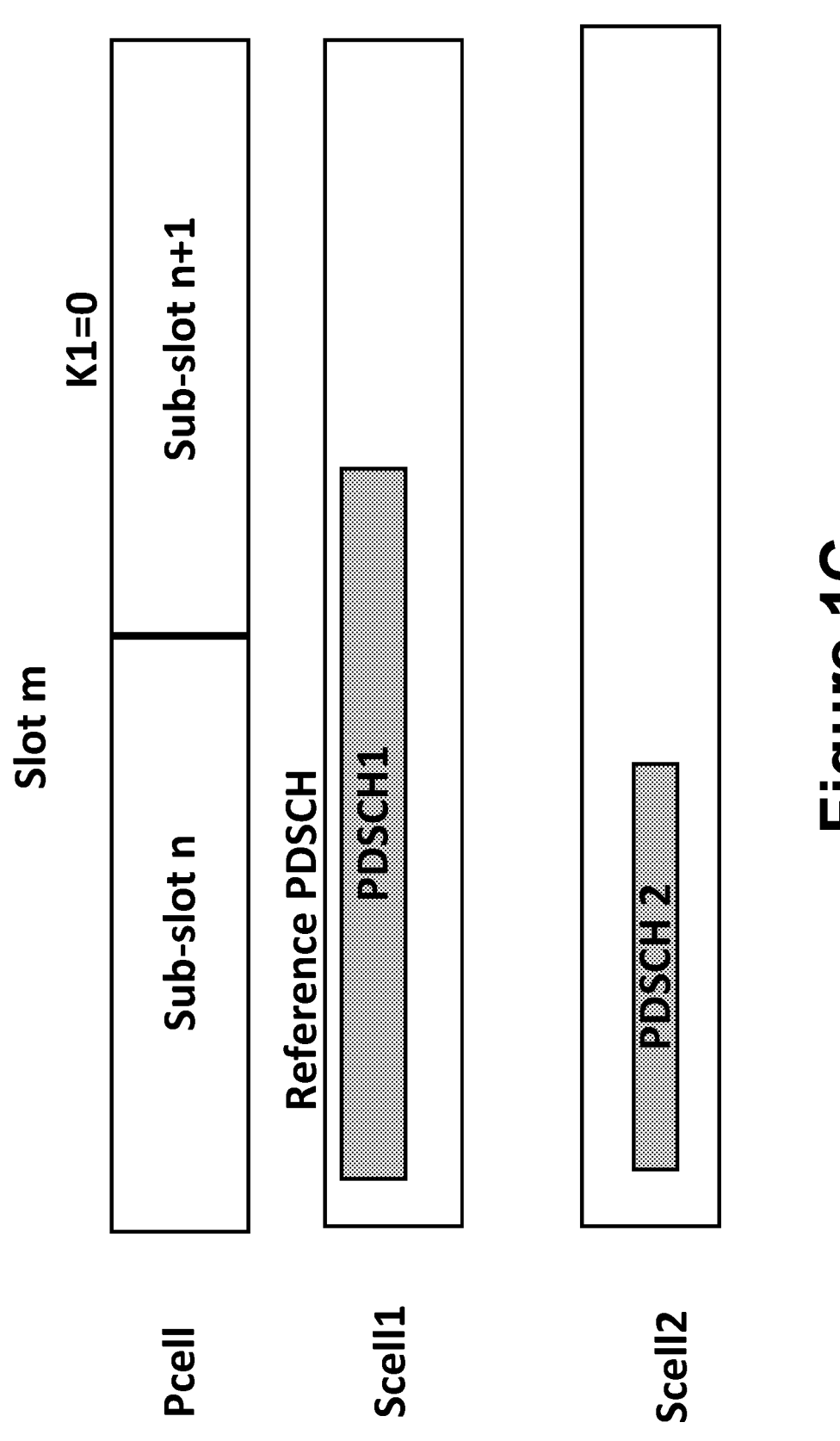
Figure 1D:
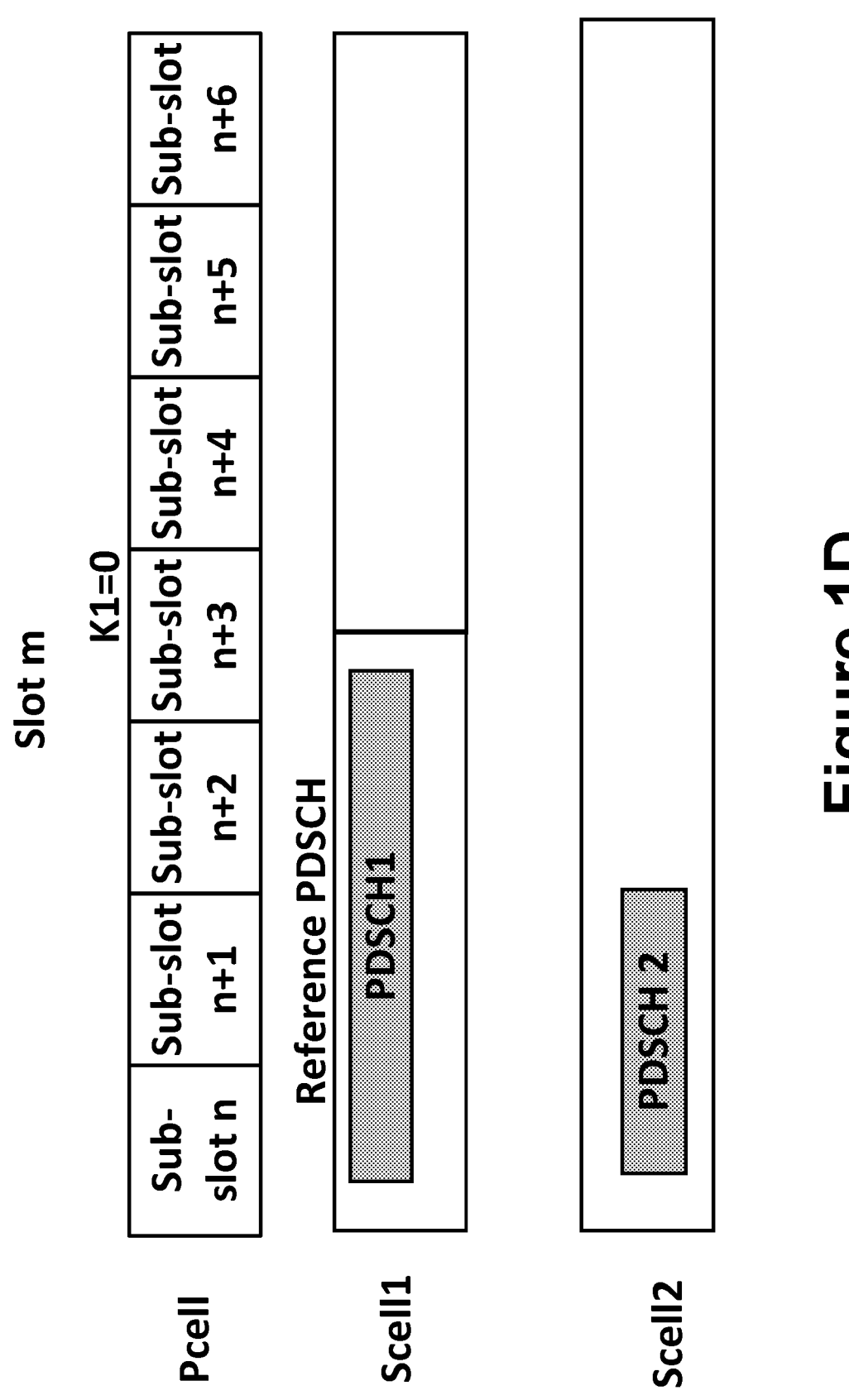

For example, if a UE is configured with sub-slot based PUCCH, k1=0 corresponds to the last UL sub-slot of the PUCCH transmission that overlaps with the reference PDSCH (the PUCCH sub-slot overlaps with the last symbol of reference PDSCH), and the reference PDSCH is determined by mechanism 1) or mechanism 3). FIG. 1C provides an example. Pcell is with SCS=30 KHz, Scell1 and Scell2 is with 15 KHz SCS. gNB schedules PDSCH1 and PDSCH2 on Scell1 and Scell 2 respectively. For PDSCH1 on Scell1, UL sub-slot n overlaps with PDSCH1 is sub slot n+1. For PDSCH2 on Scell 2, UL sub-slot n overlaps with PDSCH2. Then, according to 3), PDSCH 1 is chosen as reference PDSCH, K1=0 corresponds to UL sub-slot n+1. In FIG. 1D, PDSCH1 is reference PDSCH according to 1), because PDSCH1 ends later than PDSCH 2.

Figure 1E:
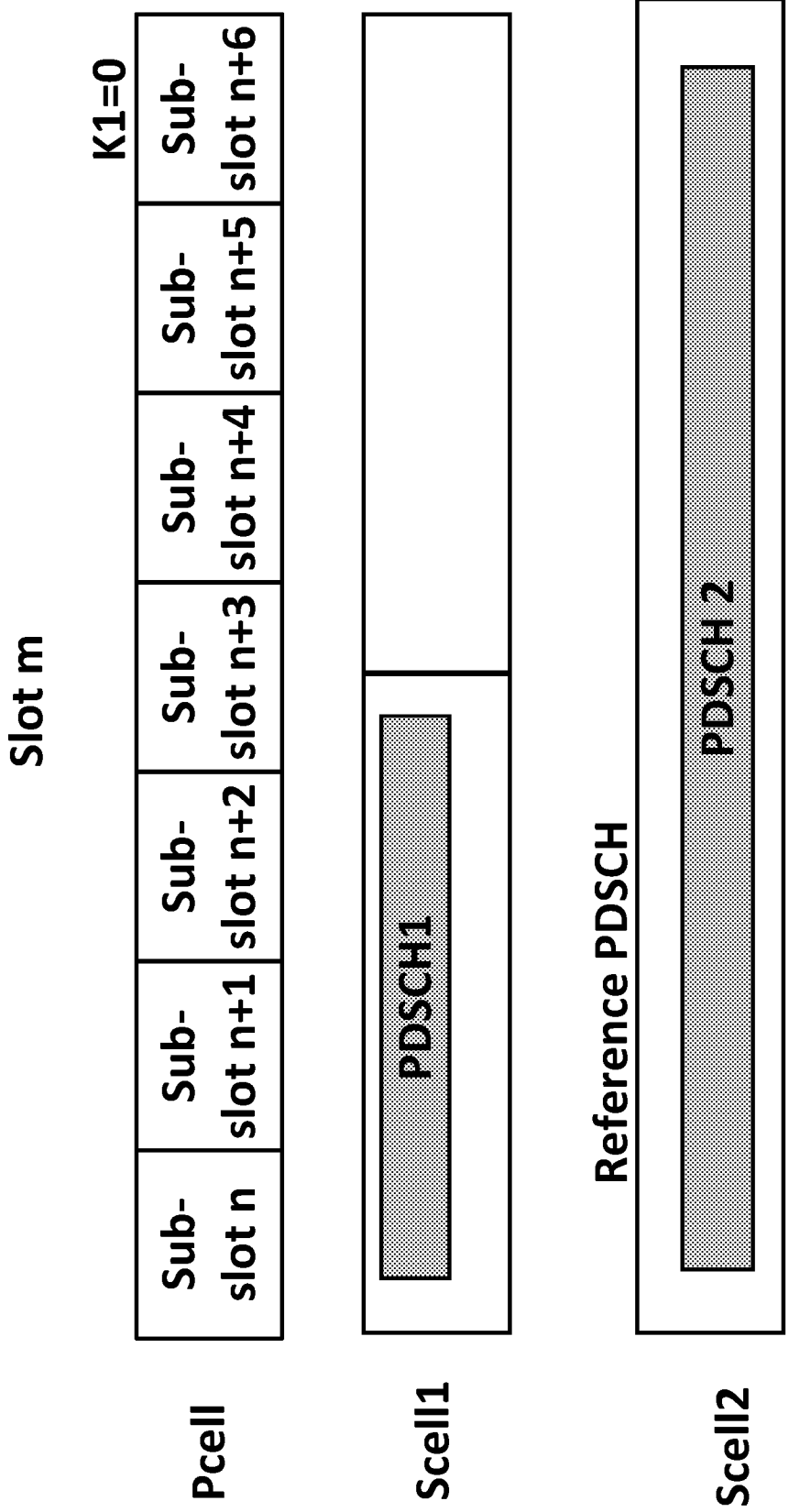

For another example, if a UE is configured with sub-slot based PUCCH, and all PDSCHs scheduled by a DCI for multi-cell scheduling are with different SCS, k1=0 corresponds to the last UL sub-slot of the PUCCH transmission that overlaps with the reference PDSCH (the PUCCH sub-slot overlaps with the last symbol of reference PDSCH), and the reference PDSCH is the PDSCH with smallest SCS. FIG. 1E provides an example.

In summary, to determine the UL slot/sub-slot for PUCCH transmission, a UE first determines reference PDSCH and UL slot/sub-slot n for the reference PDSCH, and then, UE determines UL slot/sub-slot n+K1 for PUCCH transmission according to the UL slot/sub-slot n and K1 indicated by multi-cell scheduling DCI.

In another embodiment, to determine the UL slot/sub-slot for PUCCH transmission, UE first determines UL slot/sub-slot n+K1 for each PDSCH scheduled by a DCI for multi-cell scheduling respectively, and then, UE determines the UL slot/sub-slot for PUCCH transmission as the last UL slot/sub-slot of all the UL slots/sub-slots n+K1 among all PDSCHs scheduled by the DCI for multi-cell scheduling. For each PDSCH, the UL slot/sub-slot for the PDSCH is determined by UL slot/sub-slot n for the PDSCH and K1. In one option, n is the last UL sub-slot for PUCCH transmission that overlaps with the PDSCH reception, e.g., if the UE is provided subslotLengthForPUCCH. In another option, n is the last UL slot for PUCCH transmission that overlaps with the DL slot $n_D$ for the PDSCH reception, e.g., if the UE is not provided subslotLengthForPUCCH.

It can be understood, a PDSCH associated with the last UL slot/sub-slot of all the UL slots/sub-slots n+K1 among all PDSCHs scheduled by the DCI for multi-cell scheduling is a reference PDSCH.

Figure 2A:
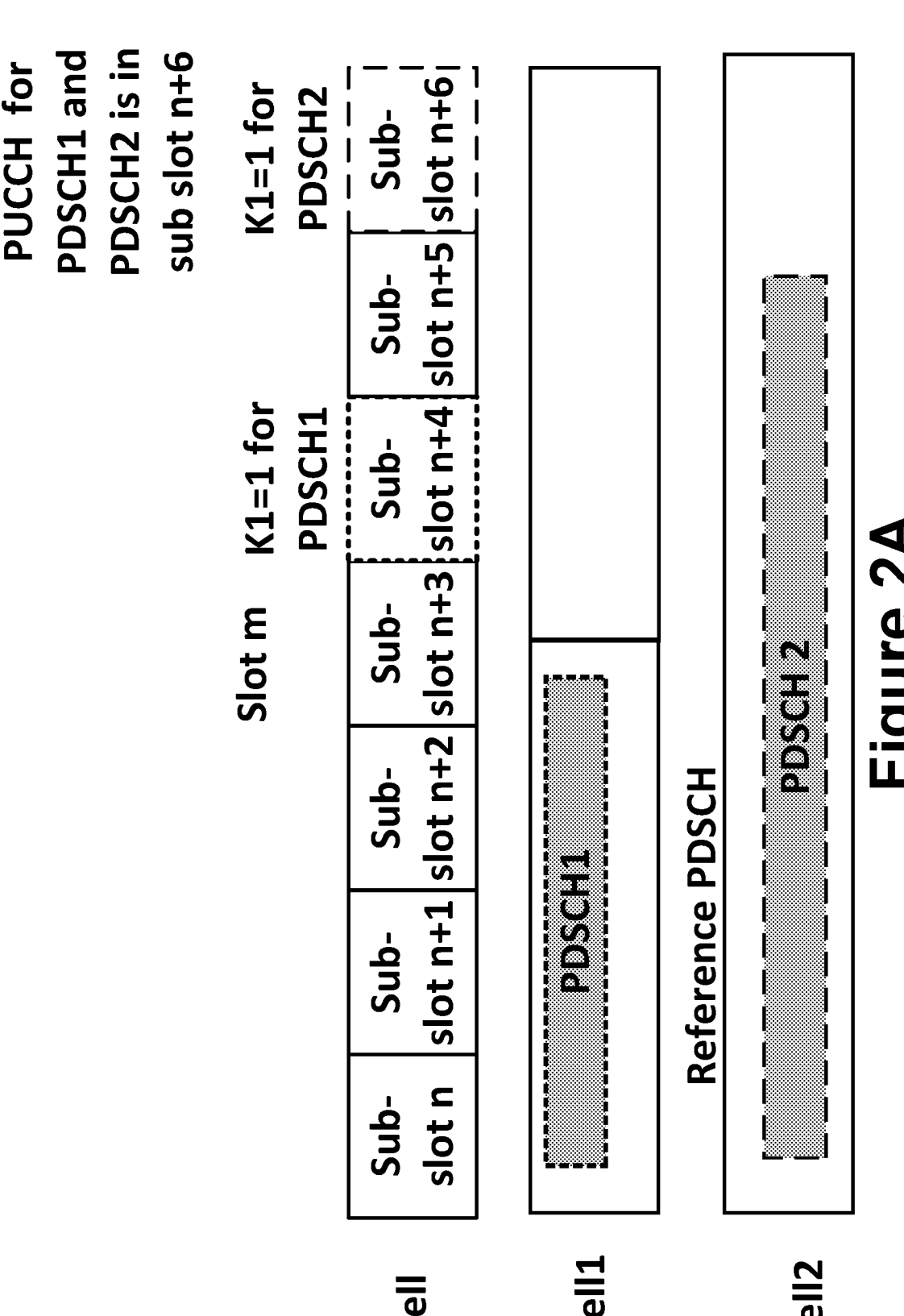
FIGS. 2A-2B illustrate further examples of determination of a reference PDSCH for HARQ-ACK feedback, in accordance with various embodiments.
Figure 2B:
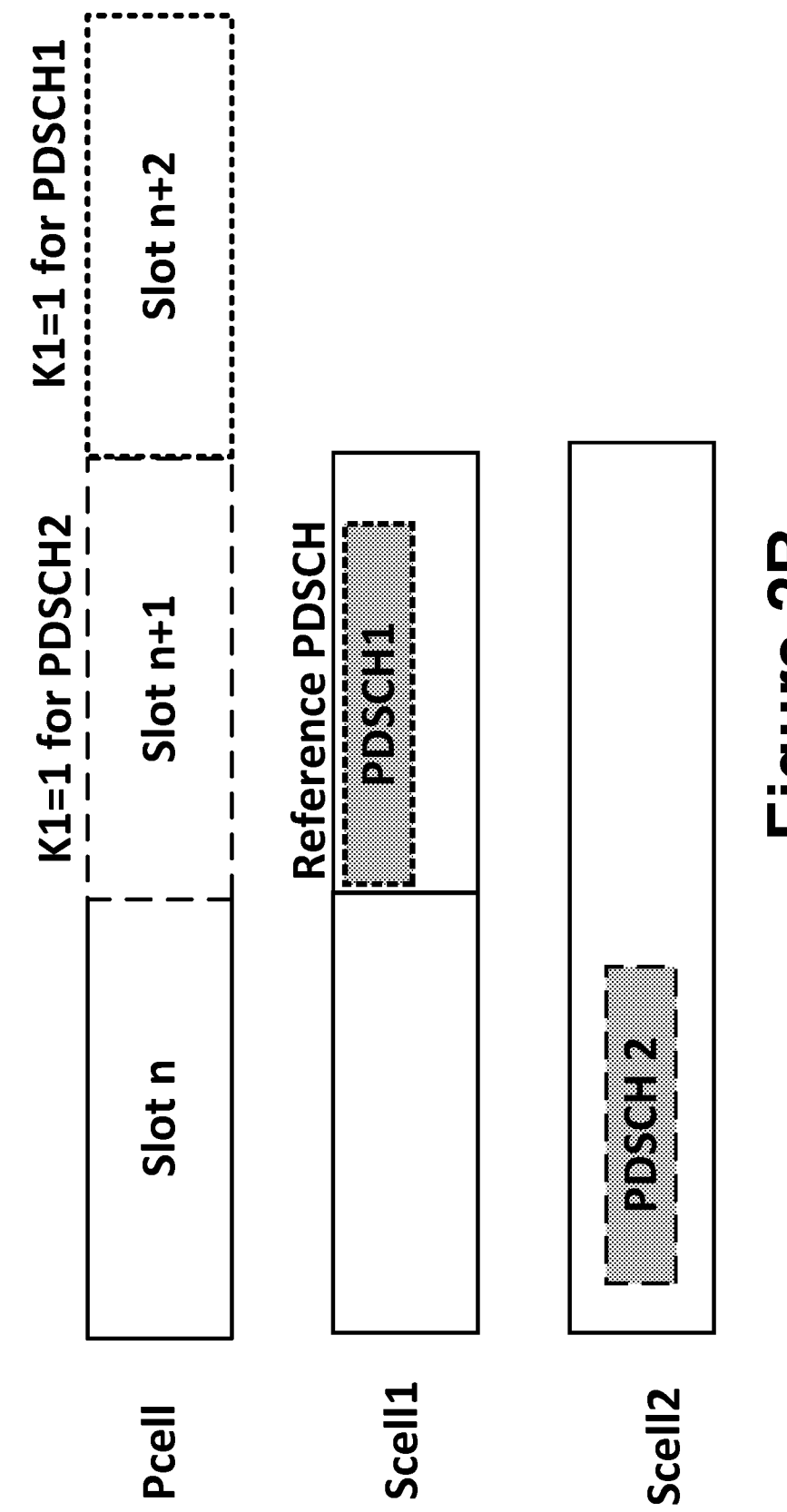

For example, a DCI schedules 2 PDSCHs on Scell1 and Scell 2 respectively. As shown in FIG. 2A, SCS for Pcell is 15 KHz, SCS for Scell1 is 30 KHz, and SCS for Scell 2 is 15 KHz. gNB configures sub-slot based PUCCH for HARQ-ACK. If gNB indicates K1=1 in the DCI, the UL sub-slot derived by PDSCH1 is sub-slot n+4, and the UL slot derived by PDSCH 2 is sub-slot n+6. PUCCH slot is the last sub-slot of these two sub-slots, e.g., sub-slot n+6. PDSCH2 is the reference PDSCH. As shown in FIG. 2B, SCS for Pcell is 30 KHz, SCS for Scell1 is 30 KHz, SCS for Scell 2 is 15 KHz. gNB configures slot based PUCCH for HARQ-ACK. If gNB indicates K1=1 in the DCI, the UL slot derived by PDSCH 1 is slot n+2, and the UL slot derived by PDSCH 2 is slot n+1. PUCCH slot is the last slot of these two slots, e.g., slot n+2. PDSCH1 is the reference PDSCH.

In another embodiment, K1 slot-offset may be defined to indicate a slot or sub-slot offset from the slot/sub-slot n for scheduling PDCCH for multi-cell scheduling to the corresponding PUCCH carrying HARQ-ACK feedback. The slot/sub-slot n for scheduling PDCCH is the last UL slot/sub-slot for PUCCH transmission overlapping with the PDCCH reception, or the last UL slot/sub-slot for PUCCH transmission overlapping with the DL slot for the PDCCH reception. Then, for multiple PDSCHs scheduled by a single DCI, UL slot/sub-slot n+K1 for PUCCH transmission is determined by the UL slot/sub-slot n for scheduling PDCCH and K1.

In one embodiment, UE determines PUCCH resource within the PUCCH slot/sub-slot. To determine the PUCCH resource, detected DCIs are first indexed in an ascending order across serving cells indexes for a same PDCCH MO and are then indexed in an ascending order across PDCCH MO indexes.

In one option, if the detected DCI format is a DCI for multi-cell scheduling, the serving cell index for the detected DCI format is the index for serving cell in which the DCI is received. Alternatively, if the detected DCI schedules multi-cell PDSCH, the serving cell index for the detected DCI format is the index for serving cell in which the DCI is received.

In one example, within one PDCCH MO, a UE is not expected to receive multiple DCIs associated with same serving cell index indicating different PUCCH resource in the same PUCCH slot/sub-slot. In other words, within one PDCCH MO, UE can receive multiple DCIs associated with same serving cell index indicating same PUCCH resource, and UE can assume all the multiple DCIs are last DCIs. If the DCI is configured with Total DAI, UE expects the same T-DAI value is indicated in all last DCIs. In another example, within one PDCCH MO, a UE is not expected to detect two or more DCIs associated with same serving cell index, e.g., the UE is not expected to detect a DCI on a cell scheduling PDSCH(s) for single-cell self-carrier scheduling and another DCI format for multi-cell scheduling on the same cell.

In another option, if the detected DCI format is a DCI for multi-cell scheduling, the serving cell index for the detected DCI is the index for serving cell in which the reference PDSCH is received. The reference PDSCH for PUCCH resource is determined according to one of aforementioned options 1)~9) for PUCCH slot determination.

In this option, the reference PDSCH for PUCCH resource determination is the same reference PDSCH for PUCCH slot determination. For example, the reference PDSCH for PUCCH resource determination and PUCCH slot determination is the PDSCH with lowest or largest serving cell index or PDSCH with last ending symbol among PDSCHs scheduled by the multi-cell scheduling DCI.

If more than one PDSCHs is reference PDSCH, one PDSCH is selected and the serving cell for the selected PDSCH is the serving cell index for the detected DCI. For example, the reference PDSCH for PUCCH slot determination is the PDSCH with last-ending symbol among PDSCHs scheduled by the multi-cell scheduling DCI.

If there exist multiple reference PDSCHs with same last-ending symbol, one PDSCH with lowest serving cell index is selected from the reference PDSCHs to determine PUCCH resource.

In another option, if the detected DCI format is a DCI for multi-cell scheduling, the serving cell index for the detected DCI is the index for serving cell in which the reference PDSCH is received. The reference PDSCH for PUCCH resource determination and PUCCH slot is separately determined. The reference PDSCH for PUCCH resource determination can be the PDSCH with lowest or largest serving cell index among PDSCHs scheduled by the multi-cell scheduling DCI, or the PDSCH with smallest or largest SCS, or the PDSCH configured as reference PDSCH, etc. For example, reference PDSCH for PUCCH resource determination is a PDSCH with lowest serving cell index among PDSCHs scheduled by the multi-cell scheduling DCI, and reference PDSCH for PUCCH slot determination is a PDSCH with last-ending symbol among PDSCHs scheduled by the multi-cell scheduling DCI.

The mechanism for PUCCH resource determination can be same or different for different HARQ-ACK codebook. In one option, the serving cell index for the detected multi-cell scheduling DCI for PUCCH resource determination is the serving cell index for a PDSCH with lowest serving cell index among PDSCHs scheduled by the multi-cell scheduling DCI, which is same for type-1 and type-2 HARQ-ACK codebook. Alternatively, the serving cell index for the detected multi-cell scheduling DCI for PUCCH resource determination is the index for serving cell in which the DCI is received, which is same for type-1 and type-2 HARQ-ACK codebook.

In another option, for type-1 HARQ-ACK codebook, the serving cell index for the detected multi-cell scheduling DCI for PUCCH resource determination is the index for serving cell in which the DCI is received, and for type-2 HARQ-ACK codebook, the serving cell index for the detected multi-cell scheduling DCI for PUCCH resource determination is the serving cell index for a PDSCH with lowest serving cell index among PDSCHs scheduled by the multi-cell scheduling DCI.

Furthermore, the reference PDSCH for PUCCH resource determination and reference PDSCH for DAI ordering for type-2 HARQ-ACK codebook can be the same, or separately determined. For example, single reference PDSCH for PUCCH resource determination and DAI ordering is determined as a PDSCH with lowest serving cell index.

Embodiment 2: Type-1 HARQ-ACK Codebook Generation

For type-1 HARQ-ACK codebook (semi-static CB), UE generates HARQ-ACK for each serving cell, and concatenates the HARQ-ACK for each serving cell. For a serving cell, the HARQ-ACK bit locations are determined based on the set of K1 and Start and the set of Length Indication Value (SLIV) in time domain resource allocation (TDRA) in DCI formats. Typically, the candidate DL slot is determined by set of K1, and candidate PDSCH occasion within the candidate DL slot is determined by SLIVs. For a serving cell, DL candidate slots and candidate PDSCH locations in the DL candidate slots are determined by the union of single-cell and multi-cell scheduling. The following description focuses on multi-cell scheduling part.

Type-1 Codebook for PDSCHs on Different Serving Cells Overlapping with Different UL Slot/Sub-Slot If all serving cells within a PUCCH group are configured with single cell scheduling, for a PDSCH in slot n and a K1 value indicated in the DCI, UE reports HARQ-ACK in PUCCH UL slot n+K1. However, if multi-cell scheduling is configured, PUCCH slot is derived according to a reference PDSCH, but the reference PDSCH and other PDSCH may overlap with different UL slot/sub-slot, due to different ending symbol, or different slot for PDSCHs scheduled by a single DCI for multi-cell scheduling. Therefore, the effective K1 for PDSCHs in different serving cells can be different. Consequently, simply using K1 set for a DCI format cannot ensure all PDSCHs have corresponding PDSCH candidate location for HARQ-ACK feedback in Type-1 codebook.

Figure 3A:
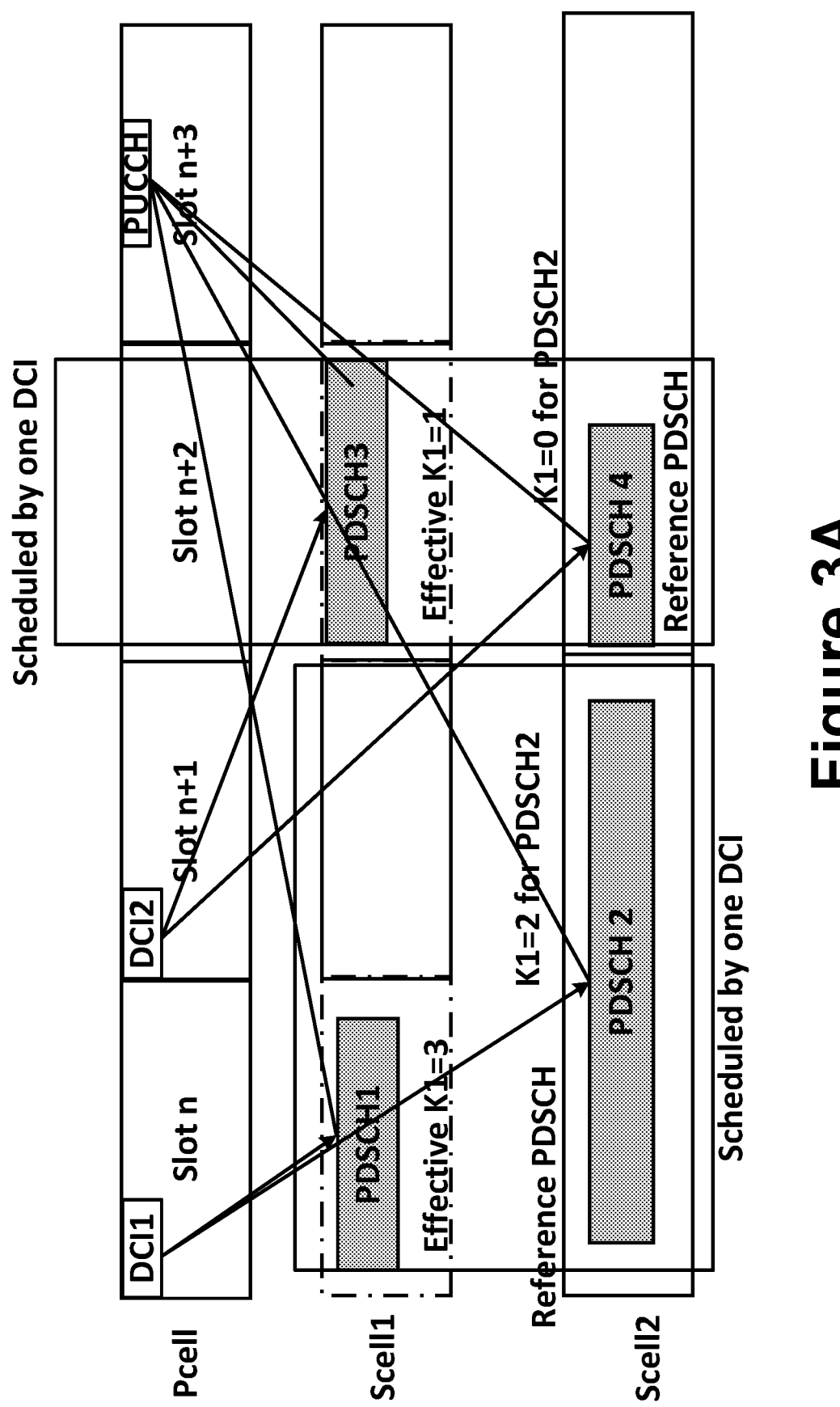
FIG. 3A illustrates an example of a missed candidate downlink (DL) slot for secondary cell 1 (SCell1) for type-1 codebook, in accordance with various embodiments.

For example, as shown in FIG. 3A, K1 set is K1={0,2}. The reference PDSCH is determined by mechanism 2) in embodiment 1. Assuming gNB schedules PDSCH1 on Scell 1 and PDSCH 2 on Scell 2 by a single DCI and indicates K1=2, reference PDSCH is PDSCH 2. And gNB schedules PDSCH3 on Scell 1 and PDSCH 4 on Scell 2 by a single DCI and indicates K1=0, reference PDSCH is PDSCH 4. For Scell 1, if K1=0 and K1=2 is used to find the DL slot on Scell 1, there is no candidate location for PDSCH1 and PDSCH3, because PDSCH 1 and PDSCH 3 is in the DL slot with effective K1=3 and K1=1 respectively.

Figure 3B:
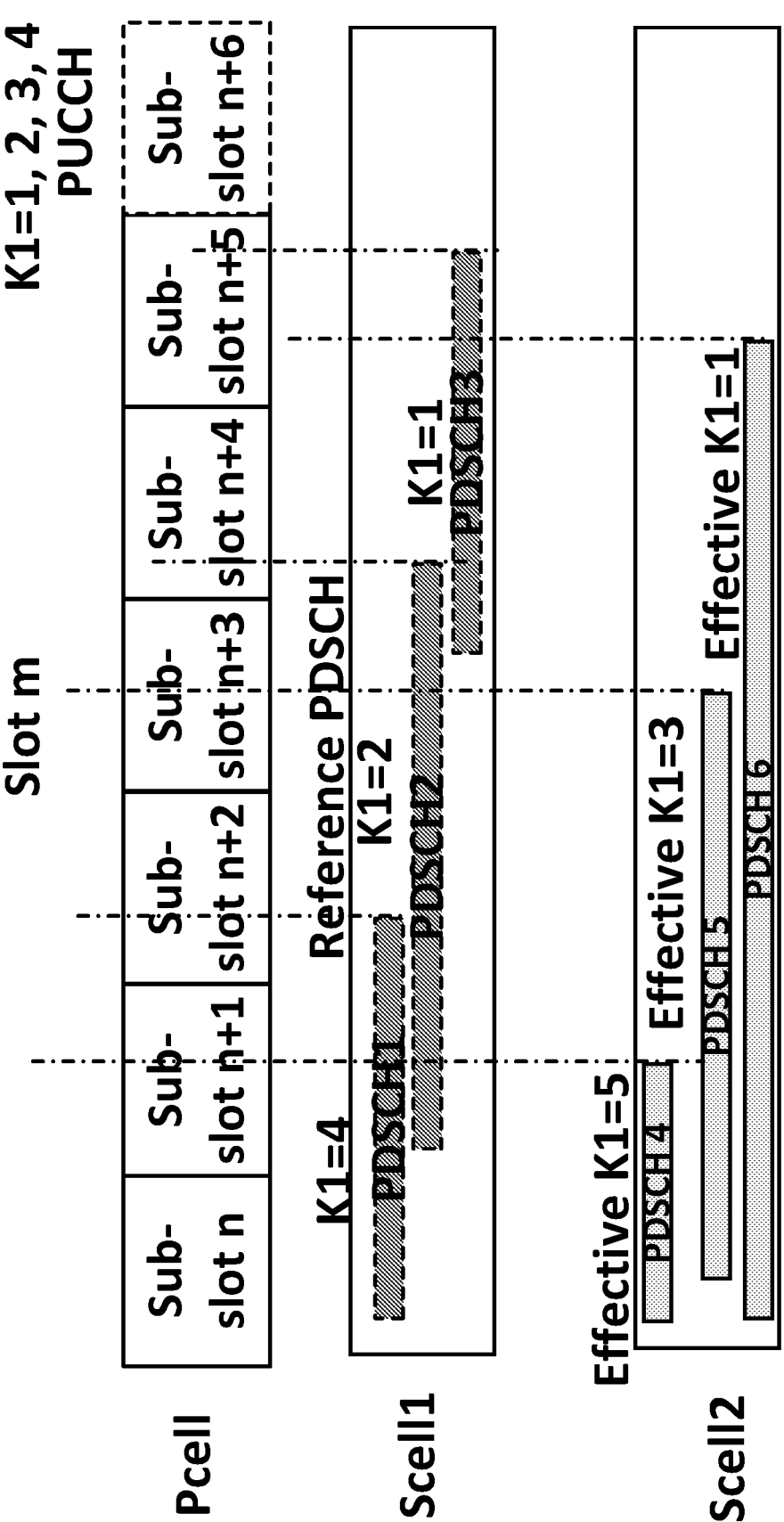
FIG. 3B illustrates an example of a missed candidate DL slot for secondary cell 2 (SCell2) for type-1 codebook, in accordance with various embodiments.

For another example, as shown in FIG. 3B, TDRA for Scell 1 and Scell 2 are separately configured. For Scell 1, PDSCH 1, 2, 3 ends in sub-slot n+2, n+4 and n+5 respectively. For Scell 2, PDSCH 5, 6, 7 ends in sub-slot n+1, n+3 and n+5 respectively. K1 set is K1={1,2,3,4}. Assuming TDRA table has 3 rows for each cell, and one TDRA bit field in DCI applies to both Scell. The PDSCH with latter ending symbol (mechanism 1 in embodiment 1) is the reference PDSCH. So, for row 1, PDSCH 1 (reference cell) and PDSCH 4 are scheduled, K1=4 is associated with PUCCH in sub-slot n+6, for row 2, PDSCH 2 (reference cell) and PDSCH 5 are scheduled, K1=2 is associated with PUCCH in sub-slot n+6, for row 3, PDSCH 3 (reference cell) and PDSCH 6 are scheduled, K1=1 is associated with PUCCH in sub-slot n+6. Therefore, if K1={1,2,3,4} is used for Scell 1 and Scell 2 for candidate DL slot determination, there is no candidate location for PDSCH 4, because the effective K1=5 for PDSCH 4. To resolve this problem, K1 extension is needed.

In one embodiment, to determine candidate DL slot, K1 for each DL serving cell is determined based on configured K1 set, and the relation between the time domain resources for PDSCHs of the DL serving cell and the reference PDSCH/cell for PUCCH slot determination. Alternatively, to determine candidate DL slot, K1 for each DL serving cell is determined based on configured K1 set, and the relation between UL slot/sub-slot n for each DL serving cell and UL slot/sub-slot n for the reference PDSCH/cell for PUCCH slot determination. Alternatively, to determine candidate DL slot, K1 for each DL serving cell is determined based on configured K1 set, and the relation between UL slot/sub-slot n for each DL serving cell and UL slot/sub-slot for PUCCH.

In case of same SCS for all PDSCHs scheduled by a single DCI, the relation between the time domain resources for PDSCHs of the DL serving cell and the reference PDSCH/cell for PUCCH slot determination, or the relation between UL slot/sub-slot for PDSCHs and reference PDSCH/cell can be simply derived by K0 difference with regard to SCS difference between PUCCH SCS and PDSCH SCS. For example, for one row in TDRA table, $K_{0,1}$=0 for cell 1 and $K_{0,2}$=3 for cell2, SCS for both cell 1 and cell 2 is based on μDL, assuming PDSCH on cell 2 is reference PDSCH, then, K1 can be extended for cell 1 to determine candidate DL slot by $K_{1,T}$=$K_{1,T}$∪($K_1$+⌈$(K_{0,2}-K_{0,1})$·$2^{\mu UL-\mu DL}$⌉)∪($K_1$+⌊$(K_{0,2}-K_{0,1})$·$2^{\mu UL-\mu DL}$⌋). It is noted that the SCS for PDSCH scheduled by different SCS can be same or different.

In case of different SCS for all PDSCHs scheduled by single DCI, to determine candidate DL slot for each cell, the transformation between multiple K0 for multiple PDSCHs is needed, with consideration of at least one of μUL for PUCCH, μDL for each PDSCH, μDL for PDCCH and PDCCH MO location. For example shown in FIG. 1, for a row with K0,1=K0,2=0, both two possibilities of time domain relation between PDSCH1 and PDSCH2 should be taken into account to determine candidate DL slot.

Whether to allow different SCS for all PDSCH scheduled by a single DCI can be pre-defined or configured by gNB.

In one option, the scheduled cells by a single DCI and the TDRA table are indicated by separate bit field. For example, one bit field for cells indication with L1 bits for $2^{L1}$ sets of cells for scheduling, and one or multiple bit field for TDRA table which applies to all the scheduled cells within a PDSCH group. UE determines multiple sets of time domain resources for PDSCHs of multiple cells according to the $2^{L1}$ sets of cells. For example, for each row of TDRA table and each set of cells, UE determines the reference PDSCH out of the cells in the set, and UE determines the effective K1 according the slot/sub-slot offset between the reference PDSCH and other PDSCHs for each cell of the set for the row. Then, UE determines effective K1 for corresponding cells for all rows and all sets of cells. Finally, UE determines candidate DL slots for type-1 HARQ-ACK codebook for each cell according to the effective K1 for the cell.

In one option, the scheduled cells by a single DCI and the TDRA table are indicated by a single bit field. For example, gNB configures L rows for TDRA table, and gNB configures a set of cells to be scheduled in each row. For each row, UE determines the reference PDSCH out of the set of cells configured for the row, and UE determines the effective K1 according the slot/sub-slot offset between the reference PDSCH and other PDSCHs for each cell of the set for the row. Then, UE determines effective K1 for corresponding cells for all rows and all sets of cells. Finally, UE determines candidate DL slots for type-1 HARQ-ACK codebook for each cell according to the effective K1 for the cell.

In one example, effective K1 is derived by K1 and slot/sub-slot offset between the reference PDSCH and other PDSCHs for each cell which is determined by SLIVs and K0 for each PDSCH. In case of different SCS for different serving cells, effective K1 is derived by K1 and effective slot/sub-slot offset between the reference PDSCH and other PDSCHs for each cell, where the effective slot/sub-slot offset is derived by SCS for PUCCH, reference PDSCH and other PDSCHs, and SLIV and K0 for each PDSCH.

Figure 4:
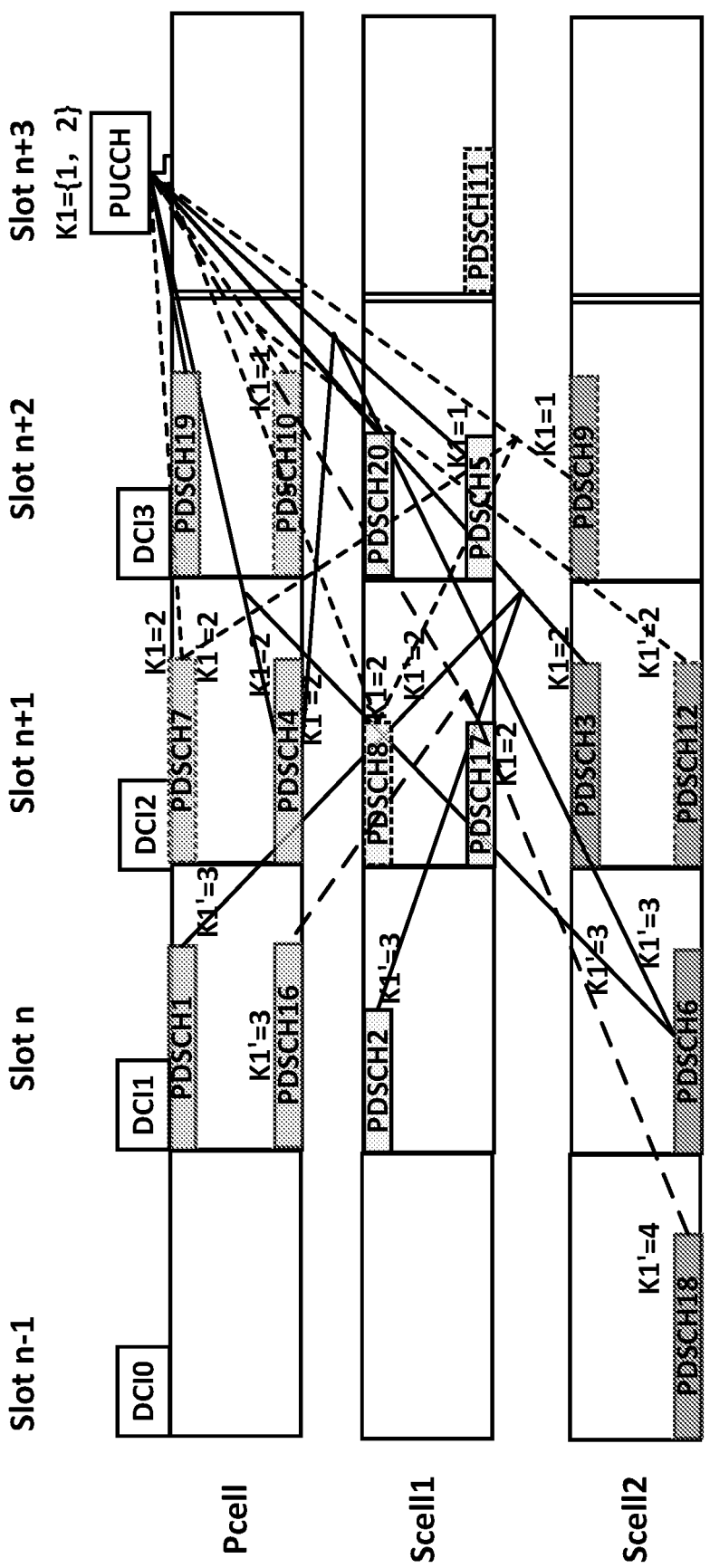
FIG. 4 illustrates an example of an effective K1 for PDSCHs with HARQ-ACK in a physical uplink control channel (PUCCH) in slot n+3, in accordance with various embodiments.

Assuming a UE is configured with 3 UL CCs for multi-cell scheduling, time domain resources for each UL CC is shown in Table 1-1, with a TDRA with 2 rows, UL CC combinations for scheduling is shown in Table 1-2, with 4 states (L1=2 bits), and the TDRA for each CC combination is shown in Table 1-3, with 8 possibilities, for a given PDCCH MO in slot n. PDSCHs are denoted as PDSCH 1~PDSCH 6. For a PDCCH MO in slot n+1, there are also 8 possibilities, PDSCHs are denoted as PDSCH 7~PDSCH12, which are exactly one slot delay of PDSCH 1~PDSCH 6. And for a PDCCH MO in slot n−1, there are also 8 possibilities, PDSCHs are denoted as PDSCH 13~PDSCH18, which are exactly one slot advance of PDSCH 1~PDSCH 6. For a PDCCH MO in slot n+2, there are also 8 possibilities, PDSCHs are denoted as PDSCH 19~PDSCH 24, which are exactly one slot delay of PDSCH 7~PDSCH 12. As shown in FIG. 4, PUCCH UL slot is UL slot n+3, K1 set is {1,2}. Then, the set of CCs with the reference PDSCH located in slot n+2 and slot n+1 can report HARQ-ACK in the UL slot n+3. For a PDCCH MO in slot n+2, there are also 8 possibilities, PDSCHs are denoted as PDSCH 19~PDSCH 24, which are exactly one slot delay of PDSCH 7~PDSCH 12.

In slot n+2, there are PDSCH 5, PDSCH 9, PDSCH 10, PDSCH 19 and 20 with indicated K1=1

Accordingly, other PDSCHs which are scheduled together with PDSCH 5 (reference PDSCH), PDSCH 9 (reference PDSCH) and PDSCH 10 (reference PDSCH) respectively can also provide HARQ-ACK in UL slot n+3. The effective K1 for these PDSCHs should be derived, which is based on the slot-offset K0 between the reference PDSCH and other PDSCHs. Because PDSCH 19 and 20 are scheduled together with same K0, so there is no additional effective K1 for PDSCH 19& 20.

For DCI in slot n, PDSCHs associated with index 5, 7, 8 in table 1-3 use PDSCH5 as reference PDSCH, so, slot offset between PDSCH 4 and 5 (offset=1) is used to derive effective K1 for PDSCH4, and slot offset between PDSCH 6 and PDSCH 5 (offset=2) is used to derive effective K1 for PDSCH 6.

For DCI in slot n+1, PDSCH 7 and PDSCH 8 uses PDSCH9 as reference PDSCH, PDSCH 12 uses PDSCH 10 as reference PDSCH, so, slot offset between PDSCH 7 and 9 (offset=1) is used to derive effective K1 for PDSCH7, slot offset between PDSCH 8 and 9 (offset=1) is used to derive effective K1 for PDSCH8, and slot offset between PDSCH 12 and PDSCH 10 (offset=1) is used to derive effective K1 for PDSCH 12.

In slot n+1, there are PDSCH 3, PDSCH 4, PDSCH 7, PDSCH 8 and PDSCH 17 with indicated K1=2.

Accordingly, other PDSCHs which are scheduled together with these PDSCHs (using these PDSCH as reference PDSCH) respectively can also provide HARQ-ACK in UL slot n+3. The effective K1 for these PDSCHs should be derived, which is based on the slot-offset K0 between the reference PDSCH and other PDSCHs. Because PDSCH 7 and 8 are scheduled together with same K0, so there is no additional effective K1 for PDSCH 19& 20.

For DCI in slot n, PDSCH 1 and PDSCH 2 uses PDSCH 3 as reference PDSCH, so, the slot offset=1 is used to derive effective K1 for PDSCH 1 and PDSCH 2. PDSCH 6 uses PDSCH 4 as reference PDSCH, so the slot offset=1 is used to derive effective K1 for PDSCH 6.

For DCI in slot n−1, PDSCH 16 and PDSCH 18 uses PDSCH 17 as reference PDSCH, so, the slot offset=1 and 2 are used to derive effective K1 for PDSCH 16 and 18 respectively.

Table 1-4 provides all possibilities for the TDRA & CC combination for each K1 value. With K1=1 and K1=2, there are totally 16 possibilities. For each possibility, the reference PDSCH is located in a slot derived by PUCCH slot and one K1 value, and other PDSCHs are located in a slot derived by TDRA for each row and CC combination. Therefore, for Pcell, effective K1'={2,3}. DL candidate slot for Pcell is determined by the union of K1 and K1', e.g., {1,2,3}. For Scell1, effective K1'={2,3}. DL candidate slot for Scell1 is determined by the union of K1 and K1', e.g., {1,2,3}. For Scell2, effective K1'={2,3,4}. DL candidate slot for Scell2 is determined by the union of K1 and K1', e.g., {1,2,3,4}.

TABLE 1-1

| 1 bits TDRA for multiple cells for multi-cell scheduling | | | |
|---|---|---|---|
| | TDRA Pcell | TDRA Scell1 | TDRA Scell 2 |
| 1st row | K0 = 0 Symbol #0~10 | K0 = 0 Symbol #0~6 | K0 = 1 Symbol #0~10 |
| 2nd row | K0 = 1 Symbol #0~10 | K0 = 2 Symbol #0~6 | K0 = 0 Symbol #0~10 |

TABLE 1-2

| 2-bits CC combination for multi-cell scheduling | |
|---|---|
| CC combination 1 | Pcell + Scell1 |
| CC combination 2 | Pcell + Scell 2 |
| CC combination 3 | Scell1 + Scell2 |
| CC combination 4 | Pcell + Scell1 + Scell 2 |

TABLE 1-3

Time domain resource for PDSCHs for each CC combination for multi-cell scheduling

| Index | DL slots for PDSCHs on scheduled CCs (assume PDCCH in slot n) | Reference PDSCH | Slot offset between reference and non-reference PDSCH |
|---|---|---|---|
| 1 | TDRA 1st row + CC combination 1 | PDSCH1 on Pcell in slot n, symbol #0~10 PDSCH2 on Scell1 in slot n, symbol #0~6 | PDSCH1 in slot n | 0 |
| 2 | TDRA 1st row + CC combination 2 | PDSCH1 on Pcell in slot n, symbol #0~10 PDSCH3 on Scell2 in slot n + 1, symbol ##0~10 | PDSCH3 in slot n + 1 | 1 for Pcell |
| 3 | TDRA 1st row + CC combination 3 | PDSCH2 on Scell1 in slot n, symbol #0~6 PDSCH3 on Scell2 in slot n + 1, symbol ##0~10 | PDSCH3 in slot n + 1 | 1 for Scell1 |
| 4 | TDRA 1st row + CC combination 4 | PDSCH1 on Pcell in slot n, symbol #0~10 PDSCH2 on Scell1 in slot n, symbol #0~6 PDSCH3 on Scell2 in slot n + 1, symbol ##0~10 | PDSCH3 in slot n + 1 | 1 for Pcell and Scell1 |
| 5 | TDRA 2nd row + CC combination 1 | PDSCH4 on Pcell in slot n + 1, symbol #0~10 PDSCH5 on Scell1 in slot n + 2, symbol #0~6 | PDSCH5 in slot n + 2 | 1 for Pcell |
| 6 | TDRA 2nd row + CC combination 2 | PDSCH4 on Pcell in slot n + 1, symbol #0~10 PDSCH6 on Scell2 in slot n, symbol #0~10 | PDSCH4 in slot n + 1 | 1 for Scell2 |
| 7 | TDRA 2nd row + CC combination 3 | PDSCH5 on Scell1 in slot n + 2, symbol #0~6 PDSCH6 on Scell2 in slot n, symbol #0~10 | PDSCH 5 in slot n + 2 | 2 for Scell 2 |
| 8 | TDRA 2nd row + CC combination 4 | PDSCH4 on Pcell in slot n + 1, symbol #0~10 PDSCH5 on Scell1 in slot n + 2, symbol #0~6 PDSCH6 on Scell2 in slot n, symbol #0~10 | PDSCH 5 in slot n + 2 | 1 for Pcell 2 for Scell2 |

TABLE 1-4

Time domain resource for PDSCHs for each CC combination for multi-cell scheduling for each K1

| Index | DL slots for PDSCHs on scheduled CCs | Reference PDSCH | Slot offset between reference and non-reference PDSCH |
|---|---|---|---|
| 1 | TDRA 1st row + CC combination 1 K1 = 1 | PDSCH19 on Pcell in slot n + 2, symbol #0~10 PDSCH 20 on Scell1 in slot n + 2, symbol #0~6 | PDSCH 19 in slot n + 2 | 0 |

TABLE 1-4-continued

| Index | DL slots for PDSCHs on scheduled CCs | Reference PDSCH | Slot offset between reference and non-reference PDSCH |
|---|---|---|---|
| | Time domain resource for PDSCHs for each CC combination for multi-cell scheduling for each K1 | | |
| 2 TDRA 1st row + CC combination 2 K1 = 1 | PDSCH 7 on Pcell in slot n + 1, symbol #0~10 PDSCH 9 on Scell2 in slot n + 2, symbol ##0~10 | PDSCH 9 in slot n + 2 | 1 for Pcell |
| 3 TDRA 1st row + CC combination 3 K1 = 1 | PDSCH 8 on Scell1 in slot n + 1, symbol #0~6 PDSCH9 on Scell2 in slot n + 2, symbol ##0~10 | PDSCH 9 in slot n + 2 | 1 for Scell1 |
| 4 TDRA 1st row + CC combination 4 K1 = 1 | PDSCH 7 on Pcell in slot n + 1, symbol #0~10 PDSCH 8 on Scell1 in slot n + 1, symbol #0~6 PDSCH 9 on Scell2 in slot n + 2, symbol ##0~10 | PDSCH 9 in slot n + 2 | 1 for Pcell and Scell1 |
| 5 TDRA 2nd row + CC combination 1 K1 = 1 | PDSCH 4on Pcell in slot n + 1, symbol #0~10 PDSCH 5 on Scell1 in slot n + 2, symbol #0~6 | PDSCH 5 in slot n + 2 | 1 for Pcell |
| 6 TDRA 2nd row + CC combination 2 K1 = 1 | PDSCH10 on Pcell in slot n + 2, symbol #0~10 PDSCH12 on Scell2 in slot n + 1, symbol #0~10 | PDSCH 10 in slot n + 2 | 1 for Scell2 |
| 7 TDRA 2nd row + CC combination 3 K1 = 1 | PDSCH5 on Scell1 in slot n + 2, symbol #0~6 PDSCH6 on Scell2 in slot n, symbol #0~10 | PDSCH 5 in slot n + 2 | 2 for Scell2 |
| 8 TDRA 2nd row + CC combination 4 K1 = 1 | PDSCH4 on Pcell in slot n + 1, symbol #0~10 PDSCH5 on Scell1 in slot n + 2, symbol #0~6 PDSCH6 on Scell2 in slot n, symbol #0~10 | PDSCH 5 in slot n + 2 | 1 for Pcell 2 for Scell2 |
| 9 TDRA 1st row + CC combination 1 K1 = 2 | PDSCH 7 on Pcell in slot n + 1, symbol #0~10 PDSCH 8 on Scell1 in slot n + 1, symbol #0~6 | PDSCH 7 in slot n + 1 | 0 |
| 10 TDRA 1st row + CC combination 2 K1 = 2 | PDSCH 1 on Pcell in slot n, symbol #0~10 PDSCH 3 on Scell2 in slot n + 1, symbol ##0~10 | PDSCH 3 in slot n + 1 | 1 for Pcell |
| 11 TDRA 1st row + CC combination 3 K1 = 2 | PDSCH2 on Scell1 in slot n, symbol #0~6 PDSCH 3 on Scell2 in slot n + 1, symbol ##0~10 | PDSCH 3 in slot n + 1 | 1 for Scell1 |
| 12 TDRA 1st row + CC combination 4 K1 = 2 | PDSCH 1 on Pcell in slot n, symbol #0~10 PDSCH 2 on Scell1 in slot n, symbol #0~6 PDSCH 3 on Scell2 in slot n + 1, symbol ##0~10 | PDSCH 3 in slot n + 1 | 1 for Pcell and Scell1 |
| 13 TDRA 2nd row + CC combination 1 K1 = 2 | PDSCH 16 on Pcell in slot n, symbol #0~10 PDSCH 17 on Scell1 in slot n + 1, symbol #0~6 | PDSCH 17 in slot n + 1 | 1 for Pcell |
| 14 TDRA 2nd row + CC combination 2 K1 = 2 | PDSCH 4 on Pcell in slot n + 1, symbol #0~10 PDSCH 6 on Scell2 in slot n, symbol #0~10 | PDSCH 4 in slot n + 1 | 1 for Scell2 |
| 15 TDRA 2nd row + CC combination 3 K1 = 2 | PDSCH 17 on Scell1 in slot n + 1, symbol #0~6 PDSCH 18 on Scell2 in slot n~1, symbol #0~10 | PDSCH 17 in slot n + 1 | 2 for Scell 2 |
| 16 TDRA 2nd row + CC combination 4 K1 = 2 | PDSCH 16 on Pcell in slot n, symbol #0~10 PDSCH 17 on Scell1 in slot n + 1, symbol #0~6 PDSCH 18 on Scell2 in slot n~1, symbol #0~10 | PDSCH 17 in slot n + 1 | 1 for Pcell 2 for Scell2 |

TABLE 1-4-continued

Time domain resource for PDSCHs for each CC combination for multi-cell scheduling for each K1

In another example, slot/sub-slot offset between the reference PDSCH and other PDSCHs for each cell is determined by SLIVs for each PDSCH, with the assumption that PDSCHs are in the same DL slot. For example, for sub-slot based PUCCH, assuming all PDSCHs are in the same DL slot, but these PDSCHs may overlap with different UL sub-slots due to different ending symbol.

In one example, if UE is configured with slot-based PUCCH, UE determines the reference PDSCH and the candidate DL slot of the reference PDSCH according to K1 set (denoted as reference candidate DL slot), and UE determines candidate DL slots for other PDSCHs on other cells, if the candidate DL slots overlaps with the reference candidate DL slot.

In one embodiment, the candidate DL slot is determined by the set of K1. HARQ-ACK for a PDSCH with HARQ-ACK in slot n is transmitted in a DL candidate slot n-K1, while the PDSCH can be located in a DL slot other than DL candidate slot n-K1. The linkage between the actual time domain resource (DL slot and symbols) for a PDSCH and the HARQ-ACK location (PDSCH candidate location as well as DL candidate slot) is determined by a pre-defined rule. UE does not expect gNB to schedule a PDSCH associated with a HARQ-ACK location i and a PDSCH in the candidate location i to report HARQ-ACK in a same HARQ-ACK codebook. For example, if a first PDSCH in slot n is associated with a HARQ-ACK candidate location in slot m, gNB cannot schedule a second PDSCH in slot m overlaps with the HARQ-ACK candidate location in slot m to report HARQ-ACK in the same PUCCH with the first PDSCH. The HARQ-ACK location for a PDSCH is determined by the DL slot of the PDSCH cell overlapping with the DL slot of reference PDSCH and K1. Alternatively, the HARQ-ACK location for a PDSCH is determined by the DL slot of the PDSCH cell overlapping with the UL slot overlaps with the reference PDSCH and K1. Furthermore, If SCS for a PDSCH and reference PDSCH is different, HARQ-ACK location for the PDSCH is in the last DL slot overlaps with the DL slot of reference PDSCH. For example, if reference PDSCH with SCS=15 KHz is in slot n which overlaps with 2 DL slots with SCS=30 KHz (DL slot m and slot m+1), then, a PDSCH with SCS=30 KHz is associated with HARQ-ACK location in slot m+1.

If the TDRA for a PDSCH is valid, e.g., located in DL symbols, the associated HARQ-ACK location in the DL candidate slot is also valid, e.g., the SLIV should not be deleted.

Figure 5:
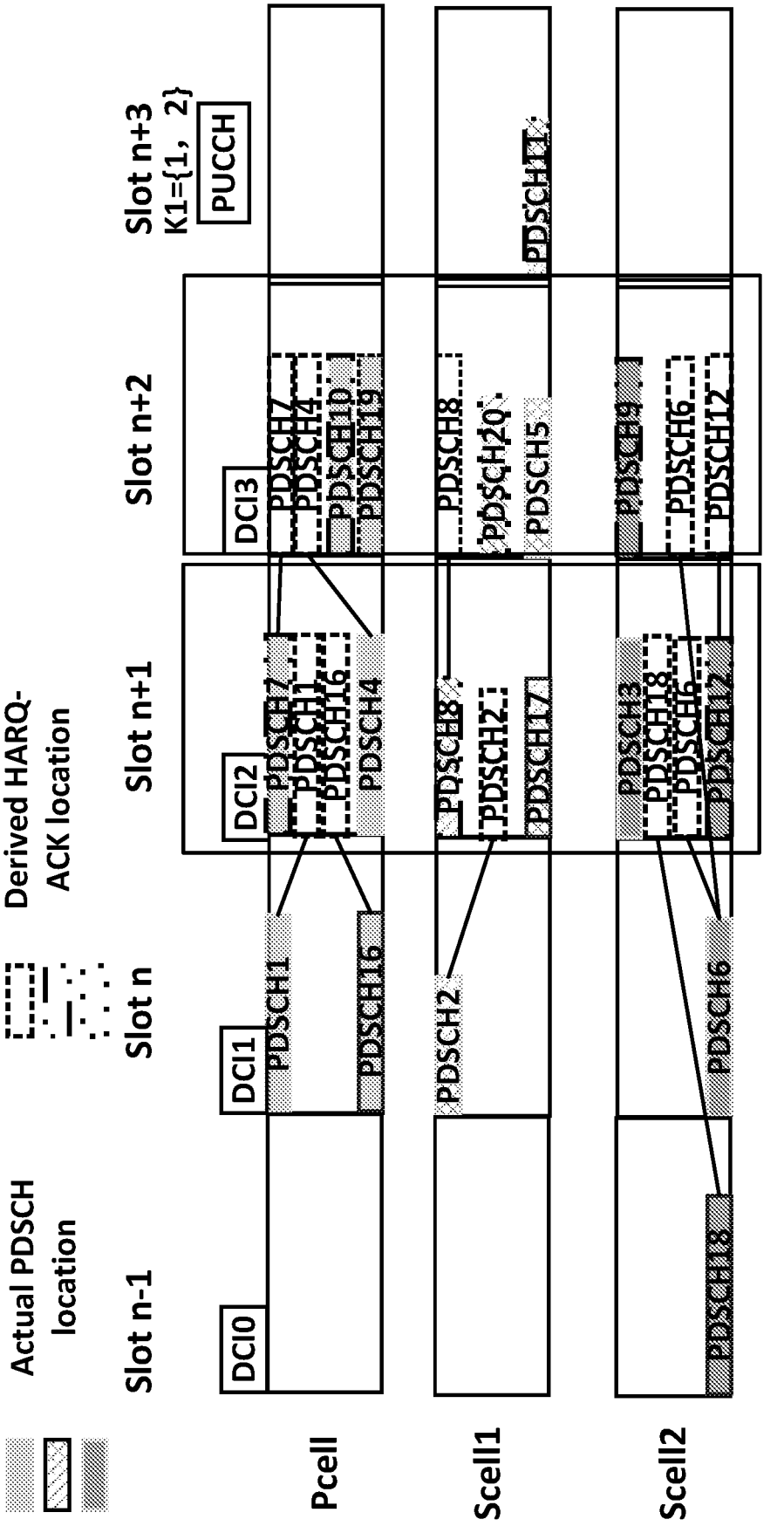
FIG. 5 illustrates an example of HARQ-ACK location for PDSCHs in HARQ-ACK in PUCCH in slot n+3, in accordance with various embodiments.
Figure 6:
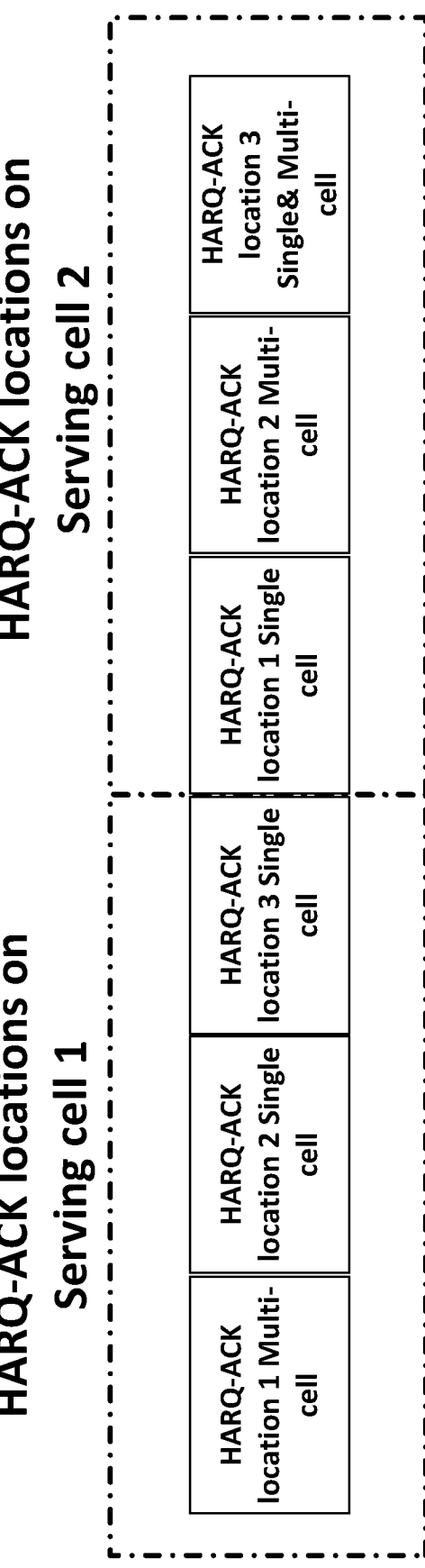
FIG. 6 illustrates an example of mixed HARQ-ACK locations for single and multi-cell scheduling, in accordance with various embodiments.

Still, taking table 1-1-1-3 as an example. In table 1-3, for an index i, HARQ-ACK location for a PDSCH other than reference PDSCH is in the same DL slot as the reference PDSCH. As shown in FIG. 5, PUCCH UL slot is UL slot n+3, K1 set is {1,2}. Then, the set of CCs with the reference PDSCH located in slot n+2 and slot n+1 can report HARQ-ACK in the UL slot n+3.

In slot n+2, there are PDSCH 5, PDSCH 9, PDSCH 10, PDSCH 19 and PDSCH 20 with indicated K1=1

So, other PDSCHs which are scheduled together with PDSCH 5 (reference PDSCH), PDSCH 9 (reference PDSCH) and PDSCH 10 (reference PDSCH) respectively can also provide HARQ-ACK in UL slot n+3. The HARQ-ACK locations for these PDSCHs should be also in slot n+2. The linkage between these PDSCHs and HARQ-ACK locations is derived.

For DCI in slot n, PDSCHs associated with index 5, 7, 8 in table 1-3 use PDSCH5 as reference PDSCH. so, in slot n+2, in addition to HARQ-ACK location for PDSCH 5 (it is exactly the same as TDRA for PDSCH 5), there is an associated HARQ-ACK location for PDSCH 4 and PDSCH 6 respectively.

For DCI in slot n+1, in addition to HARQ-ACK location for PDSCH 9 (it is exactly the same as TDRA for PDSCH 9), there is an associated HARQ-ACK location for PDSCH 7 and PDSCH 8 respectively, and, in addition to HARQ-ACK location for PDSCH 10 (it is exactly the same as TDRA for PDSCH 10), there is also an associated HARQ-ACK location for PDSCH 12.

In slot n+1, there are PDSCH 3, PDSCH 4, PDSCH 7, PDSCH 8 and PDSCH 17 with indicated K1=2.

So, other PDSCHs which are scheduled together with these PDSCHs (using these PDSCH as reference PDSCH) respectively can also provide HARQ-ACK in UL slot n+3. The HARQ-ACK locations for these PDSCHs should be also in slot n+1. The linkage between these PDSCHs and HARQ-ACK locations is derived.

For DCI in slot n, in addition to HARQ-ACK location for PDSCH 3 (it is exactly the same as TDRA for PDSCH 3), there is an associated HARQ-ACK location for PDSCH 1 and PDSCH 2 respectively. And, in addition to HARQ-ACK location for PDSCH 4 (it is exactly the same as TDRA for PDSCH 4), there is an associated HARQ-ACK location for PDSCH 6.

For DCI in slot n−1, in addition to HARQ-ACK location for PDSCH 17 (it is exactly the same as TDRA for PDSCH 17), there is an associated HARQ-ACK location for PDSCH 16 and PDSCH 18 respectively.

Therefore, for Pcell, with K1={1,2}, there are candidate PDSCH location for PDSCH 4, 7, 10 in DL slot n+2, and PDSCH 1, 14, 16 in DL slot n+1. For Scell1, with K1={1,2}, there are candidate PDSCH location for PDSCH 5, 8 in DL slot n+2, and PDSCH 2, 17 in DL slot n+1. For Scell1, with K1={1,2}, there are candidate PDSCH location for PDSCH 6, 9, 12 in DL slot n+2, and PDSCH 3, 18 in DL slot n+1.

In one example, if more than one candidate PDSCH locations are associated with the same PDSCH, only one candidate PDSCH location is reserved. E.g., PDSCH 4 is associated with HARQ-ACK location in DL slot n+1 (as reference PDSCH) and PDSCH 4 is also associated with HARQ-ACK location in DL slot n+2 (as non-reference PDSCH). And also, PDSCH 6 is associated with HARQ-ACK location in DL slot n+1 (with PDSCH 4 as reference PDSCH) and PDSCH 6 is associated with HARQ-ACK location in DL slot n+2 (with PDSCH 5 as reference PDSCH). The location for reference PDSCH should be prioritized for the reservation. If all locations are for non-reference PDSCH, one location is chosen, e.g., 1st location or last location. In another example, if more than one candidate PDSCH locations are associated with the same PDSCH, all candidate PDSCH locations are reserved.

For above embodiments, in a DL candidate slot, there can be multiple candidate PDSCH locations. To determine the candidate PDSCH locations for HARQ-ACK feedback, a set of SLIVs are firstly determined, and then, some SLIVs of the set can be deleted. To determine the set of SLIVs, in one option, for one serving cell, only the SLIVs which could be scheduled for the serving cell is considered. For example, if a row of TDRA includes multiple SLIVs for multiple PDSCH, and the number of SLIVs is larger than the number of CCs to be scheduled, then, some SLIVs are not scheduled for any serving cell. Such un-schedulable SLIVs are excluded from the set of SLIVs. For another example, as shown in Table 1-1, each row includes SLIVs for all cell configured for multi-cell scheduling. With the CC combination indication, SLIVs for the indicated CCs are used for PDSCHs for each indicated CC. Therefore, for a serving cell i, only i-th SLIV which is configured for the serving cell i for each row in TDRA table belong to the set of SLIVs. In another option, for one serving cell, all SLIVs configured in TDRA table are taken into account, regardless of whether the SLIV is schedulable for the serving cell. To reduce unnecessary redundant candidate PDSCH locations, some of SLIVs from the set can be deleted, e.g., due to overlapping in time domain, or collision with semi-static UL symbol, or being unable to provide HARQ-ACK feedback in a PUCCH slot with configured K1. The overlapped candidate PDSCH locations are associated with the same HARQ-ACK bit location. The detailed mechanism to derive HARQ-ACK bit location based on non-overlapped candidate PDSCH locations can be performed according to existing mechanism. In FIG. 5, it can be seen that the candidate PDSCH locations associated with PDSCHs in different slot in the same serving cell can be overlapped in the same DL slot, which is associated with single HARQ-ACK bit location, then, gNB cannot schedule PDSCHs associated with the overlapped candidate PDSCH locations.

In one embodiment, HARQ-ACK for the multiple PDSCHs scheduled by a single DCI for multi-cell scheduling are mapped to a HARQ-ACK location in one serving cell, e.g., in the serving cell of reference PDSCH. If a serving cell is also configured with single cell scheduling, HARQ-ACK location for single cell scheduling is determined separately for each serving cell. Then, for a serving cell, there are HARQ-ACK locations for single-cell scheduling as well as multi-cell scheduling. UE generates HARQ-ACK according to HARQ-ACK locations on each serving cell and concatenates the HARQ-ACKs in the HARQ-ACK locations on all serving cells.

In the serving cell for reference PDSCH, if a HARQ-ACK location is associated with both single and multi-cell scheduling, or associated with more than one multi-cell scheduling, the HARQ-ACK bit length Nc for the HARQ-ACK location is determined by a maximum number of HARQ-ACK bits for single cell and multi-cell scheduling. The number of HARQ-ACK bits for each PDSCH scheduled by single or multi-cell scheduling can be determined independently. For example, a HARQ-ACK location includes HARQ-ACK for a PDSCH in serving cell 1 and a PDSCH in serving cell 2 scheduled by a single DCI. If serving cell 1 is configured with 2 codewords for a PDSCH, and serving cell 2 is configured with 1 codeword, then, the HARQ-ACK location includes 3 bits, 2 bits for serving cell1 and 1 bit for serving cell 2. For another example, a HARQ-ACK location is associated with two PDSCH locations, one PDSCH location is for a PDSCH for serving cell1 by single-cell scheduling, and the other PDSCH location is for a PDSCH for serving cell1 and a PDSCH for serving cell 2 by multi-cell scheduling. If serving cell 1 is configured with 8 CBGs for single cell scheduling, and TB-based transmission for multi-cells scheduling. Then, HARQ-ACK bits for the HARQ-ACK location is maximum (8,2)=8 bits.

For a HARQ-ACK location, HARQ-ACK bits are ordered according to serving cell index, or first map HARQ-ACK for reference PDSCH and then HARQ-ACKs for other PDSCHs according to serving cell index. In case the number of valid HARQ-ACK is less than Nc, NACKs are padded.

Figure 7:
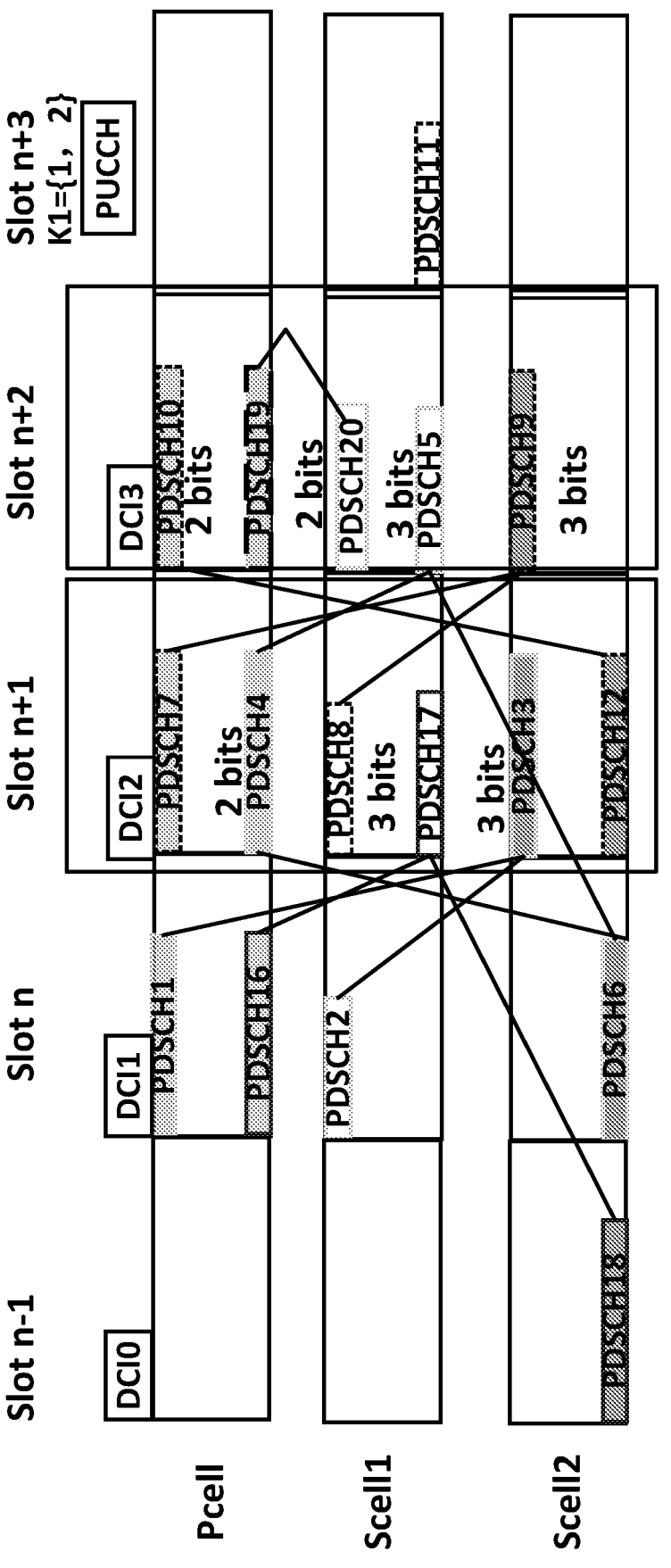
FIG. 7 illustrates an example of a HARQ-ACK location for PDSCHs with HARQ-ACK in PUCCH in slot n+3, in accordance with various embodiments.

Still, taking table 1-1-1-3 as an example. In table 1-3, for an index i, HARQ-ACK for all PDSCHs is reported in the PDSCH location of reference PDSCH. For example, for index=4, PDSCH3 on Scell 2 in slot n+1 is the reference PDSCH. Then, HARQ-ACK for PDSCH 1, PDSCH2 and PDSCH3 should be reported in the PDSCH location for PDSCH 3 in slot n+1 on Scell 2. As shown in FIG. 7, PUCCH UL slot is UL slot n+3, K1 set is {1,2}. Then, the set of CCs with the reference PDSCH located in slot n+2 and slot n+1 can report HARQ-ACK in the UL slot n+3.

In slot n+2, there are PDSCH 5, PDSCH 9, PDSCH 10, PDSCH 19 and PDSCH 20 with indicated K1=1

So, other PDSCHs which are scheduled together with PDSCH 5 (reference PDSCH), PDSCH 9 (reference PDSCH) and PDSCH 10 (reference PDSCH) respectively can also provide HARQ-ACK in UL slot n+3. The HARQ-ACK for these PDSCHs should be also included in the HARQ-ACK bit location for each reference PDSCH in slot n+2.

For DCI in slot n, for PDSCH5 as reference PDSCH, there are 3 combinations, PDSCH 4&5, PDSCH 5&6, and PDSCH 4&5&6. Then, for the candidate PDSCH location for PDSCH 5, HARQ-ACK bit length is determined by the maximum of these 3 combinations, e.g., 3 bits for PDSCH 4&5&6, assuming single TB per UL CC.

For DCI in slot n+1, for PDSCH 9 as reference PDSCH, there are 3 combinations, PDSCH 7&9, PDSCH 8&9, and PDSCH 7&8&9. Then, for the candidate PDSCH location for PDSCH 9, HARQ-ACK bit length is determined by the maximum of these 3 combinations, e.g., 3 bits for PDSCH 7&8&9, assuming single TB per UL CC. For PDSCH 10 as reference PDSCH, there is 1 combination, PDSCH 10 & 12. So, HARQ-ACK bit length is 2 bits.

In slot n+1, there are PDSCH 3, PDSCH 4, PDSCH 7, PDSCH 8 and PDSCH 17 with indicated K1=2.

So, other PDSCHs which are scheduled together with these PDSCHs (using these PDSCH as reference PDSCH) respectively can also provide HARQ-ACK in UL slot n+3. The HARQ-ACK for these PDSCHs should be also included in the HARQ-ACK bit location for each reference PDSCH in slot n+1.

For DCI in slot n, for PDSCH 3 as reference PDSCH, there are 3 combinations, PDSCH 1&3, PDSCH 2&3, and PDSCH 1&2&3. So, 3 bits for PDSCH candidate location for PDSCH 3. For reference PDSCH 4, there is 1 combination, PDSCH 4&6. So, 2 bits for PDSCH candidate location for PDSCH 4.

For DCI in slot n−1, for PDSCH 17 as reference PDSCH, there are 3 combinations, PDSCH 16&17, PDSCH 17&18, and PDSCH 16&17&18. So, 3 bits for PDSCH candidate location for PDSCH 17.

Therefore, for Pcell, with K1={1,2}, there are candidate PDSCH location for PDSCH 10 (2 HARQ-ACK bits for PDSCH 10 and PDSCH 12 respectively) in DL slot n+2, and PDSCH 4 (2 HARQ-ACK bits for PDSCH 4 and PDSCH 6 respectively) in DL slot n+1. For Scell1, with K1={1,2}, there is candidate PDSCH location for PDSCH 5 (3 HARQ-ACK bits for PDSCH 4, PDSCH 5 and PDSCH 6 respectively) in DL slot n+2, and PDSCH 17 (3 HARQ-ACK bits for PDSCH 16, PDSCH 17 and PDSCH 18 respectively) in DL slot n+1. For Scell2, with K1={1,2}, there are candidate PDSCH location for PDSCH 9 (3 HARQ-ACK bits for PDSCH 7, PDSCH 8 and PDSCH 9 respectively) in DL slot n+2, and PDSCH 3 (3 HARQ-ACK bits for PDSCH 1, PDSCH 2 and PDSCH 3 respectively) in DL slot n+1.

Type-1 Codebook for PDSCHs on Different Serving Cells Overlapping with UL Slot/Sub-Slot within K1 Set If all serving cells within a PUCCH group are configured with single cell scheduling, for a PDSCH in slot n and a K1 value indicated in the DCI, UE reports HARQ-ACK in PUCCH UL slot n+K1. However, if multi-cell scheduling is configured, PUCCH slot is derived according to a reference PDSCH, but the reference PDSCH and other PDSCH may overlap with different UL slot/sub-slot, due to different ending symbol, or different slot for PDSCHs scheduled by a single DCI for multi-cell scheduling. Therefore, the effective K1 for PDSCHs in different serving cells can be different.

To simplify DL candidate slot determination, in an embodiment, scheduling restriction could be applied to ensure effective K1 for PDSCH in a cell by multi-cell scheduling is within the set of DL slots associated with K1 set for the cell. In other words, UE does not expect to be indicated by multi-cell scheduling DCI a PDSCH that is in a DL slot associated with a effective K1 value that does not belong to the set of K1. For example, for PUCCH transmission in UL slot n, each PDSCH that is scheduled by a multi-cell scheduling DCI must correspond to a slot n-K1. Then, the candidate DL slots for each cell could be determined in a same way as that for Type1 HARQ-ACK codebook for single scheduling in Rel-15.

Figure 8:
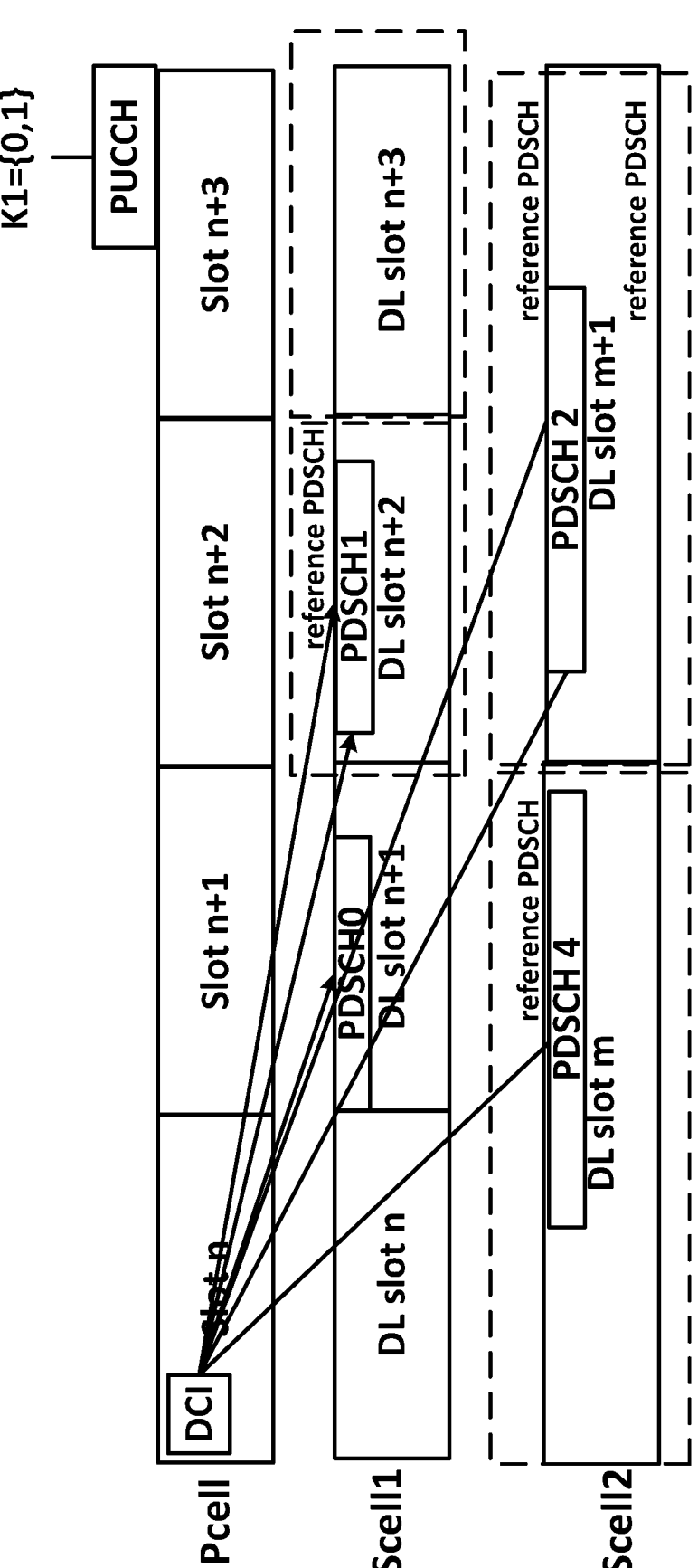
FIG. 8 illustrates an example of a HARQ-ACK location for PDSCHs with HARQ-ACK in PUCCH in slot n+3, in accordance with various embodiments.

FIG. 8 provides an example. Assuming K1={0,1}. For PUCCH in UL slot n+3, with K1=0 and 1, the DL candidate slot for each serving cell can be the DL slot overlapping with UL slot n+3 or UL slot n+2. For Pcell and Scell1, the DL candidate slot is DL slot n+3 and slot n+2. For Scell 2, the DL candidate is DL slot m and slot m+1. The scheduling for PDSCH 1 &2 by a multi-cell scheduling DCI is valid, because reference PDSCH is PDSCH 2 with K1=0 and effective K1 for PDSCH 1 is K1=1, which belongs to the K1 set. The scheduling for PDSCH 1 &4 by a multi-cell scheduling DCI is also valid, because reference PDSCH is PDSCH 1 with K1=1 and effective K1 for PDSCH 4 is K1=1, which belongs to the K1 set. But PDSCH 0 & PDSCH 2 by a multi-cell scheduling DCI is invalid, because reference PDSCH is PDSCH 2 with K1=0 and effective K1 for PDSCH 0 is K1=3, which does not belong to the K1 set.

In another embodiment, if multiple PDSCHs for multi-cell scheduling are with same SCS, effective K1 is determined by the slot offset between reference PDSCH and other PDSCHs, and the effective K1 not belong to the set of K1 is allowed. The DL candidate slot is determined by the set of K1 and effective K1. If multiple PDSCHs for multi-cell scheduling are with different SCS, UE does not expect to be indicated by multi-cell scheduling DCI a PDSCH that is in a DL slot associated with an effective K1 value that does not belong to the set of K1. The DL candidate slot is determined by the set of K1.

Figure 9A:
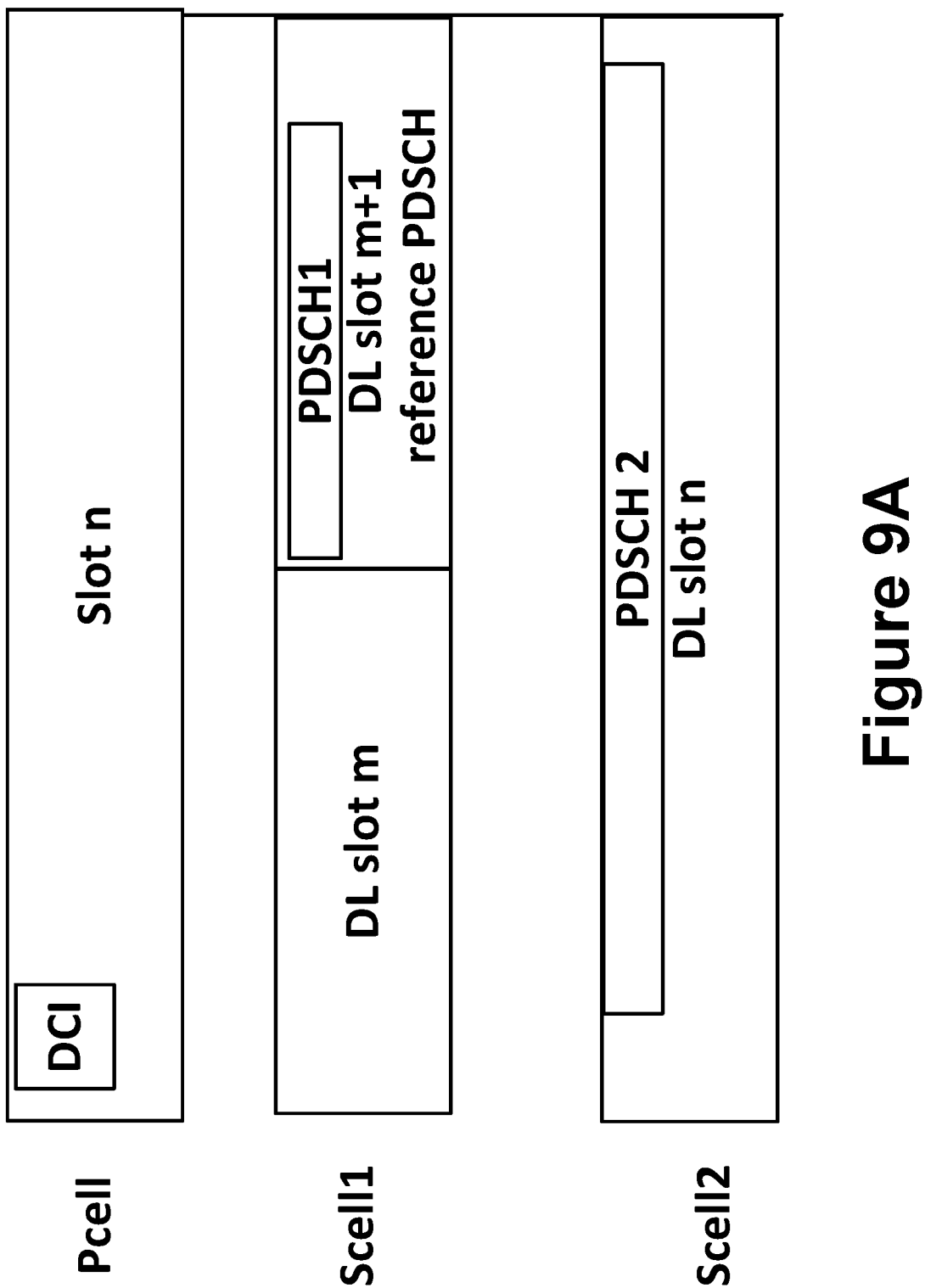
FIG. 9A illustrates an example of a valid case for multi-cell scheduling, in accordance with various embodiments.
Figure 9B:
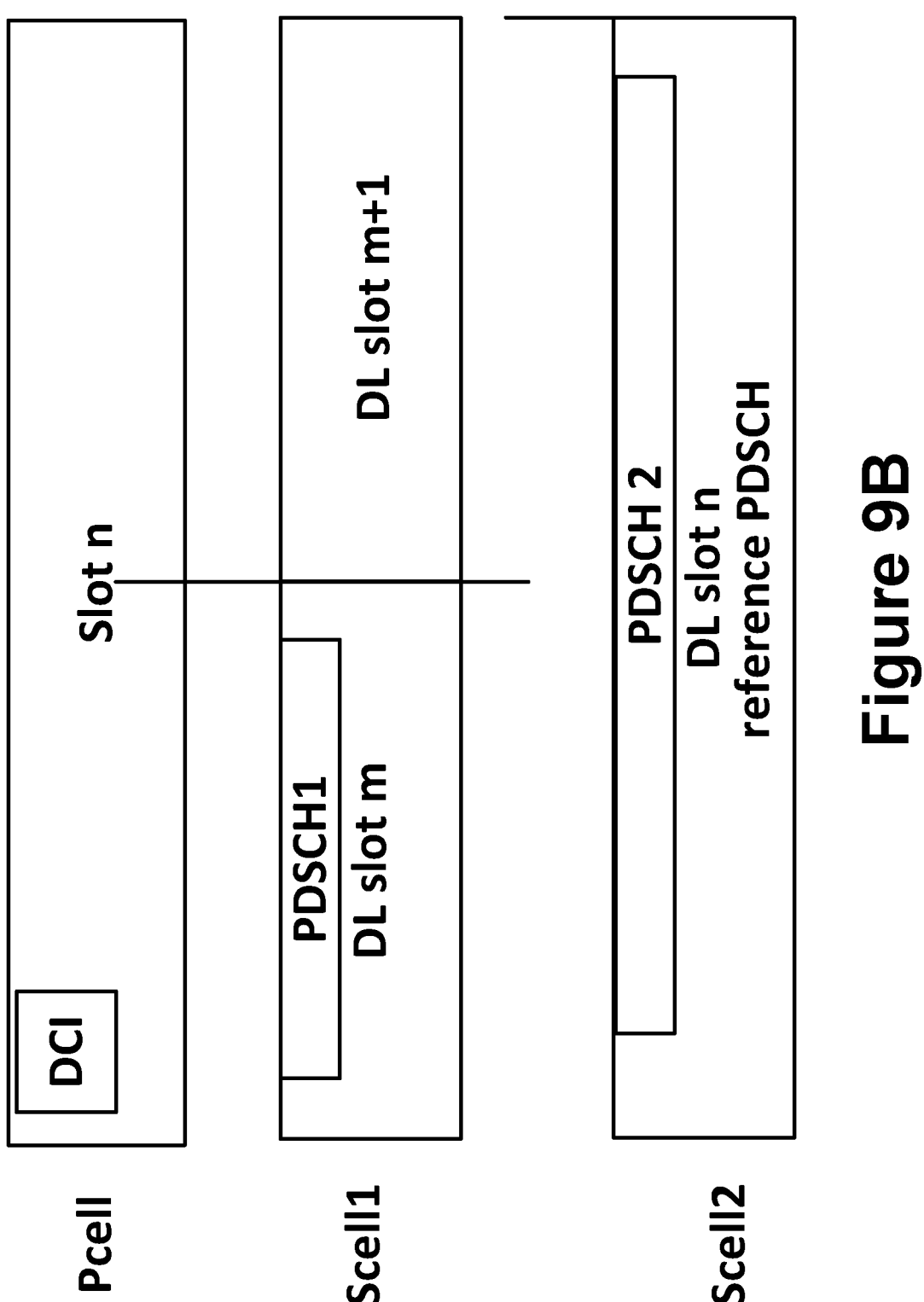
FIG. 9B illustrates an example of an error case for multi-cell scheduling, in accordance with various embodiments.

Type-1 Codebook for PDSCHs on Different Serving Cells Overlapping with Same UL Slot/Sub-Slot In an embodiment, a UE expects the DL slot ending boundary of each PDSCH on different serving cells scheduled by a single DCI for multi-cell scheduling is aligned. For example, if a UE is configured with slot-based PUCCH, K1=0 is determined by the last UL slot overlapping with the DL slot of a PDSCH. If the DL slot ending boundary of each PDSCH on different serving cells scheduled by a single DCI for multi-cell scheduling is aligned, then, the same UL slot is derived by K1 and the end of slot boundary for each PDSCH. For example, as shown in FIG. 9A, the end of DL slot boundary for PDSCH1 and PDSCH2 is aligned. In FIG. 9B, the end of DL slot boundary for PDSCH1 and PDSCH2 is not aligned, therefore, it is an error case.

Since the end of DL slot boundary is aligned, for a serving cell, it is sufficient to derive the DL candidate slot according to the set of K1 without effective K1 extension, though the flexibility of PDSCH time domain resource is restricted.

Figure 9C:
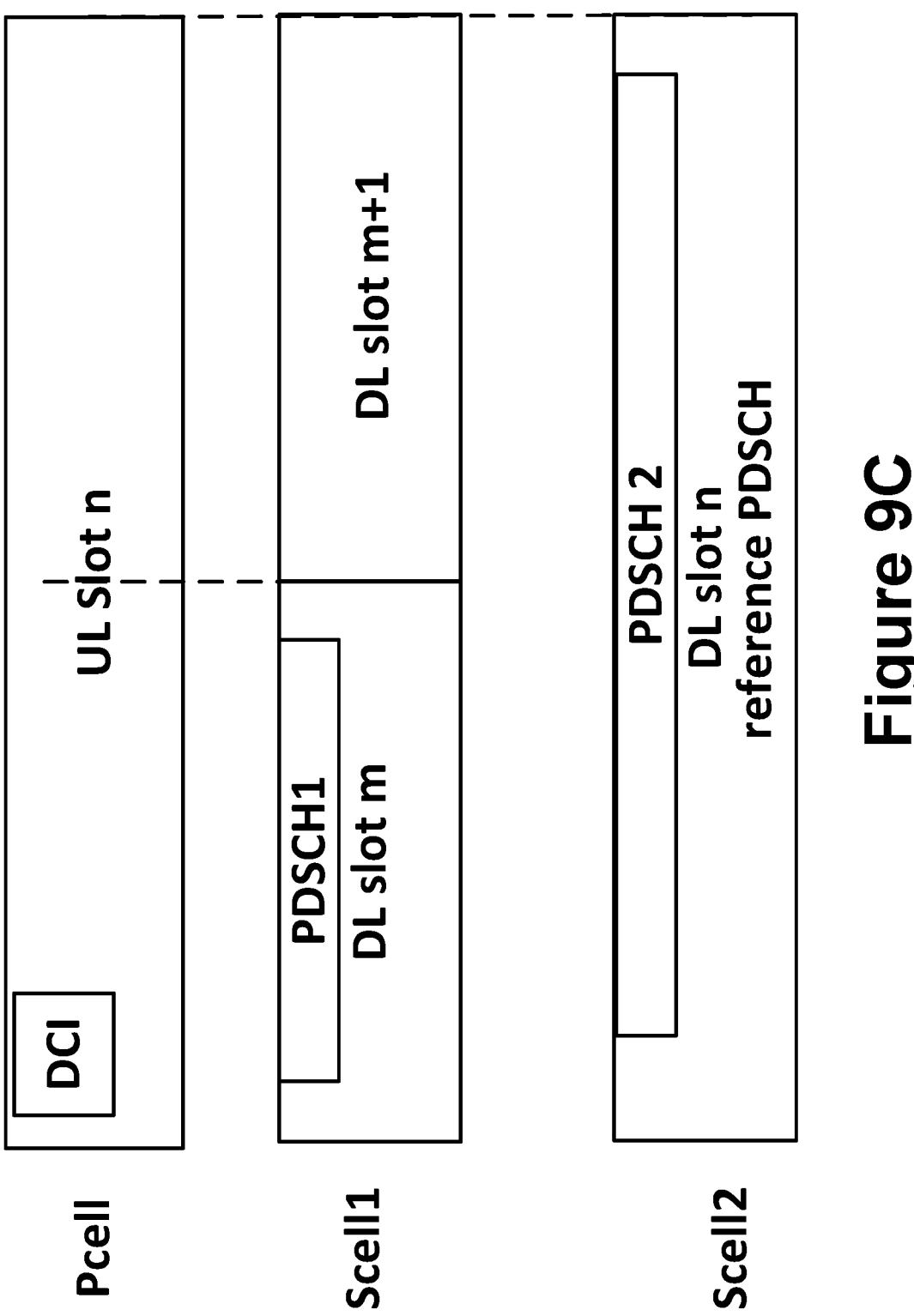
FIG. 9C illustrates another example of a valid case for multi-cell scheduling, in accordance with various embodiments.
Figure 9D:
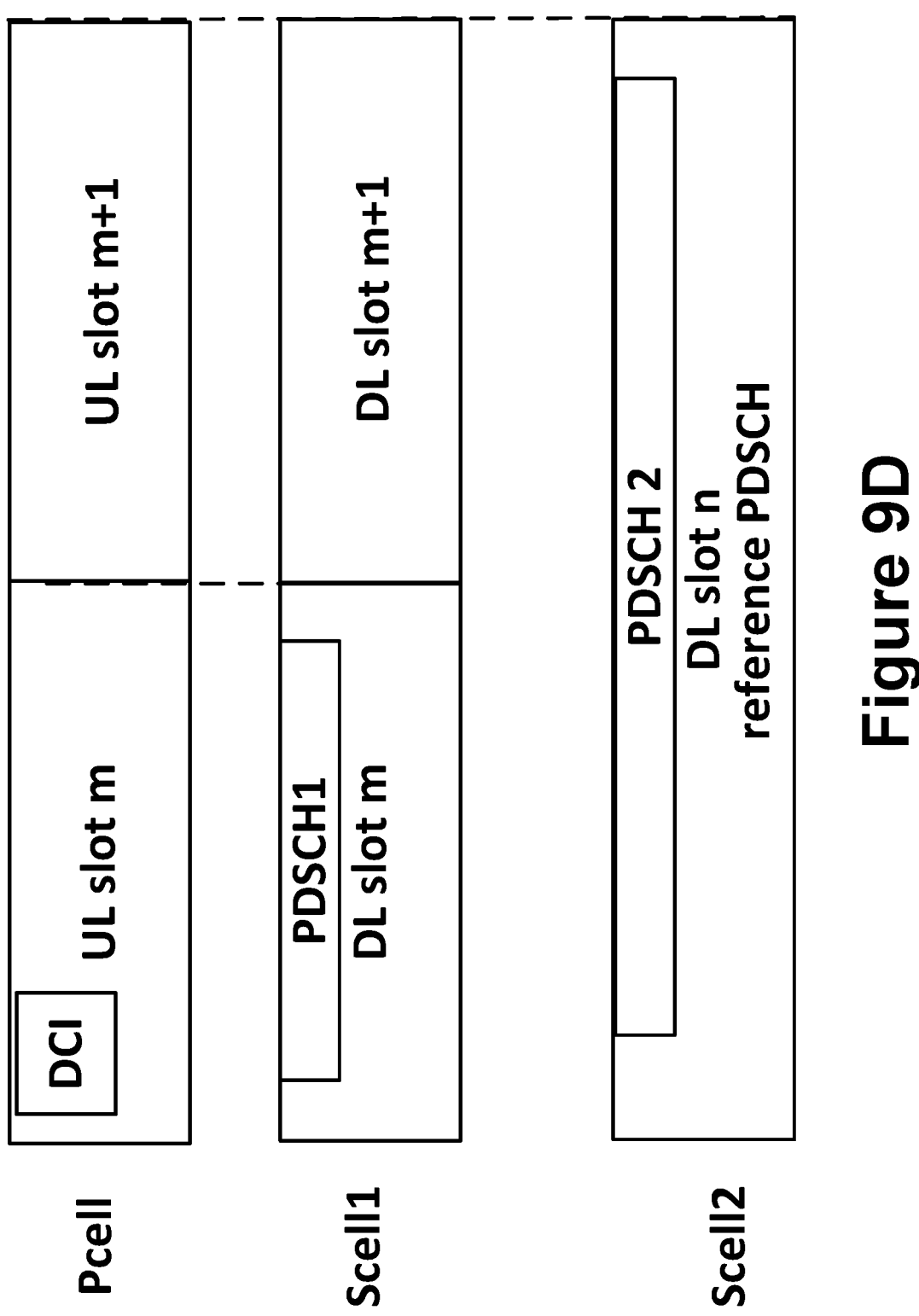
FIG. 9D illustrates another example of an error case for multi-cell scheduling, in accordance with various embodiments.

In an embodiment, a UE expects the last UL slot which overlaps with the DL slot of each PDSCH on different serving cells scheduled by a single DCI for multi-cell scheduling is aligned. It does not necessarily require the DL slot ending boundary of each PDSCH on different serving cells scheduled by a single DCI for multi-cell scheduling is aligned. If the last UL slot overlapping with the DL slot of each PDSCH on different serving cells scheduled by a single DCI for multi-cell scheduling is aligned, then, the same UL slot is derived by K1 and the end of slot boundary for each PDSCH. For example, FIG. 9C shows a valid case, the end of DL slot boundary for PDSCH1 (end of DL slot m) and PDSCH2 (end of DL slot n) are not aligned, but the same UL slot n overlaps with DL slot m and DL slot, so same UL slot is associated with same K1 value. In FIG. 9D, the end of DL slot boundary for PDSCH1 and PDSCH2 is not aligned, and the last UL slot overlapping with the DL slot m and DL slot n is UL slot m and UL slot m+1 respectively. Therefore, it is an error case.

Since the last UL slot overlapping with the DL slot of PDSCHs is aligned, for a serving cell, it is sufficient to derive the DL candidate slot according to the set of K1 without effective K1 extension, though the flexibility of PDSCH time domain resource is restricted.

Figure 10A:
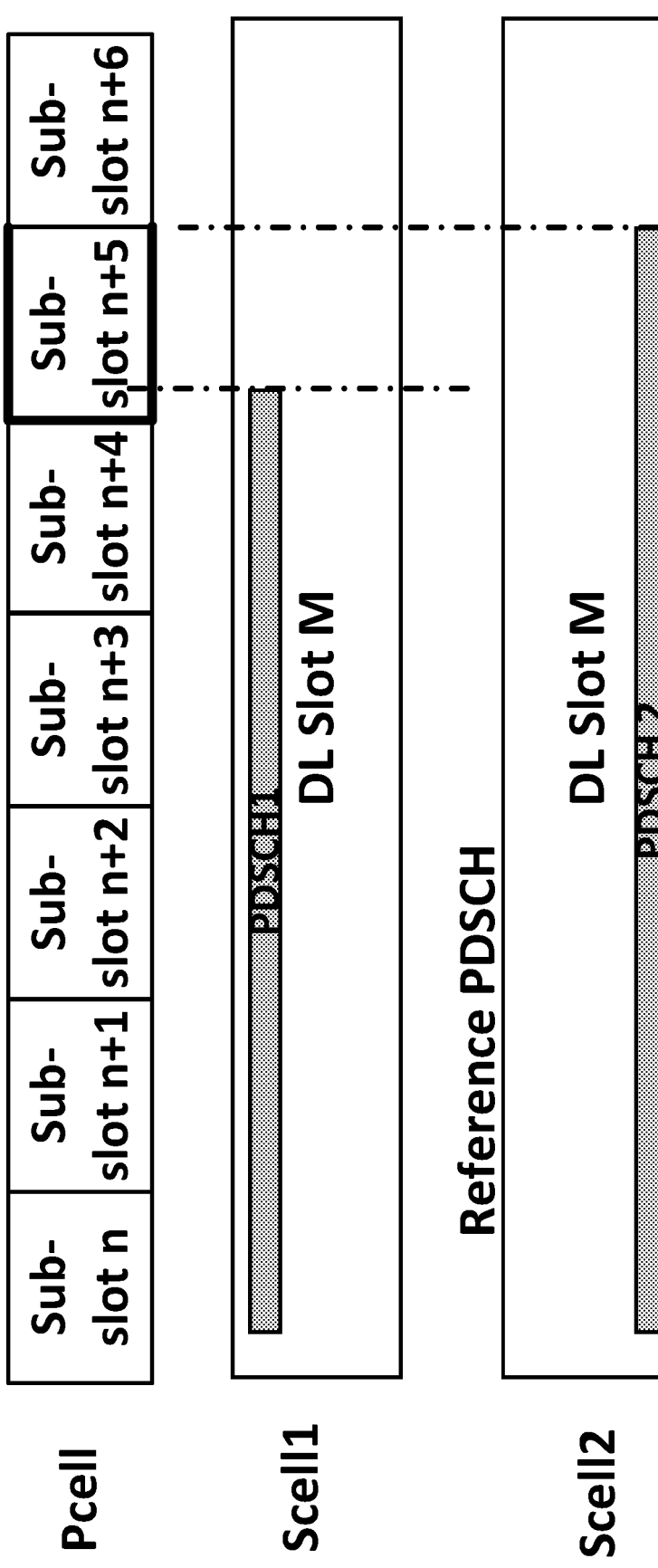
FIG. 10A illustrates an example of a valid case for multi-cell scheduling, in accordance with various embodiments.
Figure 10B:
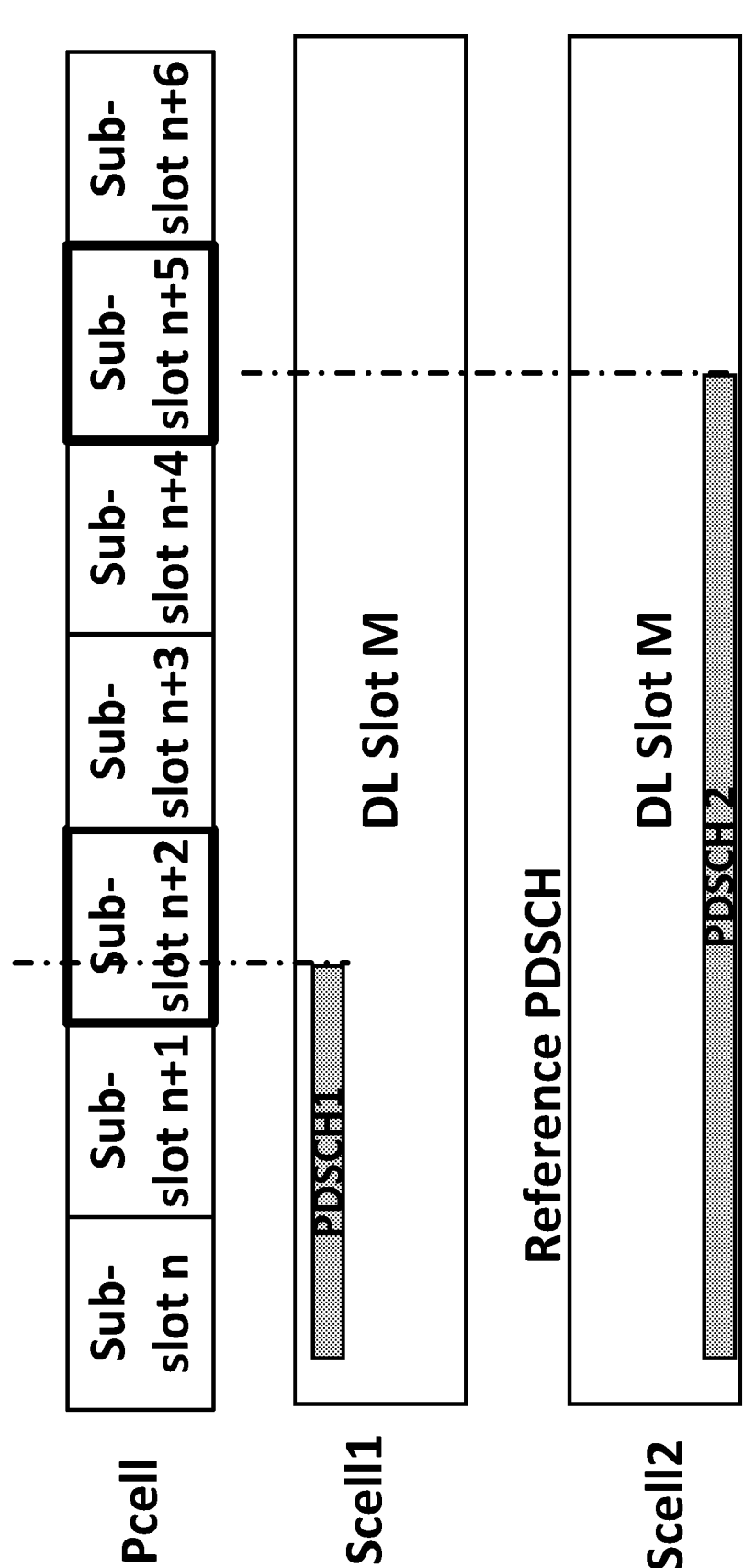
FIG. 10B illustrates an example of an error case for multi-cell scheduling, in accordance with various embodiments.

In an embodiment, a UE expects the last UL sub-slot overlapped with each PDSCH on different serving cells scheduled by a single DCI for multi-cell scheduling is aligned. For example, if a UE is configured with sub-slot-based PUCCH, K1=0 is determined by the last UL sub-slot overlapped with the PDSCH. If last UL sub-slot overlapped with each PDSCH on different serving cells scheduled by a single DCI for multi-cell scheduling is aligned, then, the same UL sub-slot is derived by K1 and the end of each PDSCH. For example, FIG. 10A shows a valid case, because the end of PDSCH1 and PDSCH2 overlaps with same UL sub-slot n+5. FIG. 10B shows an error case, because the last UL sub-slot overlapping with PDSCH1 is sub-slot n+2 and the last UL sub-slot overlapping with PDSCH2 is sub-slot n+5.

Since the last UL sub-slot overlapping with the DL slot of PDSCHs is aligned, for a serving cell, it is sufficient to derive the DL candidate slot according to the set of K1 without effective K1 extension, though the flexibility of PDSCH time domain resource is restricted.

In one option, UE determines the DL slot for the PDSCH or the UL slot for the PUSCH according to the DCI scheduling PDSCHs/PUSCHs, K0/K2 value and SCS for each PDSCH/PUSCH respectively. To align the PDSCHs as discussed above, gNB ensures a proper configuration of K0 and SLIV for each PDSCH respectively.

Figure 11A:
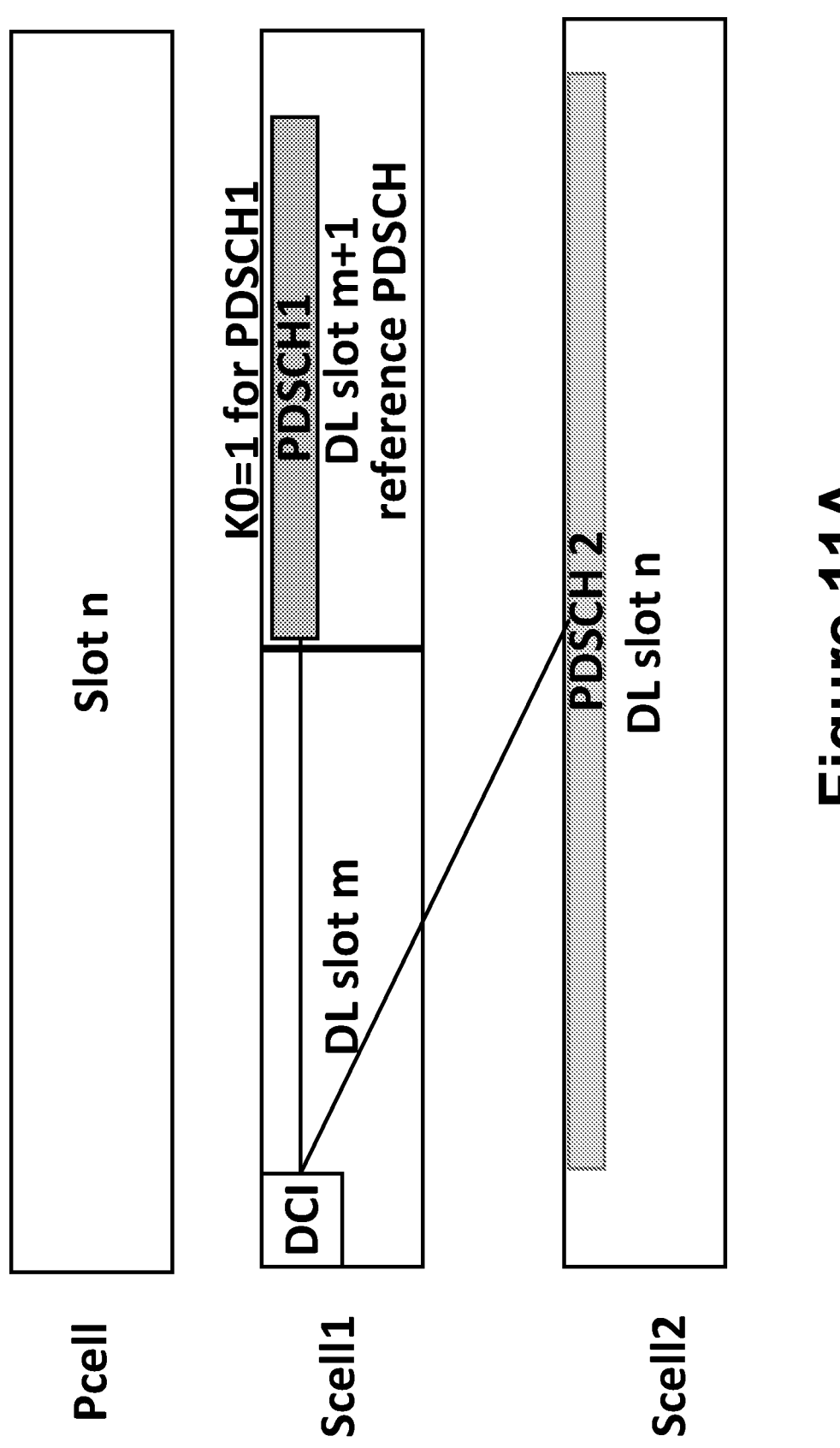
FIGS. 11A-11D illustrate options for determination of a DL slot for PDSCHs scheduled by a DCI with multi-cell scheduling, in accordance with various embodiments.

In another option, the DL slot for all PDSCHs scheduled by a DCI for multi-cell scheduling is determined by the DCI scheduling PDSCHs/PUSCHs, K0/K2 value and a reference PDSCH/PUSCH. For example, the DL/UL slot for a reference PDSCH/PUSCH is firstly determined, and the DL/UL slot for PDSCHs/PUSCHs other than the reference PDSCH/PUSCH is determined according the DL/UL slot for a reference PDSCH/PUSCH, according to one of the options below:

Opt1: the DL/UL slot for PDSCHs/PUSCHs other than the reference PDSCH/PUSCH is the last DL/UL slot overlapping with the DL/UL slot for the reference PDSCH/PUSCH. FIG. 11A provides an example.

Figure 11B:
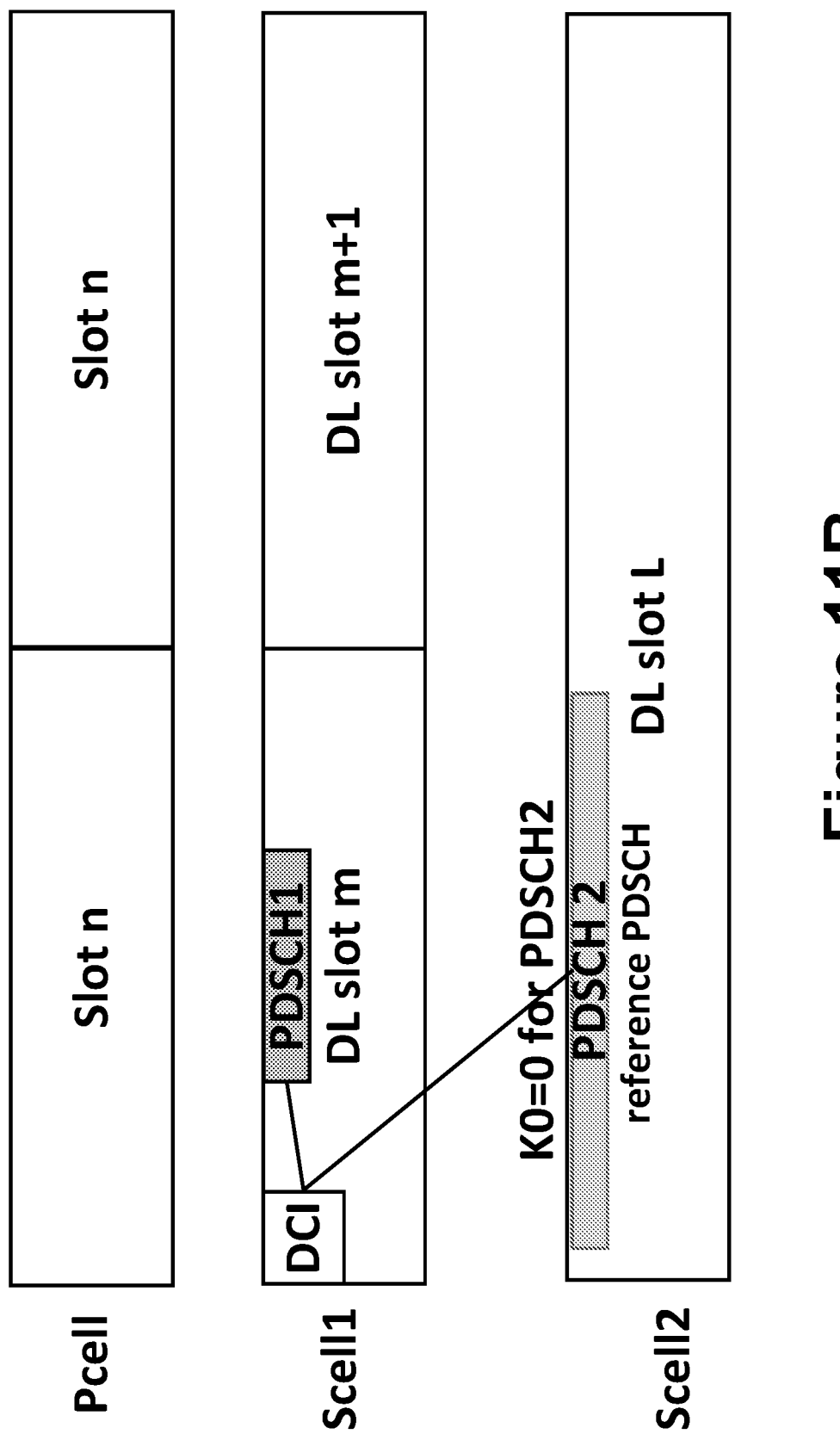

Opt 2: the DL/UL slot for PDSCHs/PUSCHs other than the reference PDSCH/PUSCH is the last DL/UL slot overlapping with the reference PDSCH/PUSCH. FIG. 11B provides an example.

Figure 11C:
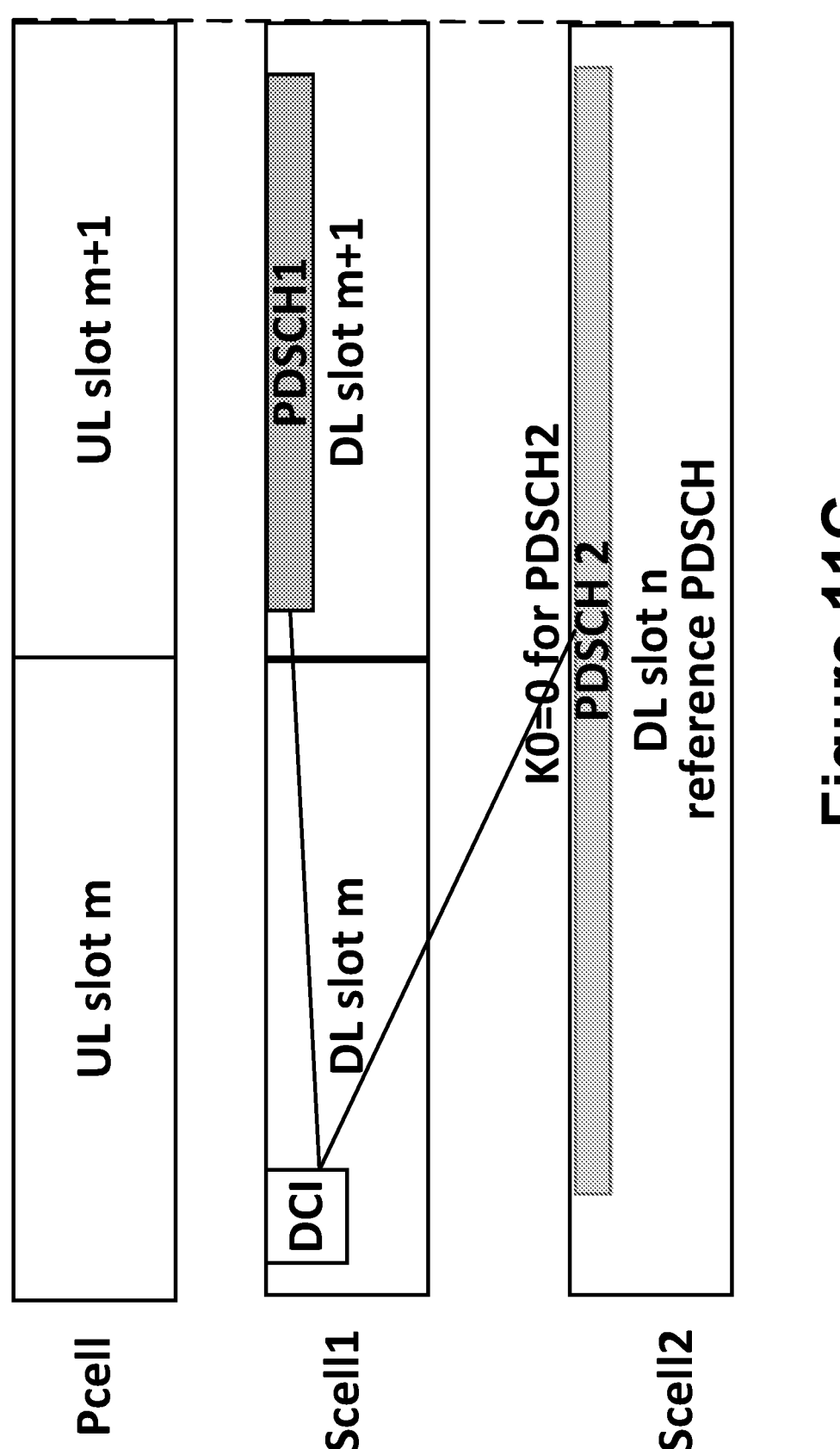

Opt 3: the DL slot for PDSCHs other than the reference PDSCH is the last DL slot overlapping with the same last UL slot which also overlaps with the DL slot for the reference PDSCH/PUSCH. FIG. 11C provides an example.

Figure 11D:
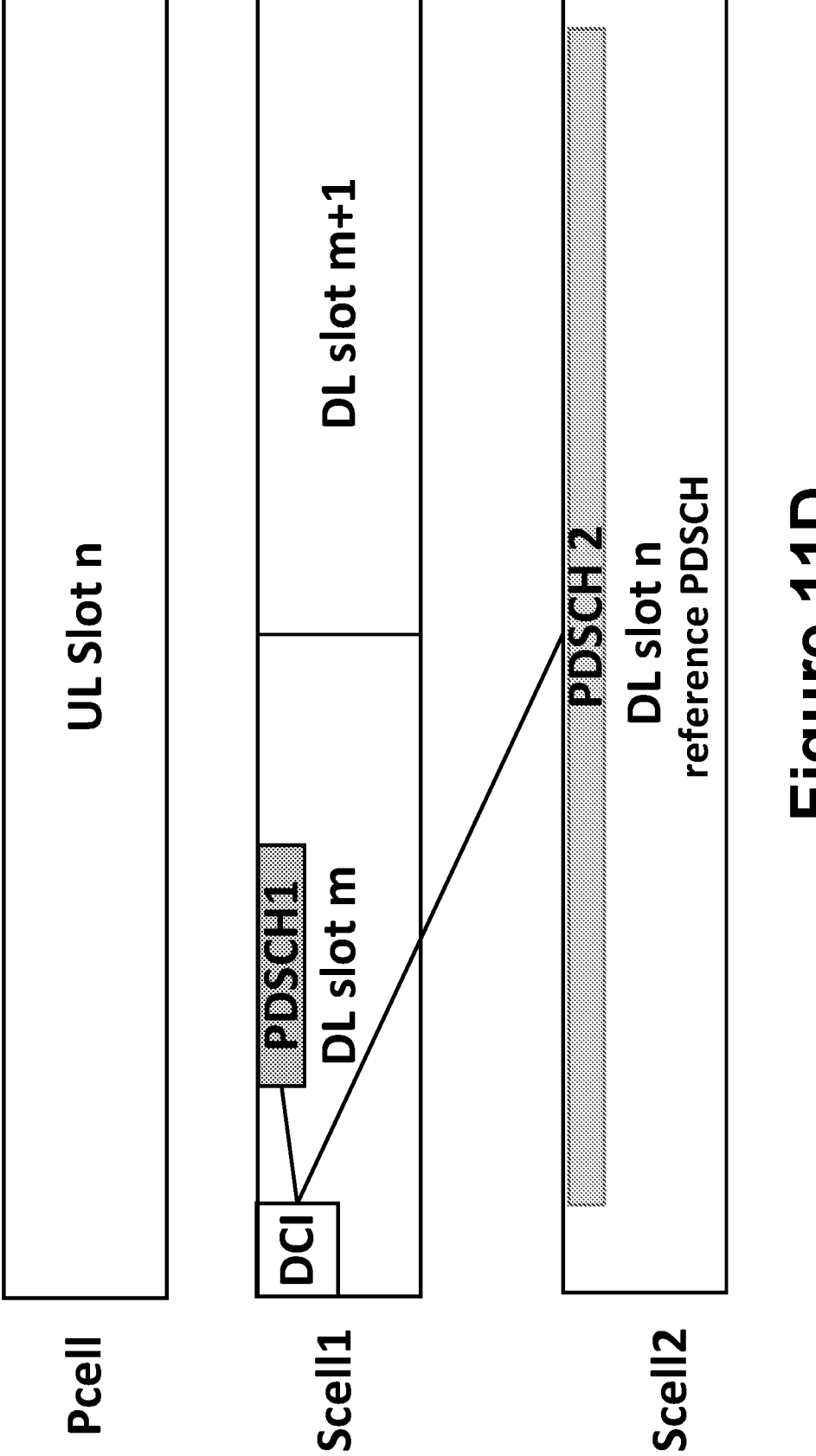

Opt 4: the DL slot for PDSCHs other than the reference PDSCH is the first DL slot overlapping with the same last UL slot which also overlaps with the DL slot for the reference PDSCH/PUSCH. FIG. 11D provides an example.

The reference PDSCH/PUSCH can be a PDSCH/PUSCH with largest SCS, or smallest SCS, or with lowest serving cell index, or with a serving cell index configured by high layer as reference.

Further, in an example, the earliest symbol of the PUSCH transmission scheduled by the DCI should be no earlier than T symbols from the end of the PDCCH that ends later, considering any impact from timing advance, where T symbols time duration is determined based on the applicable minimum UE processing time for PUSCH processing following the appropriate UE processing time capability. If different UE capabilities on PUSCH processing time are configured on multiple cells, the UE capability with longer processing time may apply.

In above embodiments, some redundant HARQ-ACKs locations are reserved. To reduce the redundancy, a SLIV within the candidate DL slot can be deleted, if HARQ-ACK associated with the SLIV can not be provided in the UL slot for PUCCH.

In above embodiments, if a serving cell is configured with multi-PDSCH scheduling (one DCI schedules multiple PDSCHs in the same serving cell) and is also configured with multi-cell scheduling for different DCI format, candidate PDSCH occasions in DL candidate slots for the serving cell is the union of candidate PDSCH occasions determined by the mechanism for multi-PDSCH scheduling (e.g., K1 extension and SLIV extension as in Rel-17 NR) and mechanisms above for multi-cell scheduling. Alternatively, a serving cell can not be configured with multi-PDSCH scheduling and multi-cell scheduling. Then, candidate PDSCH occasions in DL candidate slots for the serving cell is determined by the mechanism for multi-PDSCH scheduling (if configured) or mechanisms above for multi-cell scheduling (if configured).

Systems and Implementations

Figure 12:
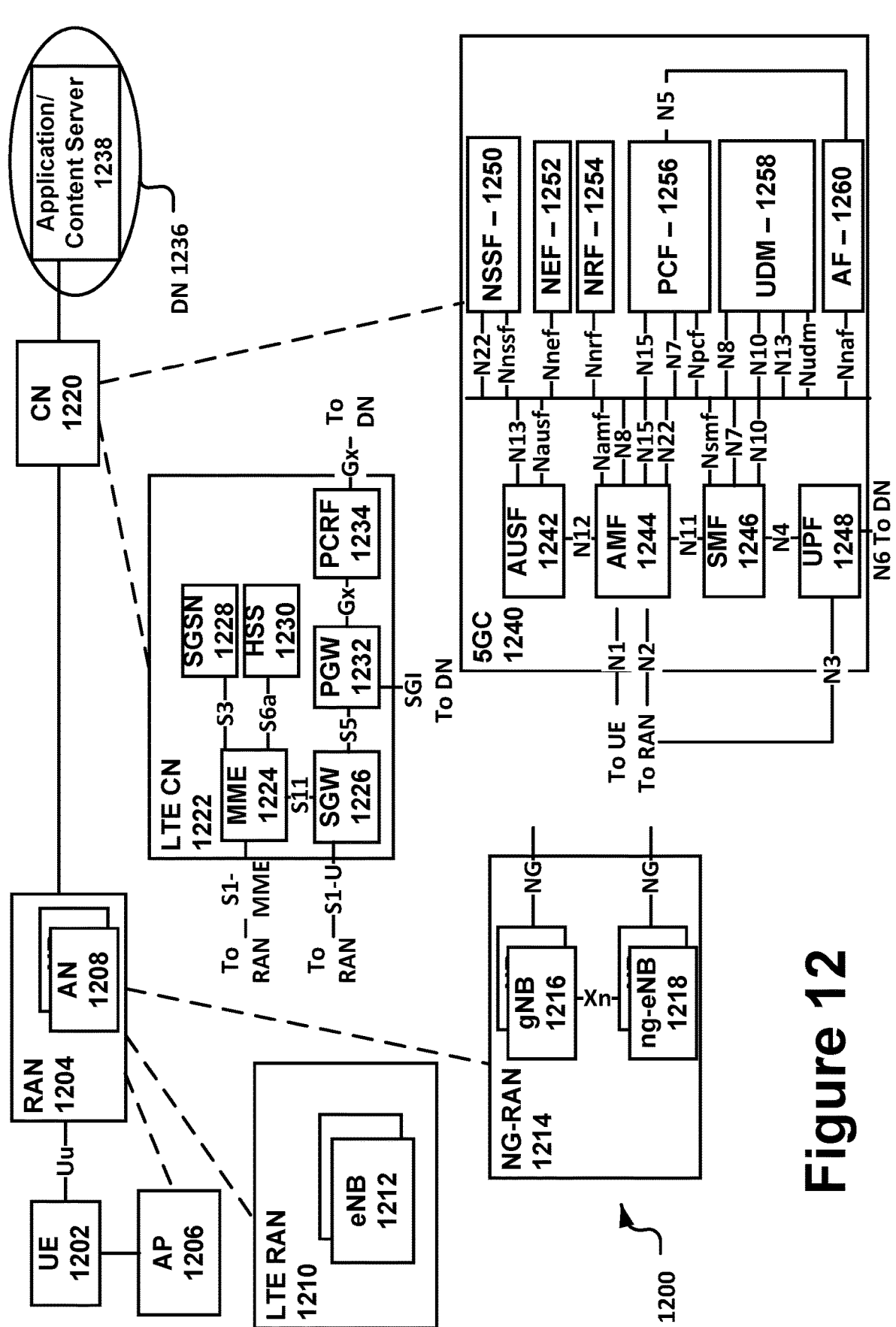
FIG. 12 schematically illustrates a wireless network in accordance with various embodiments.
Figure 13:
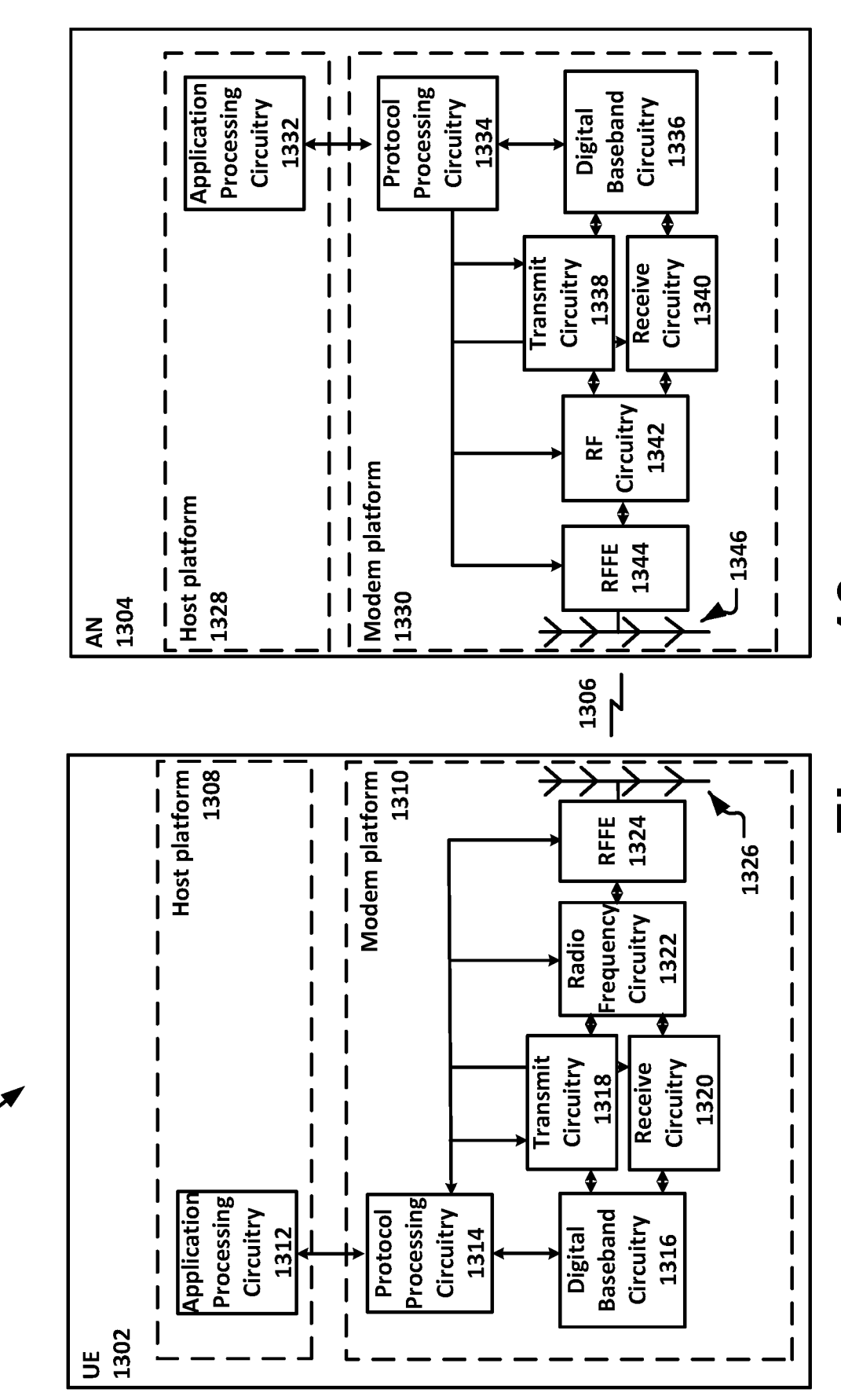
FIG. 13 schematically illustrates components of a wireless network in accordance with various embodiments.
Figure 14:
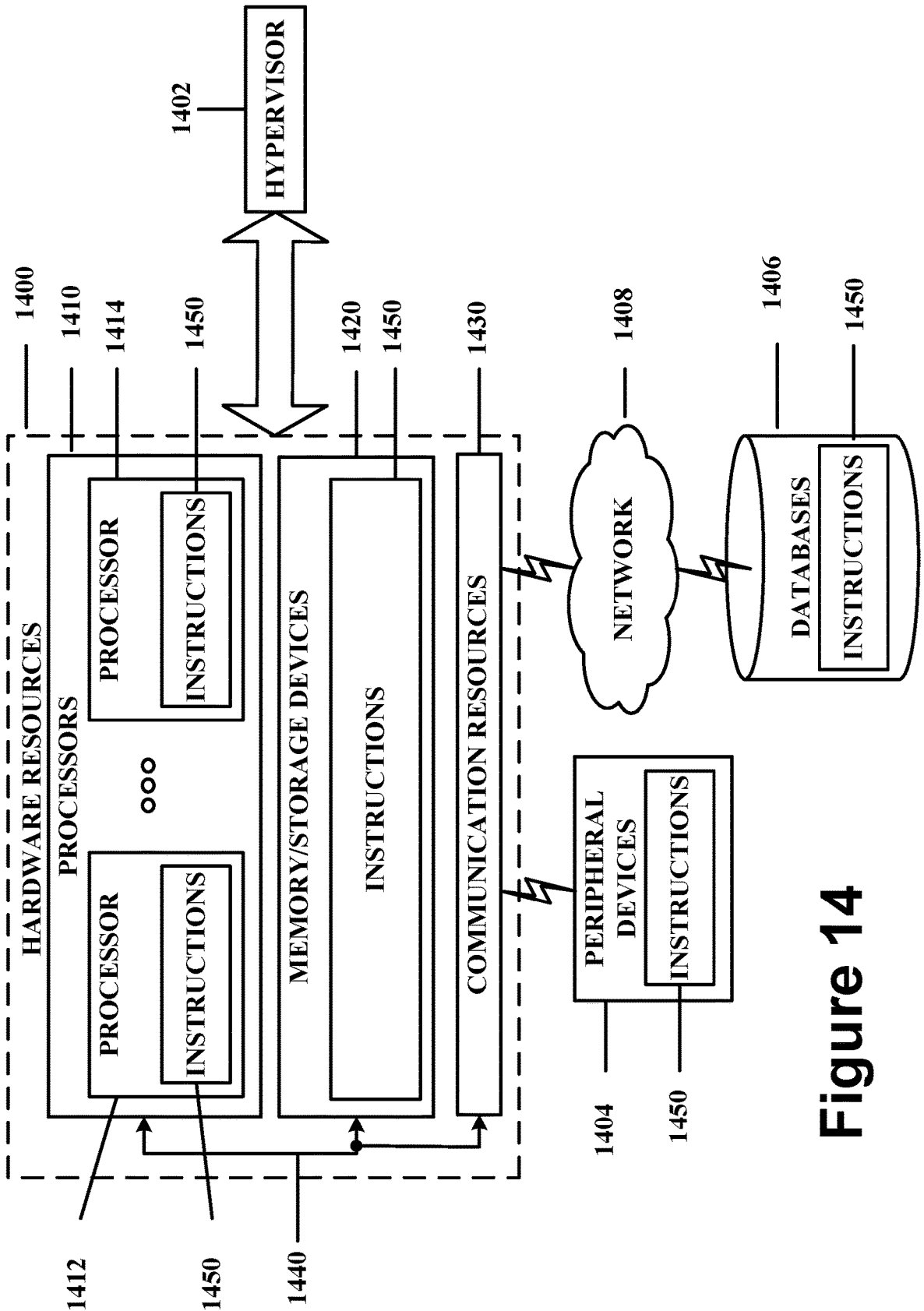
FIG. 14 is a block diagram illustrating components, according to some example embodiments, able to read instructions from a machine-readable or computer-readable medium (e.g., a non-transitory machine-readable storage medium) and perform any one or more of the methodologies discussed herein.

FIGS. 12-14 illustrate various systems, devices, and components that may implement aspects of disclosed embodiments.

FIG. 12 illustrates a network 1200 in accordance with various embodiments. The network 1200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 1200 may include a UE 1202, which may include any mobile or non-mobile computing device designed to communicate with a RAN 1204 via an over-the-air connection. The UE 1202 may be communicatively coupled with the RAN 1204 by a Uu interface. The UE 1202 may be, but is not limited to, a smartphone, tablet computer, wearable computer device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 1200 may include a plurality of UEs coupled directly with one another via a sidelink interface. The UEs may be M2M/D2D devices that communicate using physical sidelink channels such as, but not limited to, PSBCH, PSDCH, PSSCH, PSCCH, PSFCH, etc.

In some embodiments, the UE 1202 may additionally communicate with an AP 1206 via an over-the-air connection. The AP 1206 may manage a WLAN connection, which may serve to offload some/all network traffic from the RAN 1204. The connection between the UE 1202 and the AP 1206 may be consistent with any IEEE 802.11 protocol, wherein the AP 1206 could be a wireless fidelity (Wi-Fi®) router. In some embodiments, the UE 1202, RAN 1204, and AP 1206 may utilize cellular-WLAN aggregation (for example, LWA/LWIP). Cellular-WLAN aggregation may involve the UE 1202 being configured by the RAN 1204 to utilize both cellular radio resources and WLAN resources.

The RAN 1204 may include one or more access nodes, for example, AN 1208. AN 1208 may terminate air-interface protocols for the UE 1202 by providing access stratum protocols including RRC, PDCP, RLC, MAC, and L1 protocols. In this manner, the AN 1208 may enable data/voice connectivity between CN 1220 and the UE 1202. In some embodiments, the AN 1208 may be implemented in a discrete device or as one or more software entities running on server computers as part of, for example, a virtual network, which may be referred to as a CRAN or virtual baseband unit pool. The AN 1208 be referred to as a BS, gNB, RAN node, eNB, ng-eNB, NodeB, RSU, TRxP, TRP, etc. The AN 1208 may be a macrocell base station or a low power base station for providing femtocells, picocells or other like cells having smaller coverage areas, smaller user capacity, or higher bandwidth compared to macrocells.

In embodiments in which the RAN 1204 includes a plurality of ANs, they may be coupled with one another via an X2 interface (if the RAN 1204 is an LTE RAN) or an Xn interface (if the RAN 1204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 1204 may each manage one or more cells, cell groups, component carriers, etc. to provide the UE 1202 with an air interface for network access. The UE 1202 may be simultaneously connected with a plurality of cells provided by the same or different ANs of the RAN 1204. For example, the UE 1202 and RAN 1204 may use carrier aggregation to allow the UE 1202 to connect with a plurality of component carriers, each corresponding to a Pcell or Scell. In dual connectivity scenarios, a first AN may be a master node that provides an MCG and a second AN may be secondary node that provides an 5CG. The first/second ANs may be any combination of eNB, gNB, ng-eNB, etc.

The RAN 1204 may provide the air interface over a licensed spectrum or an unlicensed spectrum. To operate in the unlicensed spectrum, the nodes may use LAA, eLAA, and/or feLAA mechanisms based on CA technology with PCells/Scells. Prior to accessing the unlicensed spectrum, the nodes may perform medium/carrier-sensing operations based on, for example, a listen-before-talk (LBT) protocol.

In V2X scenarios the UE 1202 or AN 1208 may be or act as a RSU, which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high speed events, such as crash avoidance, traffic warnings, and the like. Additionally or alternatively, the RSU may provide other cellular/WLAN communications services. The components of the RSU may be packaged in a weatherproof enclosure suitable for outdoor installation, and may include a network interface controller to provide a wired connection (e.g., Ethernet) to a traffic signal controller or a backhaul network.

In some embodiments, the RAN 1204 may be an LTE RAN 1210 with eNBs, for example, eNB 1212. The LTE RAN 1210 may provide an LTE air interface with the following characteristics: SCS of 15 kHz; CP-OFDM waveform for DL and SC-FDMA waveform for UL; turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operating on sub-6 GHz bands.

In some embodiments, the RAN 1204 may be an NG-RAN 1214 with gNBs, for example, gNB 1216, or ng-eNBs, for example, ng-eNB 1218. The gNB 1216 may connect with 5G-enabled UEs using a 5G NR interface. The gNB 1216 may connect with a 5G core through an NG interface, which may include an N2 interface or an N3 interface. The ng-eNB 1218 may also connect with the 5G core through an NG interface, but may connect with a UE via an LTE air interface. The gNB 1216 and the ng-eNB 1218 may connect with each other over an Xn interface.

In some embodiments, the NG interface may be split into two parts, an NG user plane (NG-U) interface, which carries traffic data between the nodes of the NG-RAN 1214 and a UPF 1248 (e.g., N3 interface), and an NG control plane (NG-C) interface, which is a signaling interface between the nodes of the NG-RAN1214 and an AMF 1244 (e.g., N2 interface).

The NG-RAN 1214 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS, but may use PBCH DMRS for PBCH demodulation; PTRS for phase tracking for PDSCH; and tracking reference signal for time tracking. The 5G-NR air interface may operating on FR1 bands that include sub-6 GHz bands or FR2 bands that include bands from 24.25 GHz to 52.6 GHz. The 5G-NR air interface may include an SSB that is an area of a downlink resource grid that includes PSS/SSS/PBCH.

In some embodiments, the 5G-NR air interface may utilize BWPs for various purposes. For example, BWP can be used for dynamic adaptation of the SCS. For example, the UE 1202 can be configured with multiple BWPs where each BWP configuration has a different SCS. When a BWP change is indicated to the UE 1202, the SCS of the transmission is changed as well. Another use case example of BWP is related to power saving. In particular, multiple BWPs can be configured for the UE 1202 with different amount of frequency resources (for example, PRBs) to support data transmission under different traffic loading scenarios. A BWP containing a smaller number of PRBs can be used for data transmission with small traffic load while allowing power saving at the UE 1202 and in some cases at the gNB 1216. A BWP containing a larger number of PRBs can be used for scenarios with higher traffic load.

The RAN 1204 is communicatively coupled to CN 1220 that includes network elements to provide various functions to support data and telecommunications services to customers/subscribers (for example, users of UE 1202). The components of the CN 1220 may be implemented in one physical node or separate physical nodes. In some embodiments, NFV may be utilized to virtualize any or all of the functions provided by the network elements of the CN 1220 onto physical compute/storage resources in servers, switches, etc. A logical instantiation of the CN 1220 may be referred to as a network slice, and a logical instantiation of a portion of the CN 1220 may be referred to as a network sub-slice.

In some embodiments, the CN 1220 may be an LTE CN 1222, which may also be referred to as an EPC. The LTE CN 1222 may include MME 1224, SGW 1226, SGSN 1228, HSS 1230, PGW 1232, and PCRF 1234 coupled with one another over interfaces (or "reference points") as shown. Functions of the elements of the LTE CN 1222 may be briefly introduced as follows.

The MME 1224 may implement mobility management functions to track a current location of the UE 1202 to facilitate paging, bearer activation/deactivation, handovers, gateway selection, authentication, etc.

The SGW 1226 may terminate an Si interface toward the RAN and route data packets between the RAN and the LTE CN 1222. The SGW 1226 may be a local mobility anchor point for inter-RAN node handovers and also may provide an anchor for inter-3GPP mobility. Other responsibilities may include lawful intercept, charging, and some policy enforcement.

The SGSN 1228 may track a location of the UE 1202 and perform security functions and access control. In addition, the SGSN 1228 may perform inter-EPC node signaling for mobility between different RAT networks; PDN and S-GW selection as specified by MME 1224; MME selection for handovers; etc. The S3 reference point between the MME 1224 and the SGSN 1228 may enable user and bearer information exchange for inter-3GPP access network mobility in idle/active states.

The HSS 1230 may include a database for network users, including subscription-related information to support the network entities' handling of communication sessions. The HSS 1230 can provide support for routing/roaming, authentication, authorization, naming/addressing resolution, location dependencies, etc. An Sha reference point between the HSS 1230 and the MME 1224 may enable transfer of subscription and authentication data for authenticating/authorizing user access to the LTE CN 1220.

The PGW 1232 may terminate an SGi interface toward a data network (DN) 1236 that may include an application/content server 1238. The PGW 1232 may route data packets between the LTE CN 1222 and the data network 1236. The PGW 1232 may be coupled with the SGW 1226 by an S5 reference point to facilitate user plane tunneling and tunnel management. The PGW 1232 may further include a node for policy enforcement and charging data collection (for example, PCEF). Additionally, the SGi reference point between the PGW 1232 and the data network 1236 may be an operator external public, a private PDN, or an intra-operator packet data network, for example, for provision of IMS services. The PGW 1232 may be coupled with a PCRF 1234 via a Gx reference point.

The PCRF 1234 is the policy and charging control element of the LTE CN 1222. The PCRF 1234 may be communicatively coupled to the app/content server 1238 to determine appropriate QoS and charging parameters for service flows. The PCRF 1232 may provision associated rules into a PCEF (via Gx reference point) with appropriate TFT and QCI.

In some embodiments, the CN 1220 may be a 5GC 1240. The 5GC 1240 may include an AUSF 1242, AMF 1244, SMF 1246, UPF 1248, NSSF 1250, NEF 1252, NRF 1254, PCF 1256, UDM 1258, and AF 1260 coupled with one another over interfaces (or "reference points") as shown. Functions of the elements of the 5GC 1240 may be briefly introduced as follows.

The AUSF 1242 may store data for authentication of UE 1202 and handle authentication-related functionality. The AUSF 1242 may facilitate a common authentication framework for various access types. In addition to communicating with other elements of the 5GC 1240 over reference points as shown, the AUSF 1242 may exhibit an Nausf service-based interface.

The AMF 1244 may allow other functions of the 5GC 1240 to communicate with the UE 1202 and the RAN 1204 and to subscribe to notifications about mobility events with respect to the UE 1202. The AMF 1244 may be responsible for registration management (for example, for registering UE 1202), connection management, reachability management, mobility management, lawful interception of AMF-related events, and access authentication and authorization. The AMF 1244 may provide transport for SM messages between the UE 1202 and the SMF 1246, and act as a transparent proxy for routing SM messages. AMF 1244 may also provide transport for SMS messages between UE 1202 and an SMSF. AMF 1244 may interact with the AUSF 1242 and the UE 1202 to perform various security anchor and context management functions. Furthermore, AMF 1244 may be a termination point of a RAN CP interface, which may include or be an N2 reference point between the RAN 1204 and the AMF 1244; and the AMF 1244 may be a termination point of NAS (N1) signaling, and perform NAS ciphering and integrity protection. AMF 1244 may also support NAS signaling with the UE 1202 over an N3 IWF interface.

The SMF 1246 may be responsible for SM (for example, session establishment, tunnel management between UPF 1248 and AN 1208); UE IP address allocation and management (including optional authorization); selection and control of UP function; configuring traffic steering at UPF 1248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 1244 over N2 to AN 1208; and determining SSC mode of a session. SM may refer to management of a PDU session, and a PDU session or "session" may refer to a PDU connectivity service that provides or enables the exchange of PDUs between the UE 1202 and the data network 1236.

The UPF 1248 may act as an anchor point for intra-RAT and inter-RAT mobility, an external PDU session point of interconnect to data network 1236, and a branching point to support multi-homed PDU session. The UPF 1248 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 1248 may include an uplink classifier to support routing traffic flows to a data network.

The NSSF 1250 may select a set of network slice instances serving the UE 1202. The NSSF 1250 may also determine allowed NSSAI and the mapping to the subscribed S-NSSAIs, if needed. The NSSF 1250 may also determine the AMF set to be used to serve the UE 1202, or a list of candidate AMFs based on a suitable configuration and possibly by querying the NRF 1254. The selection of a set of network slice instances for the UE 1202 may be triggered by the AMF 1244 with which the UE 1202 is registered by interacting with the NSSF 1250, which may lead to a change of AMF. The NSSF 1250 may interact with the AMF 1244 via an N22 reference point; and may communicate with another NSSF in a visited network via an N31 reference point (not shown). Additionally, the NSSF 1250 may exhibit an Nnssf service-based interface.

The NEF 1252 may securely expose services and capabilities provided by 3GPP network functions for third party, internal exposure/re-exposure, AFs (e.g., AF 1260), edge computing or fog computing systems, etc. In such embodiments, the NEF 1252 may authenticate, authorize, or throttle the AFs. NEF 1252 may also translate information exchanged with the AF 1260 and information exchanged with internal network functions. For example, the NEF 1252 may translate between an AF-Service-Identifier and an internal 5GC information. NEF 1252 may also receive information from other NFs based on exposed capabilities of other NFs. This information may be stored at the NEF 1252 as structured data, or at a data storage NF using standardized interfaces. The stored information can then be re-exposed by the NEF 1252 to other NFs and AFs, or used for other purposes such as analytics. Additionally, the NEF 1252 may exhibit an Nnef service-based interface.

The NRF 1254 may support service discovery functions, receive NF discovery requests from NF instances, and provide the information of the discovered NF instances to the NF instances. NRF 1254 also maintains information of available NF instances and their supported services. As used herein, the terms "instantiate," "instantiation," and the like may refer to the creation of an instance, and an "instance" may refer to a concrete occurrence of an object, which may occur, for example, during execution of program code. Additionally, the NRF 1254 may exhibit the Nnrf service-based interface.

The PCF 1256 may provide policy rules to control plane functions to enforce them, and may also support unified policy framework to govern network behavior. The PCF 1256 may also implement a front end to access subscription information relevant for policy decisions in a UDR of the UDM 1258. In addition to communicating with functions over reference points as shown, the PCF 1256 exhibit an Npcf service-based interface.

The UDM 1258 may handle subscription-related information to support the network entities' handling of communication sessions, and may store subscription data of UE 1202. For example, subscription data may be communicated via an N8 reference point between the UDM 1258 and the AMF 1244. The UDM 1258 may include two parts, an application front end and a UDR. The UDR may store subscription data and policy data for the UDM 1258 and the PCF 1256, and/or structured data for exposure and application data (including PFDs for application detection, application request information for multiple UEs 1202) for the NEF 1252. The Nudr service-based interface may be exhibited by the UDR 221 to allow the UDM 1258, PCF 1256, and NEF 1252 to access a particular set of the stored data, as well as to read, update (e.g., add, modify), delete, and subscribe to notification of relevant data changes in the UDR. The UDM may include a UDM-FE, which is in charge of processing credentials, location management, subscription management and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 1258 may exhibit the Nudm service-based interface.

The AF 1260 may provide application influence on traffic routing, provide access to NEF, and interact with the policy framework for policy control.

In some embodiments, the 5GC 1240 may enable edge computing by selecting operator/3rd party services to be geographically close to a point that the UE 1202 is attached to the network. This may reduce latency and load on the network. To provide edge-computing implementations, the 5GC 1240 may select a UPF 1248 close to the UE 1202 and execute traffic steering from the UPF 1248 to data network 1236 via the N6 interface. This may be based on the UE subscription data, UE location, and information provided by the AF 1260. In this way, the AF 1260 may influence UPF (re)selection and traffic routing. Based on operator deployment, when AF 1260 is considered to be a trusted entity, the network operator may permit AF 1260 to interact directly with relevant NFs. Additionally, the AF 1260 may exhibit an Naf service-based interface.

The data network 1236 may represent various network operator services, Internet access, or third party services that may be provided by one or more servers including, for example, application/content server 1238.

FIG. 13 schematically illustrates a wireless network 1300 in accordance with various embodiments. The wireless network 1300 may include a UE 1302 in wireless communication with an AN 1304. The UE 1302 and AN 1304 may be similar to, and substantially interchangeable with, like-named components described elsewhere herein.

The UE 1302 may be communicatively coupled with the AN 1304 via connection 1306. The connection 1306 is illustrated as an air interface to enable communicative coupling, and can be consistent with cellular communications protocols such as an LTE protocol or a 5G NR protocol operating at mmWave or sub-6 GHz frequencies.

The UE 1302 may include a host platform 1308 coupled with a modem platform 1310. The host platform 1308 may include application processing circuitry 1312, which may be coupled with protocol processing circuitry 1314 of the modem platform 1310. The application processing circuitry 1312 may run various applications for the UE 1302 that source/sink application data. The application processing circuitry 1312 may further implement one or more layer operations to transmit/receive application data to/from a data network. These layer operations may include transport (for example UDP) and Internet (for example, IP) operations The protocol processing circuitry 1314 may implement one or more of layer operations to facilitate transmission or reception of data over the connection 1306. The layer operations implemented by the protocol processing circuitry 1314 may include, for example, MAC, RLC, PDCP, RRC and NAS operations.

The modem platform 1310 may further include digital baseband circuitry 1316 that may implement one or more layer operations that are "below" layer operations performed by the protocol processing circuitry 1314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 1310 may further include transmit circuitry 1318, receive circuitry 1320, RF circuitry 1322, and RF front end (RFFE) 1324, which may include or connect to one or more antenna panels 1326. Briefly, the transmit circuitry 1318 may include a digital-to-analog converter, mixer, intermediate frequency (IF) components, etc.; the receive circuitry 1320 may include an analog-to-digital converter, mixer, IF components, etc.; the RF circuitry 1322 may include a low-noise amplifier, a power amplifier, power tracking components, etc.; RFFE 1324 may include filters (for example, surface/bulk acoustic wave filters), switches, antenna tuners, beamforming components (for example, phase-array antenna components), etc. The selection and arrangement of the components of the transmit circuitry 1318, receive circuitry 1320, RF circuitry 1322, RFFE 1324, and antenna panels 1326 (referred generically as "transmit/receive components") may be specific to details of a specific implementation such as, for example, whether communication is TDM or FDM, in mmWave or sub-6 gHz frequencies, etc. In some embodiments, the transmit/receive components may be arranged in multiple parallel transmit/receive chains, may be disposed in the same or different chips/modules, etc.

In some embodiments, the protocol processing circuitry 1314 may include one or more instances of control circuitry (not shown) to provide control functions for the transmit/receive components.

A UE reception may be established by and via the antenna panels 1326, RFFE 1324, RF circuitry 1322, receive circuitry 1320, digital baseband circuitry 1316, and protocol processing circuitry 1314. In some embodiments, the antenna panels 1326 may receive a transmission from the AN 1304 by receive-beamforming signals received by a plurality of antennas/antenna elements of the one or more antenna panels 1326.

A UE transmission may be established by and via the protocol processing circuitry 1314, digital baseband circuitry 1316, transmit circuitry 1318, RF circuitry 1322, RFFE 1324, and antenna panels 1326. In some embodiments, the transmit components of the UE 1304 may apply a spatial filter to the data to be transmitted to form a transmit beam emitted by the antenna elements of the antenna panels 1326.

Similar to the UE 1302, the AN 1304 may include a host platform 1328 coupled with a modem platform 1330. The host platform 1328 may include application processing circuitry 1332 coupled with protocol processing circuitry 1334 of the modem platform 1330. The modem platform may further include digital baseband circuitry 1336, transmit circuitry 1338, receive circuitry 1340, RF circuitry 1342, RFFE circuitry 1344, and antenna panels 1346. The components of the AN 1304 may be similar to and substantially interchangeable with like-named components of the UE 1302. In addition to performing data transmission/reception as described above, the components of the AN 1308 may perform various logical functions that include, for example, RNC functions such as radio bearer management, uplink and downlink dynamic radio resource management, and data packet scheduling.

FIG. 14 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 14 shows a diagrammatic representation of hardware resources 1400 including one or more processors (or processor cores) 1410, one or more memory/storage devices 1420, and one or more communication resources 1430, each of which may be communicatively coupled via a bus 1440 or other interface circuitry. For embodiments where node virtualization (e.g., NFV) is utilized, a hypervisor 1402 may be executed to provide an execution environment for one or more network slices/sub-slices to utilize the hardware resources 1400.

The processors 1410 may include, for example, a processor 1412 and a processor 1414. The processors 1410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 1420 may include main memory, disk storage, or any suitable combination thereof. The memory/storage devices 1420 may include, but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 1430 may include interconnection or network interface controllers, components, or other suitable devices to communicate with one or more peripheral devices 1404 or one or more databases 1406 or other network elements via a network 1408. For example, the communication resources 1430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 1450 may comprise software, a program, an application, an applet, an app, or other executable code for causing at least any of the processors 1410 to perform any one or more of the methodologies discussed herein. The instructions 1450 may reside, completely or partially, within at least one of the processors 1410 (e.g., within the processor's cache memory), the memory/storage devices 1420, or any suitable combination thereof. Furthermore, any portion of the instructions 1450 may be transferred to the hardware resources 1400 from any combination of the peripheral devices 1404 or the databases 1406. Accordingly, the memory of processors 1410, the memory/storage devices 1420, the peripheral devices 1404, and the databases 1406 are examples of computer-readable and machine-readable media.

Example Procedures

In some embodiments, the electronic device(s), network(s), system(s), chip(s) or component(s), or portions or implementations thereof, of FIGS. 12-14, or some other figure herein, may be configured to perform one or more processes, techniques, or methods as described herein, or portions thereof. One such process 1500 is depicted in FIG. 15. The process 1500 may be performed by a UE or a portion thereof. At 1502, the process 1500 may include detecting a downlink control information (DCI) to schedule multiple physical downlink shared channels (PDSCHs), wherein the respective PDSCHs are to be transmitted from different cells and include different transport blocks (TBs), and wherein the DCI indicates one or more K1 values. At 1504, the process 1500 may further include determining an uplink resource for hybrid automatic repeat request acknowledgement (HARQ-ACK) feedback for the PDSCHs based on the one or more K1 values and a reference channel. At 1506, the process 1500 may further include encoding the HARQ-ACK feedback for transmission in the determined uplink resource.

FIG. 16 illustrates another process 1600 in accordance with various embodiments. The process 1600 may be performed by a gNB or a portion thereof. At 1602, the process 1600 may include encoding, for transmission to a user equipment (UE), a downlink control information (DCI) to schedule multiple physical downlink shared channels (PDSCHs), wherein the respective PDSCHs are to be transmitted from different cells and include different transport blocks (TBs), and wherein the DCI indicates one or more K1 values. At 1604, the process 1600 may further include identifying an uplink resource for hybrid automatic repeat request acknowledgement (HARQ-ACK) feedback for the PDSCHs based on the one or more K1 values and a reference channel. At 1606, the process 1600 may further include receiving the HARQ-ACK feedback from the UE in the uplink resource.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example A1 may include one or more non-transitory computer-readable media (NTCRM) having instructions, stored thereon, that when executed by one or more processors of a user equipment (UE) configure the UE to: detect a downlink control information (DCI) to schedule multiple physical downlink shared channels (PDSCHs), wherein the respective PDSCHs are to be transmitted from different cells and include different transport blocks (TBs), and wherein the DCI indicates one or more K1 values; determine an uplink resource for hybrid automatic repeat request acknowledgement (HARQ-ACK) feedback for the PDSCHs based on the one or more K1 values and a reference channel; and encode the HARQ-ACK feedback for transmission in the determined uplink resource.

Example A2 may include the one or more NTCRM of example A1, wherein the reference channel is a reference PDSCH of the PDSCHs.

Example A3 may include the one or more NTCRM of example A2, wherein the instructions, when executed, are further to configure the UE to identify the reference PDSCH as: the PDSCH of the multiple PDSCHs that has a last ending symbol; the PDSCH of the multiple PDSCHs that is associated with a last uplink slot or sub-slot; the PDSCH of the multiple PDSCHs that has a last-ending boundary of a downlink slot; the PDSCH of the multiple PDSCHs that has a smallest or largest subcarrier spacing; the PDSCH of the multiple PDSCHs that has a smallest or largest serving cell index; or the PDSCH of the multiple PDSCHs that is on a configured reference cell.

Example A4 may include the one or more NTCRM of example A1, wherein the reference channel is a physical downlink control channel (PDCCH) that carries the DCI.

Example A5 may include the one or more NTCRM of example A1, wherein the one or more K1 values correspond to a slot or sub-slot offset from the reference channel.

Example A6 may include the one or more NTCRM of example A1, wherein the DCI indicates a plurality of K1 values that correspond to respective groups of one or more of the PDSCHs.

Example A7 may include the one or more NTCRM of example A1, wherein the instructions, when executed, are further to configure the UE to determine an effective K1 value based on the one or more indicated K1 values, wherein the uplink resource is determined based on the effective K1 value.

Example A8 may include the one or more NTCRM of example A7, wherein the one or more K1 values indicated by the DCI is a set of K1 values, and wherein the effective K1 for the PDSCHs scheduled by the DCI is within the set of K1 values.

Example A9 may include the one or more NTCRM of example A7, wherein the effective K1 value is derived based on at least one of the one or more K1 values and a time domain offset between the multiple PDSCHs.

Example A10 may include the one or more NTCRM of example A1, wherein to encode the HARQ-ACK feedback for transmission in the determined uplink resource includes to determine HARQ-ACK bit locations based on an effective K1 value and time domain resources of the PDSCHs.

Example A11 may include the one or more NTCRM of example A10, wherein the time domain resources of the PDSCHs are determined based on a valid Start and the set of Length Indication Value (SLIV) in time domain resource allocation (TDRA) configured for respective serving cells for single and/or multi-cell scheduling.

Example A12 may include the one or more NTCRM of example A1, wherein the instructions, when executed, are further to configure the UE to receive a configuration of a search space set of a DCI format for multi-cell scheduling, wherein the DCI is detected in the search space set.

Example A13 may include the one or more NTCRM of example A1, wherein the HARQ-ACK feedback is based on a Type-1 HARQ codebook, a Type-2 HARQ-ACK codebook, or a Type-3 HARQ-ACK codebook.

Example A14 may include one or more non-transitory computer-readable media (NTCRM) having instructions, stored thereon, that when executed by one or more processors of a next generation Node B (gNB) configure the gNB to: encode, for transmission to a user equipment (UE), a downlink control information (DCI) to schedule multiple physical downlink shared channels (PDSCHs), wherein the respective PDSCHs are to be transmitted from different cells and include different transport blocks (TBs), and wherein the DCI indicates one or more K1 values; identify an uplink resource for hybrid automatic repeat request acknowledgement (HARQ-ACK) feedback for the PDSCHs based on the one or more K1 values and a reference channel; and receive the HARQ-ACK feedback from the UE in the uplink resource.

Example A15 may include the one or more NTCRM of example A14, wherein the reference channel is a reference PDSCH of the PDSCHs.

Example A16 may include the one or more NTCRM of example A15, wherein the instructions, when executed, are further to configure the gNB to identify the reference PDSCH as: the PDSCH of the multiple PDSCHs that has a last ending symbol; the PDSCH of the multiple PDSCHs that is associated with a last uplink slot or sub-slot; the PDSCH of the multiple PDSCHs that has a last-ending boundary of a downlink slot; the PDSCH of the multiple PDSCHs that has a smallest or largest subcarrier spacing; the PDSCH of the multiple PDSCHs that has a smallest or largest serving cell index; or the PDSCH of the multiple PDSCHs that is on a configured reference cell.

Example A17 may include the one or more NTCRM of example A14, wherein the reference channel is a physical downlink control channel (PDCCH) that carries the DCI.

Example A18 may include the one or more NTCRM of example A14, wherein the one or more K1 values correspond to a slot or sub-slot offset from the reference channel.

Example A19 may include the one or more NTCRM of example A14, wherein the DCI indicates a plurality of K1 values that correspond to respective groups of one or more of the PDSCHs.

Example A20 may include the one or more NTCRM of example A14, wherein the instructions, when executed, are further to configure the gNB to identify an effective K1 value based on the one or more indicated K1 values, wherein the uplink resource is identified based on the effective K1 value.

Example A21 may include the one or more NTCRM of example A14, wherein the HARQ-ACK feedback is based on a Type-1 HARQ codebook, a Type-2 HARQ codebook, or a Type-3 HARQ codebook.

Example B1 may include a method of wireless communication, the method comprising: UE receives the configuration of a search space set of a DCI format for multi-cell scheduling; and UE detects a DCI format for multi-cell scheduling and receives one or multiple PDSCH(s) or transmits one or multiple PUSCH(s) accordingly following the Downlink (DL) assignment or Uplink (UL) grant in the detected DCI format.

Example B2 may include the method of Example B1 or some other example herein, multiple PDSCHs scheduled by a DCI for multi-cell scheduling are associated with different TBs respectively.

Example B3 may include the method of Example B2 or some other example herein, wherein a UL slot for PUCCH transmission carrying HARQ-ACK for the PDSCHs scheduled by a DCI for multi-cell scheduling is determined by HARQ-ACK timing K1 and a reference PDSCH.

Example B4 may include the method of Example B2 or some other example herein, wherein a UL slot for PUCCH transmission carrying HARQ-ACK for the PDSCHs scheduled by a DCI for multi-cell scheduling is determined by HARQ-ACK timing K1 and PDCCH carrying the DCI for multi-cell scheduling.

Example B5 may include the method of Example B2 and Example B3 or some other example herein, wherein for type-1 HARQ-ACK codebook, DL candidate slot for each cell is determined by effective K1, where the effective K1 is determined by K1 set and the slot/sub-slot offset between the reference PDSCH and PDSCHs derived by time domain resource allocation for each cell.

Example B6 may include a method of a user equipment (UE), the method comprising: receiving a configuration of a search space set of a downlink control information (DCI) format for multi-cell scheduling; detecting the DCI format that includes a downlink (DL) assignment or an uplink (UL) grant; and receiving one or more physical downlink shared channels (PDSCHs) based on the DL assignment or transmitting one or more physical uplink shared channels (PUSCHs) based on the UL grant.

Example B7 may include the method of Example B6 or some other example herein, wherein the DCI schedules multiple PDSCHs that are respectively associated with different transport blocks (TBs).

Example B8 may include the method of Example B7 or some other example herein, further comprising determining an UL slot for hybrid automatic repeat request acknowledgement (HARQ-ACK) feedback for the PDSCHs based on a HARQ-ACK timing K1 and a reference PDSCH.

Example B9 may include the method of Example B7-B8 or some other example herein, further comprising determining a DL candidate slot for an individual cell based on an effective K1, wherein the effective K1 is determined by a K1 set and a slot or sub-slot offset between the reference PDSCH and the PDSCHs.

Example B10 may include the method of Example B9 or some other example herein, wherein the slot or sub-slot offset is derived based on a time domain resource allocation for the individual cell.

Example B11 may include the method of Example B9-B10 or some other example herein, wherein the HARQ-ACK feedback is to use a type-1 HARQ-ACK codebook.

Example B12 may include the method of Example B7 or some other example herein, further comprising determining a UL slot for HARQ-ACK feedback for the PDSCHs based on a HARQ-ACK timing K1 and a physical downlink control channel (PDCCH) that carries the DCI format.

Example B13 may include a method of a next generation Node B (gNB), the method comprising: encoding, for transmission to a user equipment (UE), a configuration of a search space set of a downlink control information (DCI) format for multi-cell scheduling; encoding, for transmission to the UE, a DCI with the DCI format, wherein the DCI includes a downlink (DL) assignment or an uplink (UL) grant; and encoding one or more physical downlink shared channels (PDSCHs) for transmission based on the DL assignment or receiving one or more physical uplink shared channels (PUSCHs) based on the UL grant.

Example B14 may include the method of Example B13 or some other example herein, wherein the DCI schedules multiple PDSCHs that are respectively associated with different transport blocks (TBs).

Example B15 may include the method of Example B14 or some other example herein, further comprising receiving hybrid automatic repeat request acknowledgement (HARQ-ACK) feedback for the PDSCHs in an UL slot that is determined based on a HARQ-ACK timing K1 and a reference PDSCH.

Example B16 may include the method of Example B14-B15 or some other example herein, further comprising determining a DL candidate slot for an individual cell based on an effective K1, wherein the effective K1 is determined by a K1 set and a slot or sub-slot offset between the reference PDSCH and the PDSCHs.

Example B17 may include the method of Example B16 or some other example herein, wherein the slot or sub-slot offset is derived based on a time domain resource allocation for the individual cell.

Example B18 may include the method of Example B16-B17 or some other example herein, wherein the HARQ-ACK feedback is to use a type-1 HARQ-ACK codebook.

Example B19 may include the method of Example B14 or some other example herein, further comprising receiving HARQ-ACK feedback for the PDSCHs in a UL slot that is determined based on a HARQ-ACK timing K1 and a physical downlink control channel (PDCCH) that carries the DCI format.

Example Z01 may include an apparatus comprising means to perform one or more elements of a method described in or related to any of examples A1-A21, B1-B19, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples A1-A21, B1-B19, or any other method or process described herein.

Example Z03 may include an apparatus comprising logic, modules, or circuitry to perform one or more elements of a method described in or related to any of examples A1-A21, B1-B19, or any other method or process described herein.

Example Z04 may include a method, technique, or process as described in or related to any of examples A1-A21, B1-B19, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples A1-A21, B1-B19, or portions thereof.

Example Z06 may include a signal as described in or related to any of examples A1-A21, B1-B19, or portions or parts thereof.

Example Z07 may include a datagram, packet, frame, segment, protocol data unit (PDU), or message as described in or related to any of examples A1-A21, B1-B19, or portions or parts thereof, or otherwise described in the present disclosure.

Example Z08 may include a signal encoded with data as described in or related to any of examples A1-A21, B1-B19, or portions or parts thereof, or otherwise described in the present disclosure.

Example Z09 may include a signal encoded with a datagram, packet, frame, segment, protocol data unit (PDU), or message as described in or related to any of examples A1-A21, B1-B19, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples A1-A21, B1-B19, or portions thereof.

Example Z11 may include a computer program comprising instructions, wherein execution of the program by a processing element is to cause the processing element to carry out the method, techniques, or process as described in or related to any of examples A1-A21, B1-B19, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Abbreviations

Unless used differently herein, terms, definitions, and abbreviations may be consistent with terms, definitions, and abbreviations defined in 3GPP TR 21.905 v16.0.0 (June 2019). For the purposes of the present document, the following abbreviations may apply to the examples and embodiments discussed herein.

| 3GPP | Third Generation Partnership Project |
| --- | --- |
| 4G | Fourth Generation |
| 5G | Fifth Generation |
| 5GC | 5G Core network |
| AC | Application Client |

| | | | | |
|---|---|---|---|---|
| ACR | Application Context Relocation | | C-RNTI | Cell RNTI |
| ACK | Acknowledgement | | CS | Circuit Switched |
| ACID | Application Client Identification | 5 | CSCF | call session control function |
| AF | Application Function | | CSAR | Cloud Service Archive |
| AM | Acknowledged Mode | | CSI | Channel-State Information |
| AMBR | Aggregate Maximum Bit Rate | | CSI-IM | CSI Interference Measurement |
| AMF | Access and Mobility Management | | CSI-RS | CSI Reference Signal |
| | Function | | CSI-RSRP | CSI reference signal received power |
| AN | Access Network | | CSI-RSRQ | CSI reference signal received quality |
| ANR | Automatic Neighbour Relation | 10 | CSI-SINR | CSI signal-to-noise and interference ratio |
| AOA | Angle of Arrival | | CSMA | Carrier Sense MultipleAccess |
| AP | Application Protocol, Antenna | | CSMA/CA | CSMA with collision avoidance |
| | Port, Access Point | | CSS | Common Search Space, Cell-specific |
| API | Application Programming Interface | | | Search Space |
| APN | Access Point Name | | CTF | Charging Trigger Function |
| ARP | Allocation and Retention Priority | 15 | CTS | Clear-to-Send |
| ARQ | Automatic Repeat Request | | CW | Codeword |
| AS | Access Stratum | | CWS | Contention Window Size |
| ASP | Application Service Provider | | D2D | Device-to-Device |
| ASN.1 | Abstract Syntax Notation One | | DC | Dual Connectivity, Direct Current |
| AUSF | Authentication Server Function | | DCI | Downlink Control Information |
| AWGN | Additive White Gaussian Noise | 20 | DF | Deployment Flavour |
| BAP | Backhaul Adaptation Protocol | | DL | Downlink |
| BCH | Broadcast Channel | | DMTF | Distributed Management Task Force |
| BER | Bit Error Ratio | | DPDK | Data Plane Development Kit |
| BFD | Beam Failure Detection | | DM-RS, DMRS | Demodulation Reference Signal |
| BLER | Block Error Rate | | DN | Data network |
| BPSK | Binary Phase Shift Keying | | DNN | Data Network Name |
| BRAS | Broadband Remote Access Server | 25 | DNAI | Data Network Access Identifier |
| BSS | Business Support System | | DRB | Data Radio Bearer |
| BS | Base Station | | DRS | Discovery Reference Signal |
| BSR | Buffer Status Report | | DRX | Discontinuous Reception |
| BW | Bandwidth | | DSL | Domain Specific Language. Digital |
| BWP | Bandwidth Part | | | Subscriber Line |
| C-RNTI | Cell Radio Network Temporary Identity | 30 | DSLAM | DSL Access Multiplexer |
| CA | Carrier Aggregation, Certification Authority | | DwPTS | Downlink Pilot Time Slot |
| CAPEX | CAPital Expenditure | | E-LAN | Ethernet Local Area Network |
| CBRA | Contention Based Random Access | | E2E | End-to-End |
| CC | Component Carrier, Country Code, | | EAS | Edge Application Server |
| | Cryptographic Checksum | | ECCA | extended clear channel assessment, |
| CCA | Clear Channel Assessment | 35 | | extended CCA |
| CCE | Control Channel Element | | ECCE | Enhanced Control Channel Element, |
| CCCH | Common Control Channel | | | Enhanced CCE |
| CE | Coverage Enhancement | | ED | Energy Detection |
| CDM | Content Delivery Network | | EDGE | Enhanced Datarates for GSM Evolution |
| CDMA | Code-Division Multiple Access | | | (GSM Evolution) |
| CDR | Charging Data Request | 40 | EAS | Edge Application Server |
| CDR | Charging Data Response | | EASID | Edge Application Server Identification |
| CFRA | Contention Free Random Access | | ECS | Edge Configuration Server |
| CG | Cell Group | | ECSP | Edge Computing Service Provider |
| CGF | Charging Gateway Function | | EDN | Edge Data Network |
| CHF | Charging Function | | EEC | Edge Enabler Client |
| CI | Cell Identity | | EECID | Edge Enabler Client Identification |
| CID | Cell-ID (e.g., positioning method) | 45 | EES | Edge Enabler Server |
| CIM | Common Information Model | | EESID | Edge Enabler Server Identification |
| CIR | Carrier to Interference Ratio | | EHE | Edge Hosting Environment |
| CK | Cipher Key | | EGMF | Exposure Governance Management Function |
| CM | Connection Management, Conditional Mandatory | | EGPRS | Enhanced GPRS |
| CMAS | Commercial Mobile Alert Service | | EIR | Equipment Identity Register |
| CMD | Command | 50 | eLAA | enhanced Licensed AssistedAccess, enhanced LAA |
| CMS | Cloud Management System | | EM | Element Manager |
| CO | Conditional Optional | | eMBB | Enhanced Mobile Broadband |
| CoMP | Coordinated Multi-Point | | EMS | Element Management System |
| CORESET | Control Resource Set | | eNB UTRAN | evolved NodeB, E-Node B |
| COTS | Commercial Off-The-Shelf | | EN-DC | E-UTRA-NR Dual Connectivity |
| CP | Control Plane, Cyclic Prefix, Connection Point | 55 | EPC | Evolved Packet Core |
| CPD | Connection Point Descriptor | | EPDCCH | enhanced PDCCH, enhanced Physical Downlink |
| CPE | Customer Premise Equipment | | | Control Cannel |
| CPICH | Common Pilot Channel | | EPRE | Energy per resource element |
| CQI | Channel Quality Indicator | | EPS | Evolved Packet System |
| CPU | CSI processing unit, Central Processing Unit | | EREG | enhanced REG, enhanced resource element groups |
| C/R | Command/Response | 60 | ETSI | European Telecommunications Standards Institute |
| | field bit | | ETWS | Earthquake and Tsunami Warning System |
| CRAN | Cloud Radio Access Network, Cloud | | eUICC | embedded UICC, embedded Universal |
| RAN | | | | Integrated Circuit Card |
| CRB | Common Resource Block | | E-UTRA | Evolved UTRA |
| CRC | Cyclic Redundancy Check | | E-UTRAN | Evolved UTRAN |
| CRI | Channel-State Information Resource | 65 | EV2X | Enhanced V2X |
| | Indicator, CSI-RS Resource Indicator | | F1AP | F1 Application Protocol |

-continued

| | |
|---|---|
| F1-C | F1 Control plane interface |
| F1-U | F1 User plane interface |
| FACCH | Fast Associated Control CHannel |
| FACCH/F | FastAssociated Control Channel/Full rate |
| FACCH/H | Fast Associated Control Channel/Half rate |
| FACH | Forward Access Channel |
| FAUSCH | Fast Uplink Signalling Channel |
| FB | Functional Block |
| FBI | Feedback Information |
| FCC | Federal Communications Commission |
| FCCH | Frequency Correction CHannel |
| FDD | Frequency Division Duplex |
| FDM | Frequency Division Multiplex |
| FDMA | Frequency Division Multiple Access |
| FE | Front End |
| FEC | Forward Error Correction |
| FFS | For Further Study |
| FFT | Fast Fourier Transformation |
| feLAA | further enhancedLicensed Assisted Access, further enhanced LAA |
| FN | Frame Number |
| FPGA | Field-Programmable Gate Array |
| FR | Frequency Range |
| FQDN | Fully Qualified Domain Name |
| G-RNTI | GERAN Radio Network Temporary Identity |
| GERAN | GSM EDGE RAN, GSM EDGE Radio Access Network GGSN Gateway GPRS Support Node |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit, Next Generation NodeB centralized unit |
| gNB-DU | gNB-distributed unit, Next Generation NodeB distributed unit |
| GNSS | Global Navigation Satellite System |
| GPRS | General Packet Radio Service |
| GPSI | Generic Public Subscription Identifier |
| GSM | Global System for Mobile Communications, Groupe Spécial Mobile |
| GTP | GPRS Tunneling Protocol |
| GTP-UGPRS | Tunnelling Protocol for User Plane |
| GTS | Go To Sleep Signal (related toWUS) |
| GUMMEI | Globally Unique MME Identifier |
| GUTI | Globally Unique Temporary UE Identity |
| HARQ | Hybrid ARQ, HybridAutomatic Repeat Request |
| HANDO | Handover |
| HFN | HyperFrame Number |
| HHO | Hard Handover |
| HLR | Home Location Register |
| HN | Home Network |
| HO | Handover |
| HPLMN | Home Public Land Mobile Network |
| HSDPA | High Speed Downlink Packet Access |
| HSN | Hopping Sequence Number |
| HSPA | High Speed Packet Access |
| HSS | Home Subscriber Server |
| HSUPA | High Speed Uplink Packet Access |
| HTTP | Hyper Text Transfer Protocol |
| HTTPS | Hyper Text TransferProtocol Secure (https is http/1.1 over SSL, i.e. port443) |
| I-Block | Information Block |
| ICCID | Integrated Circuit Card Identification |
| IAB | Integrated Access and Backhaul |
| ICIC | Inter-Cell Interference Coordination |
| ID | Identity, identifier |
| IDFT | Inverse Discrete Fourier Transform |
| IE | Information element |
| IBE | In-Band Emission |
| IEEE | Institute of Electrical and Electronics Engineers |
| IEI | Information Element Identifier |
| IEIDL | Information Element Identifier Data Length |
| IETF | Internet Engineering Task Force |
| IF | Infrastructure |
| IIOT | Industrial Internet of Things |
| IM | Interference Measurement, Intermodulation, IP Multimedia |
| IMC | IMS Credentials |

-continued

| | |
|---|---|
| IMEI | International Mobile Equipment Identity |
| IMGI | International mobile group identity |
| IMPI | IP Multimedia Private Identity |
| IMPU | IP Multimedia PUblic identity |
| IMS | IP Multimedia Subsystem |
| IMSI | International Mobile Subscriber Identity |
| IoT | Internet of Things |
| IP | Internet Protocol |
| Ipsec | IP Security, Internet Protocol Security |
| IP-CAN | IP-Connectivity Access Network |
| IP-M | IP Multicast |
| IPv4 | Internet Protocol Version 4 |
| IPv6 | Internet Protocol Version 6 |
| IR | Infrared |
| IS | In Sync |
| IRP | Integration Reference Point |
| ISDN | Integrated Services Digital Network |
| ISIM | IM Services Identity Module |
| ISO | International Organisation for Standardisation |
| ISP | Internet Service Provider |
| IWF | Interworking-Function |
| I-WLAN | Interworking WLAN Constraint length of the convolutional code, USIM Individual key |
| kB | Kilobyte (1000 bytes) |
| kbps | kilo-bits per second |
| Kc | Ciphering key |
| Ki | Individual subscriber authentication key |
| KPI | Key Performance Indicator |
| KQI | Key Quality Indicator |
| KSI | Key Set Identifier |
| ksps | kilo-symbols per second |
| KVM | Kernel Virtual Machine |
| L1 | Layer 1 (physical layer) |
| L1-RSRP | Layer 1 reference signal received power |
| L2 | Layer 2 (data link layer) |
| L3 | Layer 3 (network layer) |
| LAA | Licensed Assisted Access |
| LAN | Local Area Network |
| LADN | Local Area Data Network |
| LBT | Listen Before Talk |
| LCM | LifeCycle Management |
| LCR | Low Chip Rate |
| LCS | Location Services |
| LCID | Logical Channel ID |
| LI | Layer Indicator |
| LLC | Logical Link Control, Low Layer Compatibility |
| LMF | Location Management Function |
| LOS | Line of Sight |
| LPLMN | Local PLMN |
| LPP | LTE Positioning Protocol |
| LSB | Least Significant Bit |
| LTE | Long Term Evolution |
| LWA | LTE-WLAN aggregation |
| LWIP | LTE/WLAN Radio Level Integration with IPsec Tunnel |
| LTE | Long Term Evolution |
| M2M | Machine-to-Machine |
| MAC | Medium Access Control (protocol layering context) |
| MAC | Message authentication code (security/encryption context) |
| MAC-A | MAC used for authentication and key agreement (TSG TWG3 context) |
| MAC-IMAC | used for data integrity of signalling messages (TSG TWG3 context) |
| MANO | Management and Orchestration |
| MBMS | Multimedia Broadcast and Multicast Service |
| MBSFN | Multimedia Broadcast multicast service Single Frequency Network |
| MCC | Mobile Country Code |
| MCG | Master Cell Group |
| MCOT | Maximum Channel Occupancy Time |
| MCS | Modulation and coding scheme |
| MDAF | Management Data Analytics Function |
| MDAS | Management Data Analytics Service |
| MDT | Minimization of Drive Tests |
| ME | Mobile Equipment MeNB master eNB |
| MER | Message Error Ratio |
| MGL | Measurement Gap Length |
| MGRP | Measurement Gap Repetition Period |

-continued

-continued

| | |
|---|---|
| MIB | Master Information Block, Management Information Base |
| MIMO | Multiple Input Multiple Output |
| MLC | Mobile Location Centre |
| MM | Mobility Management |
| MME | Mobility Management Entity |
| MN | Master Node |
| MNO | Mobile Network Operator |
| MO | Measurement Object, Mobile Originated |
| MPBCH | MTC Physical Broadcast CHannel |
| MPDCCH | MTC Physical Downlink Control CHannel |
| MPDSCH | MTC Physical Downlink Shared CHannel |
| MPRACH | MTC Physical Random Access CHannel |
| MPUSCH | MTC Physical Uplink Shared Channel |
| MPLS | MultiProtocol Label Switching |
| MS | Mobile Station |
| MSB | Most Significant Bit |
| MSC | Mobile Switching Centre |
| MSI | Minimum System Information, MCH Scheduling Information |
| MSID | Mobile Station Identifier |
| MSIN | Mobile Station Identification Number |
| MSISDN | Mobile Subscriber ISDN Number |
| MT | Mobile Terminated, Mobile Termination |
| MTC | Machine-Type Communications mMTCmassive MTC, massive Machine-Type Communications |
| MU-MIMO | Multi User MIMO |
| MWUS | MTC wake-up signal, MTC WUS |
| NACK | Negative Acknowledgement |
| NAI | Network Access Identifier |
| NAS | Non-Access Stratum, Non- Access Stratum layer |
| NCT | Network Connectivity Topology |
| NC-JT | Non-coherent Joint Transmission |
| NEC | Network Capability Exposure |
| NE-DC | NR-E-UTRA Dual Connectivity |
| NEF | Network Exposure Function |
| NF | Network Function |
| NFP | Network Forwarding Path |
| NFPD | Network Forwarding Path Descriptor |
| NFV | Network Functions Virtualization |
| NFVI | NFV Infrastructure |
| NFVO | NFV Orchestrator |
| NG | Next Generation, Next Gen |
| NGEN-DC | NG-RAN E-UTRA-NR Dual Connectivity |
| NM | Network Manager |
| NMS | Network Management System |
| N-PoP | Network Point of Presence |
| NMIB, N-MIB | Narrowband MIB |
| NPBCH | Narrowband Physical Broadcast CHannel |
| NPDCCH | Narrowband Physical Downlink Control CHannel |
| NPDSCH | Narrowband Physical Downlink Shared CHannel |
| NPRACH | Narrowband Physical Random Access CHannel |
| NPUSCH | Narrowband PhysicalUplink Shared CHannel |
| NPSS | Narrowband Primary Synchronization Signal |
| NSSS | Narrowband Secondary Synchronization Signal |
| NR | New Radio, Neighbour Relation |
| NRF | NF Repository Function |
| NRS | Narrowband Reference Signal |
| NS | Network Service |
| NSA | Non-Standalone operation mode |
| NSD | Network Service Descriptor |
| NSR | Network Service Record |
| NSSAI | Network Slice Selection Assistance Information |
| S-NNSAI | Single-NSSAI |
| NSSF | Network Slice Selection Function |
| NW | Network |
| NWUS | Narrowband wake-up signal, Narrowband WUS |
| NZP | Non-Zero Power |
| O&M | Operation and Maintenance |
| ODU2 | Optical channel Data Unit-type 2 |
| OFDM | Orthogonal Frequency Division Multiplexing |
| OFDMA | Orthogonal Frequency Division Multiple Access |
| OOB | Out-of-band |
| OOS | Out of Sync |
| OPEX | OPerating EXpense |
| OSI | Other System Information |
| OSS | Operations Support System |
| OTA | over-the-air |
| PAPR | Peak-to-Average Power Ratio |

| | |
|---|---|
| PAR | Peak to Average Ratio |
| PBCH | Physical Broadcast Channel |
| PC | Power Control, Personal Computer |
| PCC | Primary Component Carrier, Primary CC |
| P-CSCF | Proxy CSCF |
| PCell | Primary Cell |
| PCI | Physical Cell ID, Physical Cell Identity |
| PCEF | Policy and Charging Enforcement Function |
| PCF | Policy Control Function |
| PCRF | Policy Control and Charging Rules Function |
| PDCP | Packet Data Convergence Protocol, Packet Data Convergence Protocol layer |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| PEI | Permanent Equipment Identifiers |
| PFD | Packet Flow Description |
| P-GW | PDN Gateway |
| PHICH | Physical hybrid-ARQ indicator channel |
| PHY | Physical layer |
| PLMN | Public Land Mobile Network |
| PIN | Personal Identification Number |
| PM | Performance Measurement |
| PMI | Precoding Matrix Indicator |
| PNF | Physical Network Function |
| PNFD | Physical Network Function Descriptor |
| PNFR | Physical Network Function Record |
| POC | PTT over Cellular |
| PP, PTP | Point-to-Point |
| PPP | Point-to-Point Protocol |
| PRACH | Physical RACH |
| PRB | Physical resource block |
| PRG | Physical resource block group |
| ProSe | Proximity Services, Proximity-Based Service |
| PRS | Positioning Reference Signal |
| PRR | Packet Reception Radio |
| PS | Packet Services |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSCell | Primary SCell |
| PSS | Primary Synchronization Signal |
| PSTN | Public Switched Telephone Network |
| PT-RS | Phase-tracking reference signal |
| PTT | Push-to-Talk |
| PUCCH | Physical Uplink Control Channel |
| PUSCH | Physical Uplink Shared Channel |
| QAM | Quadrature Amplitude Modulation |
| QCI | QoS class of identifier |
| QCL | Quasi co-location |
| QFI | QoS Flow ID, QoS Flow Identifier |
| QoS | Quality of Service |
| QPSK | Quadrature (Quaternary) Phase Shift Keying |
| QZSS | Quasi-Zenith Satellite System |
| RA-RNTI | Random Access RNTI |
| RAB | Radio Access Bearer, Random Access Burst |
| RACH | Random Access Channel |
| RADIUS | Remote Authentication Dial In User Service |
| RAN | Radio Access Network |
| RAND | RANDom number (used for authentication) |
| RAR | Random Access Response |
| RAT | Radio Access Technology |
| RAU | Routing Area Update |
| RB | Resource block, Radio Bearer |
| RBG | Resource block group |
| REG | Resource Element Group |
| Rel | Release |
| REQ | REQuest |
| RF | Radio Frequency |
| RI | Rank Indicator |
| RIV | Resource indicator value |
| RL | Radio Link |
| RLC | Radio Link Control, Radio Link Control layer |
| RLC AM | RLC Acknowledged Mode |
| RLC UM | RLC Unacknowledged Mode |
| RLF | Radio Link Failure |

-continued

| | |
|---|---|
| RLM | Radio Link Monitoring |
| RLM-RS | Reference Signal for RLM |
| RM | Registration Management |
| RMC | Reference Measurement Channel |
| RMSI | Remaining MSI, Remaining Minimum System Information |
| RN | Relay Node |
| RNC | Radio Network Controller |
| RNL | Radio Network Layer |
| RNTI | Radio Network Temporary Identifier |
| ROHC | RObust Header Compression |
| RRC | Radio Resource Control, Radio Resource Control layer |
| RRM | Radio Resource Management |
| RS | Reference Signal |
| RSRP | Reference Signal Received Power |
| RSRQ | Reference Signal Received Quality |
| RSSI | Received Signal Strength Indicator |
| RSU | Road Side Unit |
| RSTD | Reference Signal Time difference |
| RTP | Real Time Protocol |
| RTS | Ready-To-Send |
| RTT | Round Trip Time |
| Rx | Reception, Receiving, Receiver |
| S1AP | S1 Application Protocol |
| S1-MME | S1 for the control plane |
| S1-U | S1 for the user plane |
| S-CSCF | serving CSCF |
| S-GW | Serving Gateway |
| S-RNTI | SRNC Radio Network Temporary Identity |
| S-TMSI | SAE Temporary Mobile Station Identifier |
| SA | Standalone operation mode |
| SAE | System Architecture Evolution |
| SAP | Service Access Point |
| SAPD | Service Access Point Descriptor |
| SAPI | Service Access Point Identifier |
| SCC | Secondary Component Carrier, Secondary CC |
| SCell | Secondary Cell |
| SCEF | Service Capability Exposure Function |
| SC-FDMA | Single Carrier Frequency Division Multiple Access |
| SCG | Secondary Cell Group |
| SCM | Security Context Management |
| SCS | Subcarrier Spacing |
| SCTP | Stream Control Transmission Protocol |
| SDAP | Service Data Adaptation Protocol, Service Data Adaptation Protocol layer |
| SDL | Supplementary Downlink |
| SDNF | Structured Data Storage Network Function |
| SDP | Session Description Protocol |
| SDSF | Structured Data Storage Function |
| SDT | Small Data Transmission |
| SDU | Service Data Unit |
| SEAF | Security Anchor Function |
| SeNB | secondary eNB |
| SEPP | Security Edge Protection Proxy |
| SFI | Slot format indication |
| SFTD | Space-Frequency Time Diversity, SFN and frame timing difference |
| SFN | System Frame Number |
| SgNB | Secondary gNB |
| SGSN | Serving GPRS Support Node |
| S-GW | Serving Gateway |
| SI | System Information |
| SI-RNTI | System Information RNTI |
| SIB | System Information Block |
| SIM | Subscriber Identity Module |
| SIP | Session Initiated Protocol |
| SiP | System in Package |
| SL | Sidelink |
| SLA | Service Level Agreement |
| SM | Session Management |
| SMF | Session Management Function |
| SMS | Short Message Service |
| SMSF | SMS Function |
| SMTC | SSB-based Measurement Timing Configuration |
| SN | Secondary Node, Sequence Number |
| SoC | System on Chip |
| SON | Self-Organizing Network |

-continued

| | |
|---|---|
| SpCell | Special Cell SP-CSI-RNTISemi-Persistent CSIRNTI |
| SPS | Semi-Persistent Scheduling |
| SQN | Sequence number |
| SR | Scheduling Request |
| SRB | Signalling Radio Bearer |
| SRS | Sounding Reference Signal |
| SS | Synchronization |
| SSB | Synchronization Signal Block |
| SSID | Service Set Identifier |
| SS/PBCH | Block |
| SSBRISS/PBCH | Block Resource Indicator, Synchronization Signal Block Resource Indicator |
| SSC | Session and Service Continuity |
| SS-RSRP | Synchronization Signal based Reference Signal Received Power |
| SS-RSRQ | Synchronization Signal based Reference Signal Received Quality |
| SS-SINR | Synchronization Signal based Signal to Noise and Interference Ratio |
| SSS | Secondary Synchronization Signal |
| SSSG | Search Space Set Group |
| SSSIF | Search Space Set Indicator |
| SST | Slice/Service Types |
| SU-MIMO | Single User MIMO |
| SUL | Supplementary Uplink |
| TA | Timing Advance, Tracking Area |
| TAC | Tracking Area Code |
| TAG | Timing Advance Group |
| TAI | Tracking Area Identity |
| TAU | Tracking Area Update |
| TB | Transport Block |
| TBS | Transport Block Size |
| TBD | To Be Defined |
| TCI | Transmission Configuration Indicator |
| TCP | Transmission Communication Protocol |
| TDD | Time Division Duplex |
| TDM | Time Division Multiplexing |
| TDMA | Time Division Multiple Access |
| TE | Terminal Equipment |
| TEID | Tunnel End Point Identifier |
| TFT | Traffic Flow Template |
| TMSI | Temporary Mobile Subscriber Identity |
| TNL | Transport Network Layer |
| TPC | Transmit Power Control |
| TPMI | Transmitted Precoding Matrix Indicator |
| TR | Technical Report |
| TRP, TRxP | Transmission Reception Point |
| TRS | Tracking Reference Signal |
| TRx | Transceiver |
| TS | Technical Specifications, Technical Standard |
| TTI | Transmission Time Interval |
| Tx | Transmission, Transmitting, Transmitter |
| U-RNTI | UTRAN Radio Network Temporary Identity |
| UART | Universal Asynchronous Receiver and Transmitter |
| UCI | Uplink Control Information |
| UE | User Equipment |
| UDM | Unified Data Management |
| UDP | User Datagram Protocol |
| UDSF | Unstructured Data Storage Network Function |
| UICC | Universal Integrated Circuit Card |
| UL | Uplink |
| UM | Unacknowledged Mode |
| UML | Unified Modelling Language |
| UMTS | Universal Mobile Telecommunications System |
| UP | User Plane |
| UPF | User Plane Function |
| URI | Uniform Resource Identifier |
| URL | Uniform Resource Locator |
| URLLC | Ultra-Reliable and Low Latency |
| USB | Universal Serial Bus |
| USIM | Universal Subscriber Identity Module |
| USS | UE-specific search space |
| UTRA | UMTS Terrestrial Radio Access |
| UTRAN | Universal Terrestrial Radio Access Network |
| UwPTS | Uplink Pilot Time Slot |
| V2I | Vehicle-to-Infrastructure |
| V2P | Vehicle-to-Pedestrian |
| V2V | Vehicle-to-Vehicle |

-continued

| | |
|---|---|
| V2X | Vehicle-to-everything |
| VIM | Virtualized Infrastructure Manager |
| VL | Virtual Link, |
| VLAN | Virtual LAN, Virtual Local Area Network |
| VM | Virtual Machine |
| VNF | Virtualized Network Function |
| VNFFG | VNF Forwarding Graph |
| VNFFGD | VNF Forwarding Graph Descriptor |
| VNFM | VNF Manager |
| VoIP | Voice-over-IP, Voice-over-Internet Protocol |
| VPLMN | Visited Public Land Mobile Network |
| VPN | Virtual Private Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2-C | X2-Control plane |
| X2-U | X2-User plane |
| XML | extensible Markup Language |
| XRES | EXpected user RESponse |
| XOR | exclusive OR |
| ZC | Zadoff-Chu |
| ZP | Zero Power |

Terminology

For the purposes of the present document, the following terms and definitions are applicable to the examples and embodiments discussed herein.

The term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. Processing circuitry may include one or more processing cores to execute instructions and one or more memory structures to store program and data information. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. Processing circuitry may include more hardware accelerators, which may be microprocessors, programmable processing devices, or the like. The one or more hardware accelerators may include, for example, computer vision (CV) and/or deep learning (DL) accelerators. The terms "application circuitry" and/or "baseband circuitry" may be considered synonymous to, and may be referred to as, "processor circuitry."

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

The terms "instantiate," "instantiation," and the like as used herein refers to the creation of an instance. An "instance" also refers to a concrete occurrence of an object, which may occur, for example, during execution of program code.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or link, and/or the like.

The term "information element" refers to a structural element containing one or more fields. The term "field" refers to individual contents of an information element, or a data element that contains content.

The term "SMTC" refers to an SSB-based measurement timing configuration configured by SSB-MeasurementTimingConfiguration.

The term "SSB" refers to an SS/PBCH block.

The term "a "Primary Cell" refers to the MCG cell, operating on the primary frequency, in which the UE either performs the initial connection establishment procedure or initiates the connection re-establishment procedure.

The term "Primary 5CG Cell" refers to the 5CG cell in which the UE performs random access when performing the Reconfiguration with Sync procedure for DC operation.

The term "Secondary Cell" refers to a cell providing additional radio resources on top of a Special Cell for a UE configured with CA.

The term "Secondary Cell Group" refers to the subset of serving cells comprising the PSCell and zero or more secondary cells for a UE configured with DC.

The term "Serving Cell" refers to the primary cell for a UE in RRC_CONNECTED not configured with CA/DC there is only one serving cell comprising of the primary cell.

The term "serving cell" or "serving cells" refers to the set of cells comprising the Special Cell(s) and all secondary cells for a UE in RRC_CONNECTED configured with CA/.

The term "Special Cell" refers to the PCell of the MCG or the PSCell of the 5CG for DC operation; otherwise, the term "Special Cell" refers to the Pcell.

The invention claimed is:

1. One or more non-transitory computer-readable media (NTCRM) having instructions, stored thereon, that when executed by one or more processors of a user equipment (UE) configure the UE to:

detect a downlink control information (DCI) to schedule multiple physical downlink shared channels (PDSCHs), wherein the respective PDSCHs are to be transmitted from different cells and include different transport blocks (TBs), and wherein the DCI indicates one or more K1 values;

determine an uplink resource for hybrid automatic repeat request acknowledgement (HARQ-ACK) feedback for the PDSCHs based on the one or more K1 values and a reference PDSCH corresponding to a last uplink slot or sub-slot among the multiple PDSCHs, including to determine an effective K1 value based on at least one of the one or more K1 values and a time domain offset between the multiple PDSCHs, wherein the uplink resource is determined based on the effective K1 value; and encode the HARQ-ACK feedback for transmission in the determined uplink resource.

2. The one or more NTCRM of claim 1, wherein the reference channel is a reference PDSCH of the PDSCHs.

3. The one or more NTCRM of claim 2, wherein the instructions, when executed, are further to configure the UE to identify the reference PDSCH as:

the PDSCH of the multiple PDSCHs that has a last ending symbol;

the PDSCH of the multiple PDSCHs that is associated with a last uplink slot or sub-slot;

the PDSCH of the multiple PDSCHs that has a last-ending boundary of a downlink slot;

the PDSCH of the multiple PDSCHs that has a smallest or largest subcarrier spacing;

the PDSCH of the multiple PDSCHs that has a smallest or largest serving cell index; or the PDSCH of the multiple PDSCHs that is on a configured reference cell.

4. The one or more NTCRM of claim 1, wherein the reference channel is a physical downlink control channel (PDCCH) that carries the DCI.

5. The one or more NTCRM of claim 1, wherein the one or more K1 values correspond to a slot or sub-slot offset from the reference channel.

6. The one or more NTCRM of claim 1, wherein the DCI indicates a plurality of K1 values that correspond to respective groups of one or more of the PDSCHs.

7. The one or more NTCRM of claim 1, wherein the instructions, when executed, are further to configure the UE to determine an effective K1 value based on the one or more indicated K1 values, wherein the uplink resource is determined based on the effective K1 value.

8. The one or more NTCRM of claim 7, wherein the one or more K1 values indicated by the DCI is a set of K1 values, and wherein the effective K1 for the PDSCHs scheduled by the DCI is within the set of K1 values.

9. The one or more NTCRM of claim 1, wherein to encode the HARQ-ACK feedback for transmission in the determined uplink resource includes to determine HARQ-ACK bit locations based on an effective K1 value and time domain resources of the PDSCHs.

10. The one or more NTCRM of claim 9, wherein the time domain resources of the PDSCHs are determined based on a valid Start and the set of Length Indication Value (SLIV) in time domain resource allocation (TDRA) configured for respective serving cells for single and/or multi-cell scheduling.

11. The one or more NTCRM of claim 1, wherein the instructions, when executed, are further to configure the UE to receive a configuration of a search space set of a DCI format for multi-cell scheduling, wherein the DCI is detected in the search space set.

12. The one or more NTCRM of claim 1, wherein the HARQ-ACK feedback is based on a Type-1 HARQ codebook, a Type-2 HARQ-ACK codebook, or a Type-3 HARQ-ACK codebook.

13. One or more non-transitory computer-readable media (NTCRM) having instructions, stored thereon, that when executed by one or more processors of a next generation Node B (gNB) configure the gNB to:

encode, for transmission to a user equipment (UE), a downlink control information (DCI) to schedule multiple physical downlink shared channels (PDSCHs), wherein the respective PDSCHs are to be transmitted from different cells and include different transport blocks (TBs), and wherein the DCI indicates one or more K1 values;

identify an uplink resource for hybrid automatic repeat request acknowledgement (HARQ-ACK) feedback for the PDSCHs based on the one or more K1 values and a reference PDSCH corresponding to a last uplink slot or sub-slot among the multiple PDSCHs, including to identify an effective K1 value based on at least one of the one or more K1 values and a time domain offset between the multiple PDSCHs, wherein the uplink resource is identified based on the effective K1 value; and receive the HARQ-ACK feedback from the UE in the uplink resource.

14. The one or more NTCRM of claim 13, wherein the reference channel is a reference PDSCH of the PDSCHs.

15. The one or more NTCRM of claim 14, wherein the instructions, when executed, are further to configure the gNB to identify the reference PDSCH as:

the PDSCH of the multiple PDSCHs that has a last ending symbol;

the PDSCH of the multiple PDSCHs that is associated with a last uplink slot or sub-slot;

the PDSCH of the multiple PDSCHs that has a last-ending boundary of a downlink slot;

the PDSCH of the multiple PDSCHs that has a smallest or largest subcarrier spacing;

the PDSCH of the multiple PDSCHs that has a smallest or largest serving cell index; or the PDSCH of the multiple PDSCHs that is on a configured reference cell.

16. The one or more NTCRM of claim 13, wherein the reference channel is a physical downlink control channel (PDCCH) that carries the DCI.

17. The one or more NTCRM of claim 13, wherein the one or more K1 values correspond to a slot or sub-slot offset from the reference channel.

18. The one or more NTCRM of claim 13, wherein the DCI indicates a plurality of K1 values that correspond to respective groups of one or more of the PDSCHs.

19. The one or more NTCRM of claim 13, wherein the instructions, when executed, are further to configure the gNB to identify an effective K1 value based on the one or more indicated K1 values, wherein the uplink resource is identified based on the effective K1 value.

20. The one or more NTCRM of claim 13, wherein the HARQ-ACK feedback is based on a Type-1 HARQ codebook, a Type-2 HARQ codebook, or a Type-3 HARQ codebook.

* * * * *